(12) United States Patent
Weng et al.

(10) Patent No.: US 10,643,278 B2
(45) Date of Patent: May 5, 2020

(54) FUTURES MARGIN MODELING SYSTEM

(71) Applicant: Chicago Mercantile Exchange, Inc., Chicago, IL (US)

(72) Inventors: Jennifer Weng, Brooklyn, NY (US); Nikhil Joshi, New York, NY (US); Guo Chen, Chicago, IL (US); Siwen Yang, Chicago, IL (US); Zijiang Yang, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 1099 days.

(21) Appl. No.: 15/001,997

(22) Filed: Jan. 20, 2016

(65) Prior Publication Data

US 2017/0206601 A1    Jul. 20, 2017

(51) Int. Cl.
*G06Q 40/04* (2012.01)

(52) U.S. Cl.
CPC .................................. *G06Q 40/04* (2013.01)

(58) Field of Classification Search
None
See application file for complete search history.

(56) References Cited

U.S. PATENT DOCUMENTS

| | | | |
|---|---|---|---|
| 7,426,487 | B2 | 9/2008 | Glinberg et al. |
| 7,428,508 | B2 | 9/2008 | Glinberg et al. |
| 7,509,275 | B2 | 3/2009 | Glinberg et al. |
| 7,593,877 | B2 | 9/2009 | Glinberg et al. |
| 7,769,667 | B2 | 8/2010 | Glinberg et al. |
| 2009/0171824 | A1 | 7/2009 | Glinberg et al. |
| 2010/0332370 | A1* | 12/2010 | Lindblom ............ G06Q 40/04 705/37 |
| 2015/0039530 | A1* | 2/2015 | Jha ...................... G06Q 40/06 705/36 R |
| 2015/0332404 | A1* | 11/2015 | Baysal ................. G06Q 40/06 705/36 R |

OTHER PUBLICATIONS

Li, et al., Calculation Method for Portfolio's Value at Risk Based on Principal Factor Analysis. Published in: Proceedings of ICSSSM '05. 2005 International Conference on Services Systems and Services Management, 2005. (vol. 2, pp. 1233-1236 vol. 2). Entire document pertinent (Year: 2005).*

NPL Ray, Beginners Guide to Learn Dimension Reduction Techniques Jul. 28, 2015, entire document pertinent, retrieved from https://www.analyticsvidhya.com/blog/2015/07/dimension-reduction-methods/ (Year: 2015).*

* cited by examiner

*Primary Examiner* — Bennett M Sigmond
*Assistant Examiner* — Gregory S Cunningham, II
(74) *Attorney, Agent, or Firm* — Lempia Summerfield Katz LLC

(57) ABSTRACT

A clearinghouse computing device may be configured to generate a margin requirement for a portfolio of financial products and may include a processor to process instructions that cause the clearinghouse computing device to retrieve a plurality of pricing records from a historical pricing database, process the plurality of pricing records to generate rolling time series pricing records for at least one financial product having a plurality of dimensions, reduce the number of dimensions from a starting dimension to a reduced dimension, perform variance scaling and correlation scaling on the reduced dimension rolling time series pricing records, and generate a margin requirement based on a value-at-risk calculation.

21 Claims, 43 Drawing Sheets

| Commodity | Start Date Time Series | Start Date Analysis | End Date |
|---|---|---|---|
| Crude Oil (CL) | 2-Jan-2001 | 2-Oct-2008 | 1-Jan-2014 |
| Coal (QL) | 13-Jul-2001 | 2-Oct-2008 | 1-Jan-2014 |
| Natural Gas (NG) | 2-Jan-2001 | 2-Oct-2008 | 1-Jan-2014 |
| Heating Oil (HO) | 2-Jan-2001 | 2-Oct-2008 | 1-Jan-2014 |
| Gasoline (RB) | 3-Oct-2005 | 2-Oct-2010 | 1-Jan-2014 |
| ICE Brent Crude (ICE B) | 4-Jan-2000 | 2-Oct-2008 | 1-Jan-2014 |
| ICE Gasoil (ICE G) | 4-Jan-2000 | 2-Oct-2008 | 1-Jan-2014 |
| ICE Low Sulfur (ULS) | 19-Sep-2011 | 20-Sep-2011 | 1-Jan-2014 |
| Crude Gulf Sour (MB) | 8-Dec-2009 | 2-Jan-2010 | 1-Jan-2014 |

Figure 4

| Commodity | Sample Size | p-val | Passed |
|---|---|---|---|
| CL | 225 | 15.3% | |
| QL | 224 | 92.0% | |
| NG | 196 | 79.4% | |
| HO | 194 | 24.9% | |
| RB | 146 | 45% | |
| ICE B | 235 | 14.7% | |
| ICE G | 232 | 1e-5% | X |
| ULS | 43 | 0.4% | X |
| MB | 82 | 81.0% | |

Figure 6

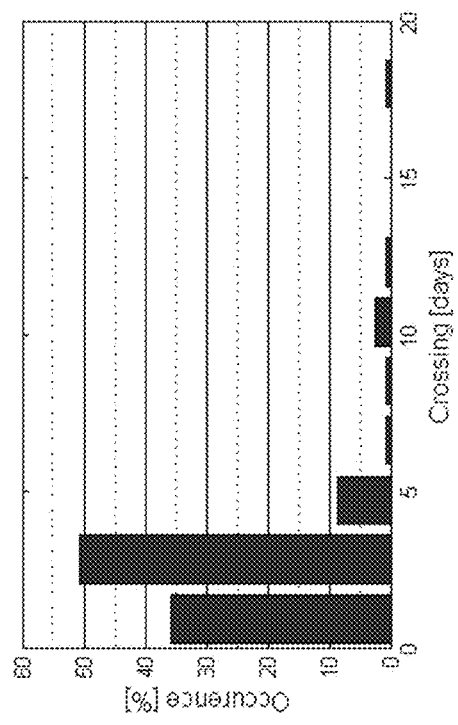
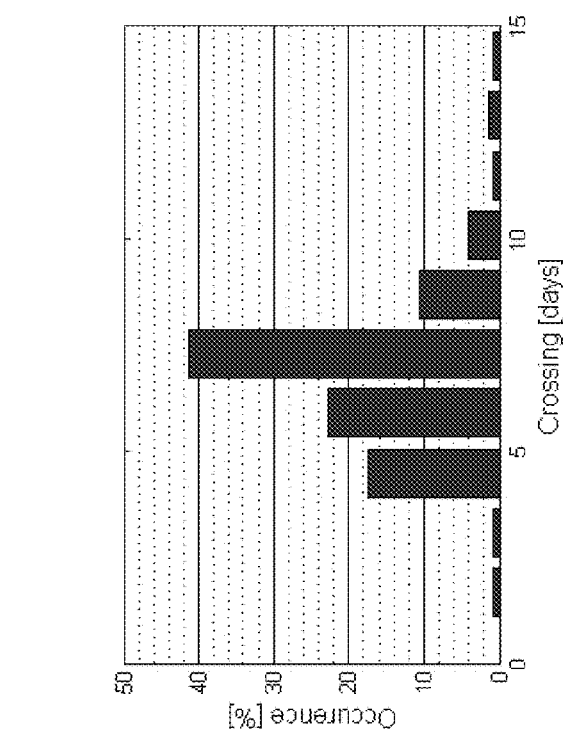
FIG. 12
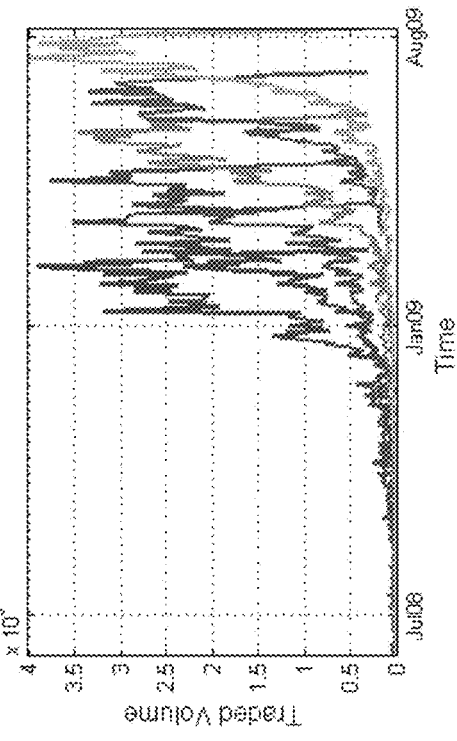
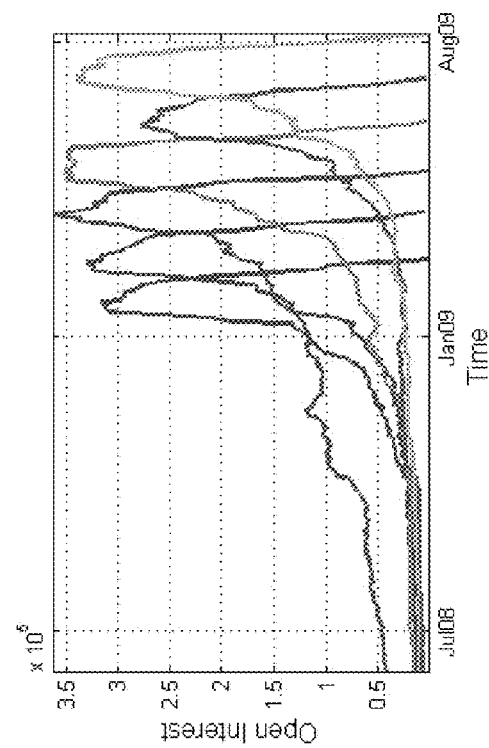
FIG. 13

|        | $N_{obs}$ | median($\delta$) | mean($\delta$) | $\sigma_\delta$ | $\frac{N}{N}$ | mean sb. inters. | $N_{below}$ | $N_{above}$ |
|--------|-----|------|------|-----|-------|-----|----|-----|
| CL     | 155 | 2    | 2.4  | 2.3 | 99.4  | 1.2 | 0  | 1   |
| QL     | 114 | 21   | 20.3 | 1.6 | 8.8   | 5.2 | 0  | 104 |
| NG     | 154 | 1    | 1.6  | 3.2 | 75.3  | 0.9 | 38 | 0   |
| HO     | 155 | 6    | 5.8  | 2.5 | 100.0 | 1.4 | 0  | 0   |
| RB     | 93  | 7    | 7.8  | 2.9 | 98.9  | 1.5 | 0  | 1   |
| ICE B  | 155 | 4    | 4.4  | 2.6 | 98.7  | 1.3 | 0  | 2   |
| ICE G  | 155 | 10   | 11.3 | 5.6 | 96.1  | 2.0 | 0  | 6   |
| ULS    | 23  | 19.5 | 18.8 | 2.2 | 43.5  | 5.2 | 0  | 13  |

FIG.14

|        | $N_{obs}$ | median($\delta$) | mean($\delta$) | $\sigma_\delta$ | $\frac{N}{N}$ | mean sb. inters. | $N_{below}$ | $N_{above}$ |
|--------|-----|------|------|-----|------|-----|----|-----|
| CL     | 155 | 7    | 7.0  | 1.9 | 96.8 | 1.0 | 0  | 5   |
| QL     | 143 | 12.5 | 11.7 | 7.1 | 16.8 | 1.8 | 12 | 107 |
| NG     | 154 | 9    | 9.4  | 4.2 | 80.5 | 1.1 | 0  | 30  |
| HO     | 155 | 11   | 10.9 | 2.6 | 96.8 | 1.0 | 0  | 5   |
| RB     | 95  | 12   | 12.3 | 2.5 | 91.6 | 1.0 | 0  | 8   |
| ICE B  | 155 | 10   | 11.6 | 4.8 | 94.2 | 1.2 | 0  | 9   |
| ICE G  | 155 | 13   | 12.9 | 4.1 | 98.7 | 1.1 | 0  | 2   |
| ULS    | 23  | 3    | 4.8  | 5.3 | 56.5 | 1.2 | 1  | 9   |

FIG.15

| Commodity | Linear | Spline | PCHIP |
|-----------|--------|--------|-------|
| CL        | 0.0015 | 0.0104 | 0.0156 |
| QL        | $10^{-5}$ | 0 | 0 |

FIG.16

| Commodity | Linear | Spline | PCHIP |
|---|---|---|---|
| CL | X | | X |
| QL | X | X | X |
| ICE B | X | | |
| ICE G | | | |
| ULS | X | | X |
| MB | | | |

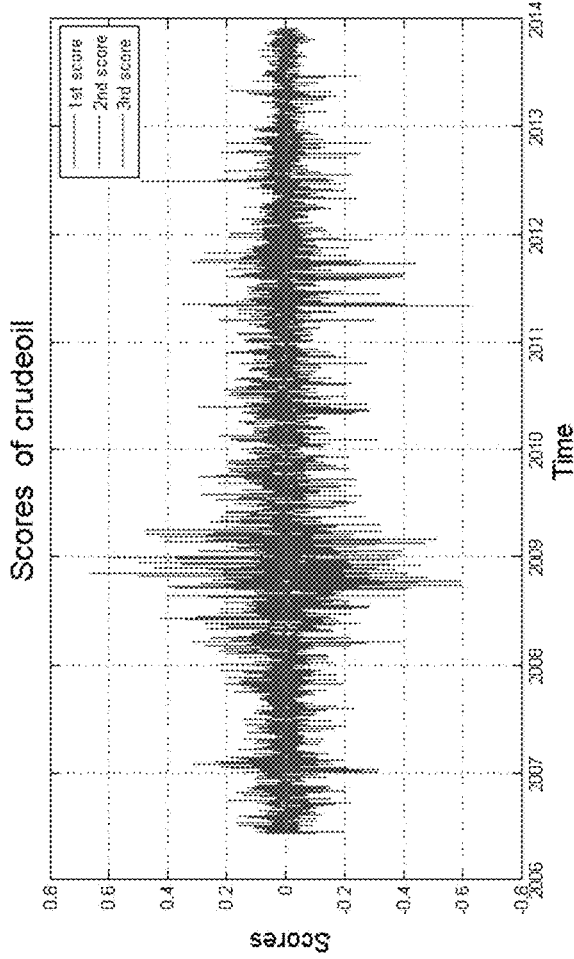

FIG. 31

| Curve | Stability | Remarks |
|---|---|---|
| Coal | Irregular shape, 3rd PC is noisy | Lower explanation rate |
| Heating Oil | Stable shape | Very high explanation |
| Gasoline | Stable Shape | Instabilities only at the beginning of the training window |
| ICE Brent Crude | Stable | Very similar to crude oil |
| ICE Low Sulphur | Middle stability | Unstable at the beginning of the simulation |
| Gulf Coast Sour | Unstable | first PC indicates an inversed Saussurean effect. |
| ICE Gasoil | Stable | Similar to crude oil. |

FIG. 32

| Color | Criteria | Interpretation |
|---|---|---|
| Green | $p \geq 5\%$ | Test successful |
| Yellow | $5\% > p \geq 1\%$ | Test accepted with low significance |
| Red | $1\% \geq p$ | Test rejected |

FIG. 54

FUTURES MARGIN MODELING SYSTEM

FIELD OF THE INVENTION

Embodiments of the present disclosure relate to systems and methods for processing data. More particularly, the invention provides computing systems for processing data for modeling and determining margin requirements.

BACKGROUND

Futures contracts and options on futures contracts can be distributed or executed through a variety of means. Historically, futures were largely executed or transacted on the floor of an exchange in so-called "trading pits" that facilitated physical interaction between floor brokers and floor traders. This method is commonly known as "open outcry." Although some open outcry trading still occurs, most futures contracts and options are now transacted through electronic trading systems. These electronic trading systems allow customers (e.g., parties wishing to transact in futures contracts and/or options) to establish an electronic link to an electronic matching engine of a futures exchange. That engine, which may be implemented as a specially programmed computer system or as part of a larger specially programmed electronic trading computer system, may identify orders that match in terms of commodity, quantity and price.

Clearinghouses and other entities that clear trades require traders, such as traders of futures contracts, to maintain performance bonds in margin accounts to cover risks associated with the portfolios. The clearinghouse (e.g., central counterparty to financial products) may use the performance bond to counter margin risk associated with the portfolio. Risks may utilize complex algorithms to be analyzed to determine required initial margin amounts and maintenance margin amounts. A risk calculation module (or risk processor) may assist in the calculation. In some examples, values (e.g., swap DV01s, volatility values, etc.) and adjustments/factors (e.g., calendar charge adjustments, liquidity charge minimums, etc.) may be used to enhance the margin calculation.

Clearinghouses are structured to provide exchanges and other trading entities with solid financial footing. Maintaining proper margin amounts is an important part of the maintaining solid financial footing. The required margin amount generally varies according to the volatility of a financial instrument; the more volatility, the larger the required margin amount. This is to ensure that the bond will sufficiently cover the cumulated losses that a contract would likely incur over a given time period, such as a single day. Required margin amounts may be reduced where traders hold opposite positions in closely correlated markets or spread trades.

Calculating margin amounts can be a challenge, even when computer devices are utilized. In the trading environment the speed with which information can be determined and distributed to market participants can be critical. For example, regulations set time limits for clearing entities to provide margin requirements to market participants after the end of a trading day. Some market participants also expect clearing entities to quickly determine how a potential transaction will impact their margin requirements.

As the numbers of accounts and transactions increase over a larger field of trading products, it becomes difficult for existing computer systems and processes to determine and communicate pricing, volatility and margin requirements to market participants in the time frames required by regulations or expected by the market participants. Therefore there is a need in the art for more efficient computer systems and computer-implemented methods for processing data to model and determine margin requirements.

SUMMARY

This Summary is provided to introduce a selection of concepts in a simplified form that are further described below in the Detailed Description. This Summary is not intended to identify key or essential features of the invention.

In at least some embodiments, a clearinghouse computing device may be configured to generate a margin requirement for a portfolio of financial products and may include a processor to process instructions that cause the clearinghouse computing device to retrieve a plurality of pricing records from a historical pricing database, process the plurality of pricing records to generate rolling time series price daily log changes for at least one financial product having a plurality of dimensions, reduce the number of dimensions from the initial dimension to a reduced dimension by mapping the rolling time series price daily log changes to a set of new risk factors, perform variance scaling and covariance scaling on the reduced dimension risk factor time series to generate scenarios, map the reduced dimension risk factor scenarios back to the initial dimension price daily log change scenarios, and generate a margin requirement based on a value-at-risk calculation.

Embodiments include, without limitation, methods for spot trading, methods for support of spot trading by an exchange trading in futures contracts and/or futures contract options, computer systems configured to perform such methods, and computer-readable media storing instructions that, when executed, cause a computer system to perform such methods.

BRIEF DESCRIPTION OF THE DRAWINGS

Some embodiments are illustrated by way of example, and not by way of limitation, in the figures of the accompanying drawings and in which like reference numerals refer to similar elements:

FIG. 4 shows an illustrative listing of futures products corresponding to a corresponding commodity according to aspects of the disclosure;

FIG. 6 shows an illustrative two-sided KS test to analyze time-to-maturity effects on a price daily log return distribution according to aspects of the disclosure;

FIG. 12 shows illustrative charts showing traded volume curves for 6 consecutive contracts associated with a particular commodity and a distribution of crossing days for the front and second months contracts according to aspects of the disclosure;

FIG. 13 shows illustrative charts showing open interest curves for 6 consecutive contracts associated with the particular commodity and a distribution of crossing days for the front and second months contracts according to aspects of the disclosure;

FIG. 14 shows an illustrative table showing traded volume analysis associated with a plurality of financial products, according to aspects of the disclosure;

FIG. 15 shows an illustrative table showing open interest statistics associated with a plurality of financial products, according to aspects of the disclosure;

FIG. 16 shows an illustrative chart showing results of a Kolmogorov-Smirnov test for each of a plurality of interpolation methods according to aspects of this disclosure;

FIG. 31 shows an illustrative chart that represents the time-series of the leading three PC scores of a financial product according to aspects of the disclosure;

FIG. 32 shows an illustrative table corresponding to visual inspection of PC surface stability for the different curves according to aspects of the invention

FIG. 54 shows test success criteria for some statistical tests on backtesting results according to aspects of the disclosure.

DETAILED DESCRIPTION

Figure 1:
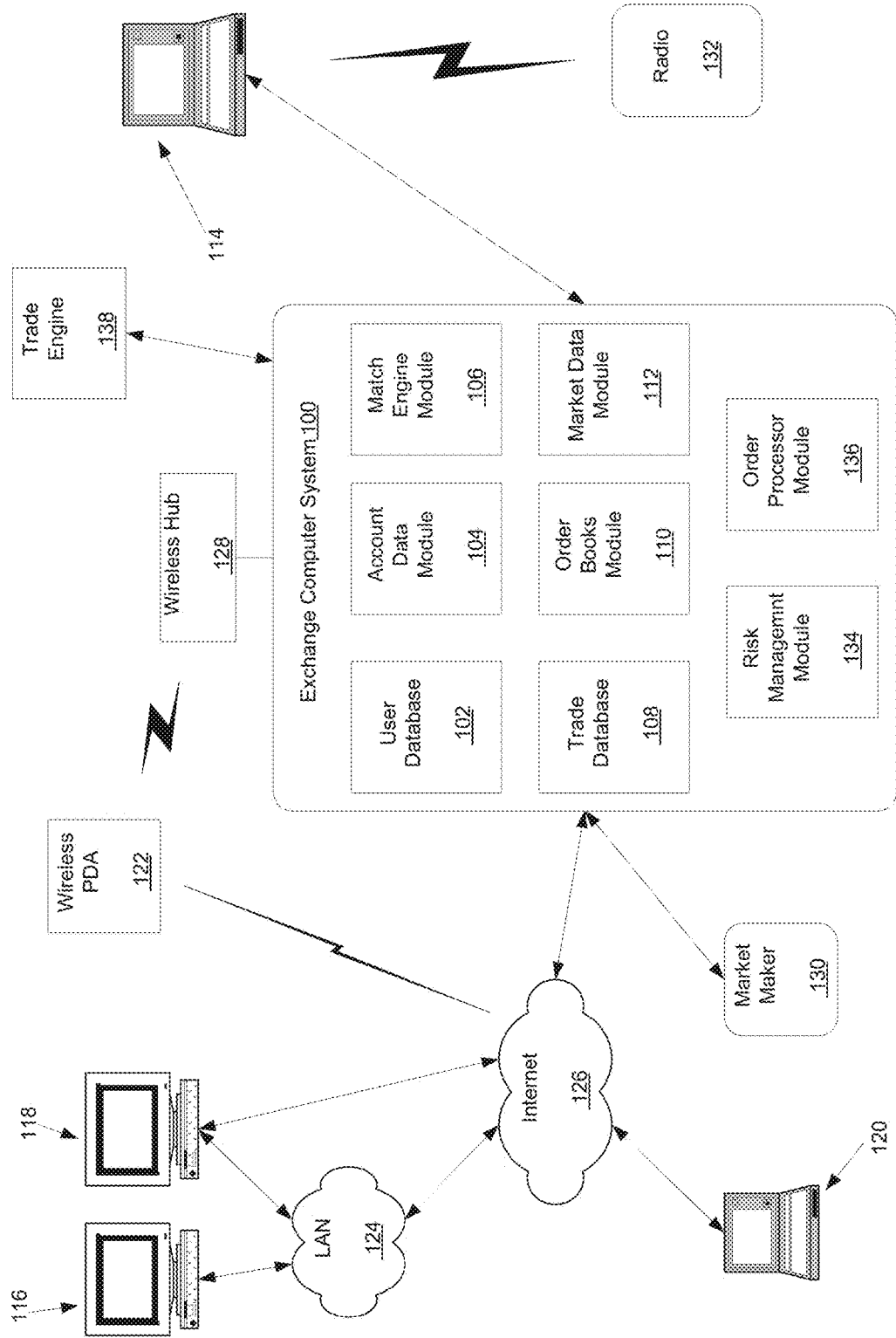
FIG. 1 shows an illustrative trading network environment for implementing trading systems and methods according to aspects of the disclosure.

In the following description of various embodiments, reference is made to the accompanying drawings, which form a part hereof, and in which various embodiments are shown by way of illustration. It is to be understood that there are other embodiments and that structural and functional modifications may be made. Embodiments of the present invention may take physical form in certain parts and steps, examples of which will be described in detail in the following description and illustrated in the accompanying drawings that form a part hereof.

Aspects of the present invention may be implemented with specially programmed computer devices and/or specially programmed computer systems that allow users to exchange trading information. An illustrative computing system specially programmed to implement a trading network environment defining illustrative trading systems and methods is shown in FIG. 1.

An exchange computer system 100 receives orders and transmits market data related to orders and trades to users. Exchange computer system 100 may be implemented with one or more specially programmed mainframe, desktop or other computers. A user database 102 includes information identifying traders and other users of exchange computer system 100. Data may include user names and passwords. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by order book module 110 and match engine module 106.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

In an embodiment, a clearinghouse computer or computer system may be included. A clearinghouse or other entity that clears trades may use a specially programmed clearinghouse computer or computer system for processing data to model and determine margin requirements.

Illustrative Embodiments

Clearing firms (e.g., a clearinghouse) may offer clearing services for one or more trading products, such as for futures. As part of the clearing services, the clearing firms may calculate margin requirement by relying on a risk management model that conforms to regulatory requirements and to the risk appetite of the particular clearinghouse.

As such, a computer-implemented risk model should, therefore provide good coverage across a representative set of portfolios under a comprehensive set of historical scenarios, take into account all of the significant risk factors relevant to a plurality of futures products, consistently and proportionately model the effect of relevant risk factors on the total risk exposure of portfolios including futures products, and have robust, intuitive and justifiable parameterization that supports a reliable and transparent calibration and replication process.

In some cases, a clearinghouse may rely on one or more models (e.g., a scenario-based model, a parametric model, a historical data model, etc.) to be implemented on an clearing computing system to determine margining requirements associated with customer portfolios. In an illustrative example, a computing system may implement a rule-based margining system, where margining may be first performed on synthetic portfolios of basic trading strategies that may include one or more of Outright, Calendar Spread, and Butterfly. In some cases, one or more scenarios (e.g., 16 symmetric long and short scenarios) may be processed and then applied as margin calculations. In such systems, the clearing computing system may decompose each real portfolio into multiple synthetic portfolios where the final margin may be computed by aggregating the sub-margins together. In such cases, an end user will have to make the rules for decomposition and setting the order for spread margin consumption, resulting in a very manually and computationally intensive margining process because the methodology is rule based, where the rules can be different for each financial product. Further, the clearinghouse computing systems have faced increased strain and loading on the computational resources due to a rapid growth in new financial products available to trade, where every real portfolio may include any combination of these financial products. Each portfolio may be decomposed into multiple synthetic portfolios, where a final margin may be computed by aggregating the sub-margins calculated for each synthetic portfolio.

Inconsistencies may be introduced as the dimension reduction mechanism (e.g., tiers of financial products) is not consistent. Further, methodology of determining the tiers of financial products (e.g., grouping contracts in terms of maturity), may not be statistically sound. As such, margining of portfolios based on different strategies (e.g., Outrights, Calendar Spreads, Butterflies, etc.) for different tiers is usually inconsistent. Further, only a limited number of spreads may be able to be margined where the rule-based margining may be limited to particular portfolios of products. Further, such margining processes may have limited scalability, without incorporating excessive computing power and data storage capabilities, because the number of inter-curve spreads and the order in which they are applied may be limited. Further, this type of margining may have limited accuracy due to a reliance on recent data points. Such a margining model may be used for a small number of simple (e.g., "vanilla", linear, etc.) futures products. However, such rule-based models may cause excessive computational strains to the clearinghouse computing system due to an exponentially growing number of scenarios to be processed with or without offsetting rules and their order of application when calculating a margin requirement for large number of financial products. Further, the computer systems processing the rule-based margining models may process seasonal futures products on an ad-hoc basis and/or may need increased computational power to process margin requirements for multiple standard (e.g., vanilla) options products using one or more volatility surface reconciliation methods (e.g., a price-volatility matrix, etc.). In some cases, the rule-based models may not be suitable for determining margining requirements for one or more exotic options products, such as an average price option (APO), a calendar spread option (CSO), a "strip" option, and the like, without significant computational and model adjustments.

Parametric margining models may be useful for determining margining requirements for a group of homogeneous products or products having a stable correlation structure. However, the parametric models may not be used by clearinghouse computing systems to efficiently calculate margining requirements for a group of products having substantially different underlying risk factors (e.g., futures, implied volatilities, etc.) and/or for products having an unstable correlation structure. The parametric model may introduce potentially difficult calibration issues, difficult choices in using a particular parametric model such as an outright margin model, a correlation-based margin model and, different dependence structures between product types (e.g., futures, options, etc.).

In some cases, the clearinghouse computing systems may process computer-executable instructions to utilize a historical data-based margining model that may be useful in determining margin requirements for a heterogeneous group of financial products in a straightforward manner using one or more historical scenarios. Such models may be data intensive and dependent on the quality and amount of historical data available and may be difficult to use for products with low data quality, or having limited or no data history.

Figure 2:
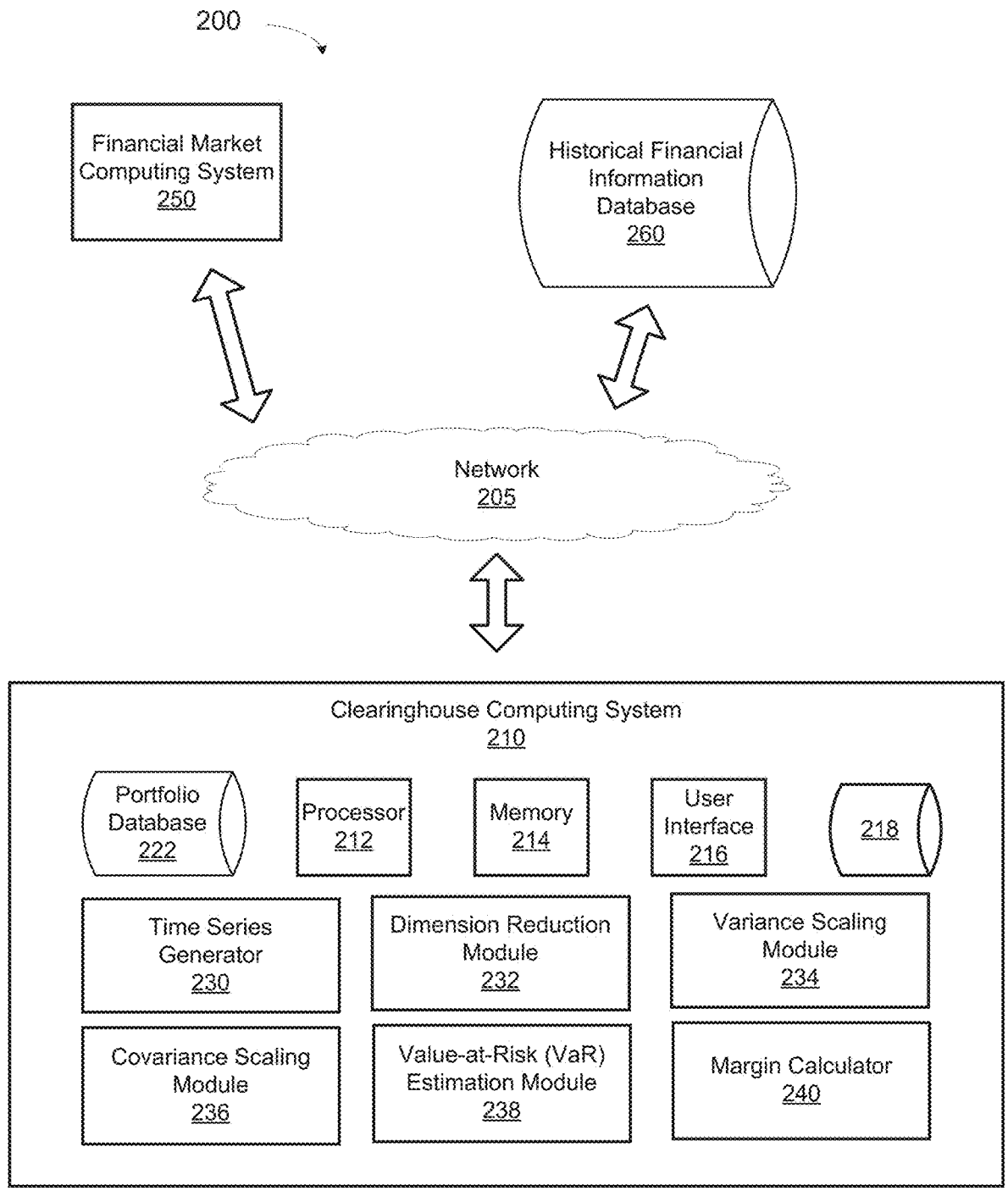
FIG. 2 shows a block diagram representation of a clearinghouse computing system for calculating a margin requirement according to aspects of the disclosure.

FIG. 2 shows a block diagram representation of a margin computation system 200 including a clearinghouse computing system 210 for calculating a margin requirement according to aspects of the disclosure. The clearinghouse computing system 210 may include one or more components (e.g., computing devices, modules running on one or more computing devices, etc.) that, when processing computer-executable instructions, calculate an initial margin requirement for a portfolio containing one or more financial products (e.g., futures products, etc.) by: dimension reduction, variance scaling, covariance scaling, and Value-at-Risk (VaR) estimation. In some cases, the margin computation system 200 may include the clearinghouse computing system 210 communicatively coupled via a network 205 (e.g., a wide area network (WAN), the LAN 124, the Internet 126, etc.) to a financial market computing system 250. The financial market computing system 250 may include one or more computing devices configured for receiving and disseminating information corresponding to a financial market (e.g., a futures market, an options market, etc.), such as pricing information (e.g., bid information, ask information, etc.) and/or the like. The clearinghouse computing system 210 may be communicatively coupled to a historical financial information database 260 via the network 205. In some cases, at least a portion of the historical financial information database 260 may be otherwise incorporated into the clearinghouse computing system 210 and/or the financial market computing system 250.

In some cases, the financial market computing system 250 may include a data repository, one or more computing devices and/or a user interface. The data repository may store instructions, that when executed by the one or more computing devices, may cause the financial market computing system 250 to perform operations associated with monitoring financial transactions, receiving buy and/or sell orders, communicating financial information corresponding to pricing information for a plurality of financial products offered via the associated financial market(s). In some cases, the financial market computing system 250 may communicate financial information corresponding to the plurality of financial products in near real-time, at predetermined time intervals (e.g., about 5 seconds, about 30 seconds, about 1 minute, about 2 minutes, at the end of a trading day, at the start of a trading day, etc.) determining performance bond contributions associated with holdings in products that are based on various types of futures. In some cases, the financial market computing system 250 may store the financial information corresponding to the plurality of financial products in the historical financial information database 260. Further, the financial market computing system may further present the financial information corresponding to the plurality of financial products via one or more user interface screens via the user interface, whether the user interface is local to the financial market computing system 250. The user interface may be local to the financial market computing system 250 and/or remote from financial market computing system 250 and accessible via the network 205. The user interface screens may graphically and/or textually present financial information corresponding to the plurality of financial products in near real time, at predefined intervals and/or in response to a user request.

In some cases, the choice, calibration, and/or calculation of the risk requirement employs a detailed statistical analysis of the risk factors underlying futures instruments held in the portfolio. In an illustrative example, the clearinghouse computing system 210 may include one or more processors 212, one or more non-transitory memory devices 214 (e.g., RAM, ROM, a disk drive, a flash drive, a redundant array of independent disks (RAID) server, and/or other such device etc.), a user interface 216 (e.g., a display device, a keyboard, a pointing device, a speaker, a microphone, etc.), a data repository 218, a communication interface to facilitate communications via the network 205, and/or the like. In some cases, the clearinghouse computing device 210 may be configured to store instructions in the one or more memory devices 214 and/or the data repository 218 that, when executed by the processor 212, may configure the clearinghouse computing device 210 to execute a model for determining margining requirements associated with a portfolio of financial products, such as futures products, options products, stocks, and/or the like. In some cases, the clearinghouse computing system 210 may process the instructions stored in the memory device 214 and/or the data repository 218 to calculate the margining requirements using one or more of a time series generator 230, a dimension reduction module 232, a variance scaling module 234, a covariance scaling module 236, a value-at-risk (VAR) estimation module 238 and/or a margin calculator 240. For example the clearinghouse computing system 210 may utilize the time series generator 230, the dimension reduction module 232, the variance scaling module 234, the covariance scaling module 236, the value-at-risk (VAR) estimation module 238 and/or the margin calculator 240 to determine margin requirements for a portfolio of financial products based on one or more financial models, such as a risk model. In some cases, the risk model may transform daily log returns of future prices to orthogonal principal component (PC) scores and uses those PC scores as risk factors. The transformation is performed on rolling generic contract time series, which is a synthetic series constructed by grouping existing contracts according to time-to-maturity. A roll-ahead for generating generic contracts can be applied in order to provide time-series without any significant short term maturity effects.

In an illustrative example, the time series generator 230 may be used to process financial information (e.g., pricing information) corresponding to one or more financial products, such as financial products held in a client's portfolio. For example, the time series generator 230 may be used to identify which financial products may be held in a client portfolio for which a margin requirement is to be calculated. For example, the time series generator 230 may receive a customer identifier (e.g., an account number, a name, etc.) and retrieve account information from a portfolio database 222 corresponding to the customer identifier. In some cases, the portfolio database 222 may store information corresponding to a plurality of customers, where the portfolios may include information detailing a size of a holding of the different financial products held in the portfolio and/or pricing information corresponding to the different financial products held in the portfolio. In some cases, the time series generator 230 may retrieve pricing information corresponding to the plurality of financial products held in the customer's portfolio from a remote database (e.g., the historical financial information database 260, etc.) via the network 205. This pricing information may be used to process contract price series information to build time series of generic contracts (e.g., representative financial products). In some cases, a rolling procedure is preferred over interpolation, an alternative approach to construct a generic contract time series at fixed time to maturity. As such, the time series generator 230 may process large amounts of historical data sets to generate a rolling generic time series. A core advantage of the rolling approach is to allow a one-to-one mapping with the existing associated financial product contracts (e.g., futures product). The concern is that rolling procedure may bring a periodic non-stationarity, which would be the strongest for the front-month generic contract. Empirical statistical analysis has shown that the time to maturity effect in price daily log return distribution for the front month generic contract is small. However, in the back-end of the term structure curve, an interpolation or extrapolation technique may be used to fill in or extend any missing data points along term structure in order to keep the continuity of the rolling generic times series. For example, the time series generator 230 may process instructions to utilize linear extrapolation at the price level. In some cases, such as when the data time series of a product is much shorter compared with other products, an extension model may be designed to generate artificial data along time dimension for that specific product. The time series generator 230 is configured to allow use of the maximum amount of data available, and not to truncate long-time-series because some of the curves have limited time-range. For example, a Student's t-distribution inverse conditional expectation formula may be used.

TABLE 1

Methodologies for use in time series generation

| Method | Pros | Cons |
| --- | --- | --- |
| Rolling | Clean time series without any short term maturity effects Testing possible to determine impact of any short term maturity effects | Difficult to obtain roll-ahead parameter using indicator variables is difficult due to the unreliability of the curves Some returns are fully uncovered by the models |
| Interpolation | Allows for different interpolation methods based on the data set - linear interpolation, cubic spline interpolation, piecewise cubic hermite interpolation (PCHIP) | No historical data for generics corresponding to contracts at the back-end of the curve |
| Time series extension | Allows for building multi-curve models for products having data sets starting at different time points | Capturing dependence between illiquid products and liquid products requires a sufficiently large data set |

In some cases, the portfolio database 222 may include portfolio information corresponding to a plurality of financial products, such as futures products. In many cases, multiple futures products may be held in a particular portfolio, particularly in cases where a large number of financial products are available to the investor. For example, FIG. 4 shows an illustrative listing of futures products corresponding to a corresponding commodity according to aspects of the disclosure. As such, data identification may be considered to be the backbone of the model, where information related to each of the multiple (e.g., about 100, about 500, about 1000, etc.) futures products may be processed to produce a continuous time-series of information (e.g., a time series of daily settlement prices) for an each of the plurality of financial products. The time series of pricing information, such as settlement prices, may be generated by analyzing or otherwise processing information from a number of different contracts (e.g., about 50 contracts, about 100 contracts, about 200 contracts, etc.) over a time period (e.g., about 1 year, about 3 years, about 5 years, etc.). The time series information may reflect monthly contracts and/or may include information corresponding to different market characteristics, such as seasonality, volatility related to a maturity date, and/or the like.

The time series generator 230 may process instructions stored in the one or more memory devices 214 to generate one or more time series of futures products (e.g., a generic futures contract) according to one or more approaches that may include a rolling generation process, an interpolation generation process and/or the like. The time series generator 230 may retrieve pricing information via the network 205 from the historical financial information database 260 for a plurality of financial products (e.g., futures products, etc.). As mentioned above, FIG. 4 shows an illustrative listing of futures products based on different energy sources (e.g., commodities) such as crude oil, coal, natural gas, heating oil, gasoline, ICE Brent Crude, ICE Gasoil, ICE low sulfur, Crude Gulf Sour, and the like. In some cases, time series information retrieved form the historical financial information database 260 may be associated with starting dates for each raw time series associated with a particular commodity, and/or a starting date and ending date for use in the analysis. In some cases, the starting date of the time series may be different than the starting date for use in the analysis. In some cases, an analysis starting date may be chosen to be the same for different futures products. Further, in some cases such as in cases where less information is available (e.g., a newer developed futures product), the start date of the time series may be the same as the start date used in the analysis. Due to the varying length of the time series information, the modeling of the information to be processed by the dimension reduction module 232, the length of the curves may be based on a time interval between the start date of the analysis and the end data of the analysis. In some cases, the end date of the analysis may be a date earlier than a present date. For products having less information (e.g., a shorter information time frame), the time series information may be extensible.

TABLE 2

Methodologies for use in the dimension reduction model

| Method | Pros | Cons |
| --- | --- | --- |
| Orthogonal Components Parametric Model | High reactivity Fast computation Control of the forward shape | Lack of interpretability for illiquid components Parameter instability and autocorrelation of parameter changes Fitting issues for the front month |
| Benchmark model | Direct modeling of the generics | No dimension reduction - not possible to use on a multi-curve level |

In some cases, the time series generator 230 may process instructions corresponding to a mathematical equation to determine a rolling time series for a plurality of futures products, such as in cases for "regular" futures products. In such cases, the time series generator 230 may find the return time series $R_n^{(g)}(t_i)$ of the n-th generic contract of a future product by the rolling procedure using:

$$R_n^{(g)}(t_i) = R_{T_{j+n-1}}(t_i), \text{ where } t_i \in (T_{j-1} - \delta_{j-1}, T_j - \delta_j], \quad (1)$$

where Tj is the maturity date of contract with number j=1, ..., Ncnt and Ncnt is the total number of contracts. The initial maturity date $T_0$ is defined as $$T_0 = \text{Min}_T (T - \delta > t_0) \quad (2)$$

where T varies in the set of all available contract maturities and $t_0$ is the starting date of the analysis, as shown in FIG. 4. Additionally, $R_{T_j}(t)$ is given as the log-return at time $t_i$ of the traded futures with contract number j, as shown in:

$$R_{T_j}(t_i) = \log(F_{T_j}(t_i)) - \log(F_{T_j}(t_{i-1})), \quad (3)$$

where $F_T(t)$ is the price of the future contract with maturity T at time t. For generality the roll-ahead period δ for the rolling can be chosen as being maturity and product dependent, however this roll-ahead period may be chosen as a fixed, maturity and product independent constant due to the unreliability of some data curves and also to avoid distortion of the inter-curve correlation.

By construction the rolling procedure puts together returns with different time to maturity (e.g., less than a month difference), which may cause a periodic nonstationarity. This effect may be the strongest for the front-month generic futures. As such, a possible remedy may utilize a predefined roll-ahead period when performing the shift from one contract to another before the end of the contract. By doing so, errors introduced by rolling on contracts with very short time-to-maturity may be minimized or eliminated. Heuristics based on open interests and traded volume for determination of the roll-ahead period may be analyzed by matching the rolling procedure of ETF contracts. We may focus on front-month returns for which the time-to-maturity effects may be expected to be the strongest. Practically, we compare the two extreme sets of log-returns available within the front month time series, namely: (1) the short time-to-maturity set of returns with time-to-maturity less than or equal to 2 days, and (2) the long time-to-maturity set of returns with time-to-maturity between about 28 and 31 days.

Figure 7:
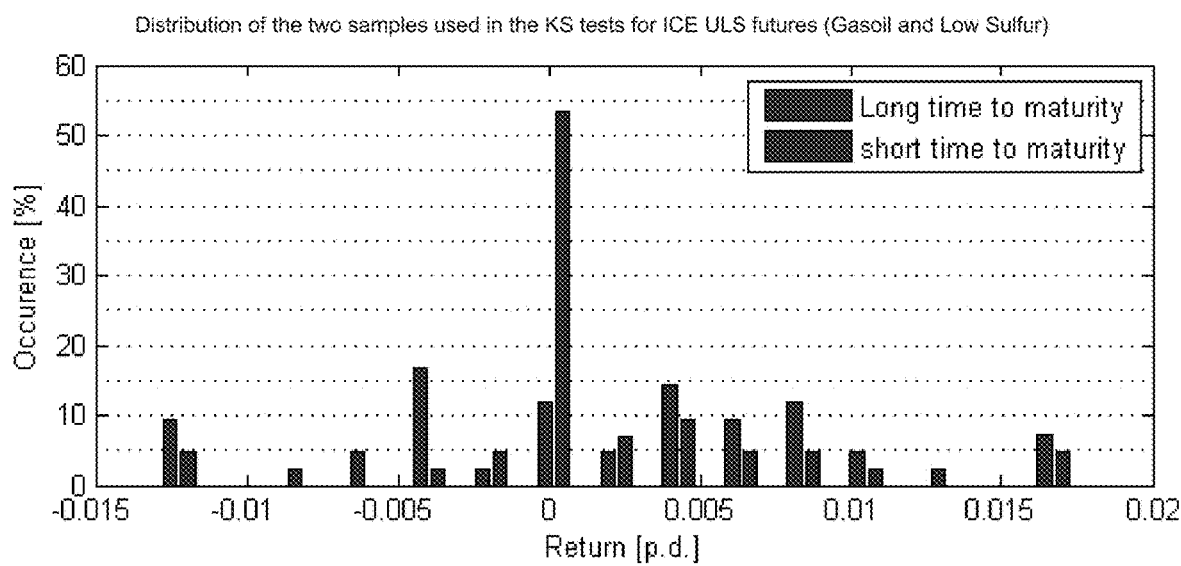
FIGS. 7 and 8 each show an illustrative charts showing a distribution of samples used in the two-sided KS test for different particular commodities according to aspects of the disclosure.

Two different tests may be run to compare these two distributions. For example, the first two moments may be tested using a two-sample Kolmogorov-Smirnov (KS) test, where the null hypotheses is that short time-to-maturity and long time-to-maturity returns are sampled from the same distribution. This null hypothesis may be rejected if the test statistics yields a p-value smaller than 5%. In the second test, a multi-generic case may be investigated using the correlations of the front month contract to the second month contract. As the correlation model, an exponentially weighted moving average (EWMA) with a pre-defined decay parameter (e.g., about 0.9) may be used. As the obtained correlations are very high, a visual check, or other automated graphical analysis method, may be performed on the commodities to ensure there is no strong time-to-maturity effects exist, or are at least minimized. FIG. 6 shows an illustrative two-sided KS test result to analyze time-to-maturity effects on a return distribution according to aspects of the disclosure. In the chart, the fields marked with an X (e.g., ICE G and ULS), show that a test has been passed (e.g., $H_0$ has been rejected) and that the distributions are different. The sample size column indicates the smaller sample size between the two sets (e.g., a short set and a long set). For example, FIG. 7 shows an illustrative chart showing the distribution of the two samples used in the two-sided KS test for a particular commodity according to aspects of the disclosure.

Figure 8:
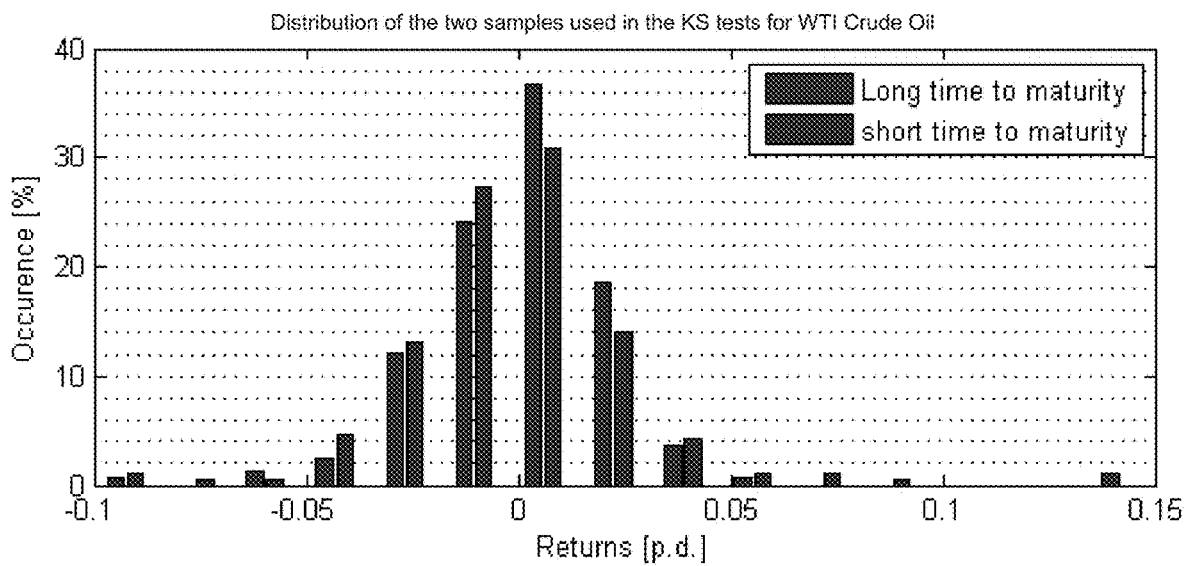

From this single-generic analysis (the first KS test), it is rejected that the two sets come from the same distributions only for two ICE products (Gasoil and Low Sulfur). For these two commodities, the short time-to-maturity distribution is characterized by 0-returns, as illustrated in FIG. 7. Inversely, the result of these tests means that for futures products associated with the other commodities there may be no significant time to maturity effect observable. FIG. 8 illustrates a similar result for WTI Crude Oil. Here the p-value is one of the smallest along with the ICE Brent (e.g., 15%)) among the set of commodities that are rejected in the KS test. The time-to-maturity effect in the rolling procedure may be statistically small and may predominate for two ICE futures (Gasoil and ULS). The main rational for the time series generator 230 to introduce a roll-ahead parameter for the rolling is to counteract effects resulting from the decaying correlations of the front month contract to the second month contract.

Figure 9:
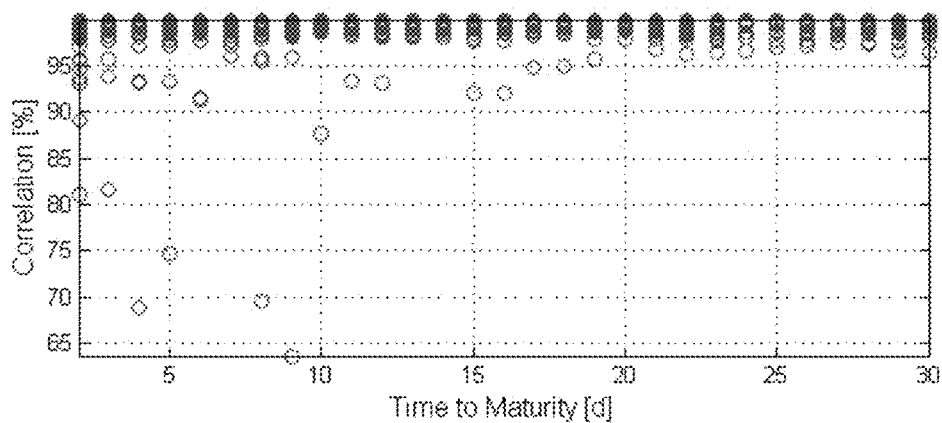
FIGS. 9-11 show illustrative log-return correlations of the front month contract to the second month contract using an exponential decay model for different financial products according to aspects of this disclosure.
Figure 10:
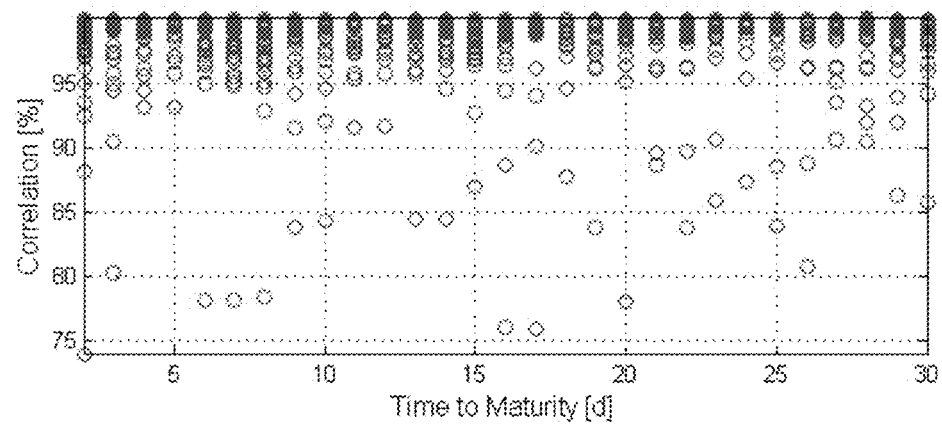
Figure 11:
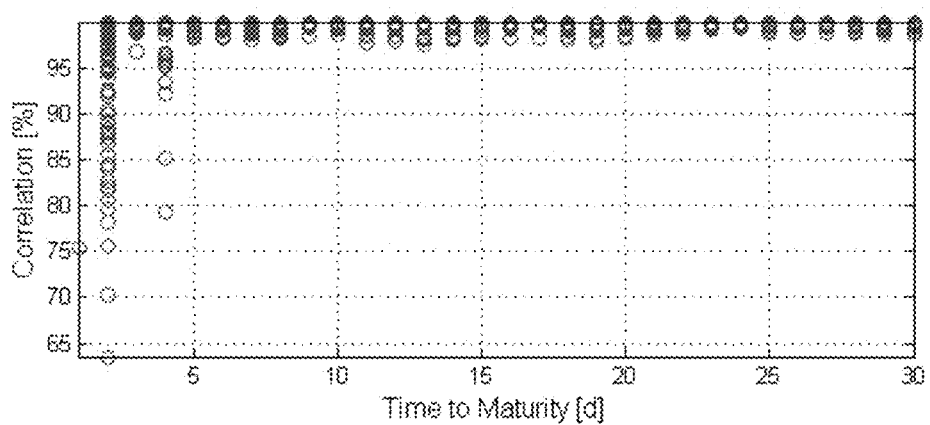

FIGS. 9 and 10 show illustrative log-return correlations of the front month contract to the second month contract using an exponential decay model for different financial products (e.g., crude oil and natural gas) according to aspects of this disclosure. For example FIG. 9 corresponds to exponentially weighted correlations (e.g., λ=0.9) of front to second month returns for a financial product associated with a first commodity (e.g., crude oil) and FIG. 10 corresponds to exponentially weighted correlations (e.g., λ=0.9) of front to second month returns for a financial product associated with a second commodity (e.g., natural gas). By analyzing (e.g., visual analysis, image analysis, pattern analysis, etc.) such log-return correlations, either as a set of information or as a graphical plot, one or more patterns may be identified. For example, a clear decay may be identified in correlation for financial products having very short maturities for different commodities (e.g., ICE gasoil, ICE ULS, WTI crude oil, and heating oil). Further, in some cases such as for ICE gasoil, a clear correlation break may be identified, as shown in FIG. 11. In some cases, no apparent change in correlations can be identified, such as in the cases for coal, ICE Brent, natural gas, gasoline and Gulf Coast sour.

In some cases, the time series generator 230 we may process heuristic arguments to determine a sensible roll-ahead period for use with the traded volume and/or open interest crossing time. FIG. 12 shows illustrative charts showing traded volume curves for 6 consecutive contracts associated with a particular commodity (e.g., WTI crude oil) and a distribution of crossing days for the front and second months contracts according to aspects of the disclosure. FIG. 13 shows illustrative charts showing open interest curves for 6 consecutive contracts associated with the same particular commodity (e.g., WTI crude oil) and a distribution of crossing days for the front and second month contracts according to aspects of the disclosure. In the illustrative example, FIGS. 12 and 13 illustrate the crossing days based on, respectively, the volume and open interests for the WTI crude oil. Here, the crossing time $t_c$ may be defined as the first day for which the indicator (e.g., volume, open interest, etc.) of the next contracts is larger than the current contract's indicator:

$$t_c(j) = \min_{t \le T_j} t \,\bigg|\, X_j(t) - X_{j+1}(t) < 0, \qquad (4)$$

where $t_c(j)$ is the crossing time for which the current j contract gets rolled with the next contract, and X denotes either the open interest or traded volume. Further, the parameter δ is determined by taking the difference with the expiration date of the current contract:

$$\delta(j) = T_j - t_c(j). \qquad (5)$$

The parameter may be expressed directly in business days. If the open interest or the traded volume does not cross during the considered month, i.e. the curve of the current month is below (or above) the curve of the next month, the value is not derived and is reported separately. A set of indicators on this measurements are displayed in FIG. 14 for the traded volume and in FIG. 15 for the open interest. In some cases, an analysis of one or more financial products (e.g., crude gulf sour (MB)) may not be possible due to minimal trading volume information available in the historical financial information database 260. Nobs: number of observations. It corresponds to the total number of curve intersection In some cases, the content for of the tables of FIGS. 14 and 15 may be defined as a number of observations ($N_{obs}$), that may correspond to the total number of curve intersections considered, (e.g., for which front month data was available). In some cases, $N_{obs}$ may include cases for which no crossing is observed on the front month. The number of observations for which a crossing is observed may be denoted as N. Median, mean and standard deviation may be derived directly from the extract of the parameter δ for all the $N_\delta$ intersections. In cases for which there are no crossings in the considered month, that particular month is not considered in any calculation of the median, mean or standard deviation. In some cases, the median, mean and/or standard deviation may be expressed in business days, thus limiting the maximum reported value to 21 days for monthly calculations. In some cases, coverage may be defined as the ratio of the number of observations for which a crossing could be measured by the total number of observations: coverage=$N_\delta/N_{obs}$ (6) and may be expressed as a percentage. In some cases, the mean number of intersections may indicate a number of crossings of the front and second month's curves are actually observed. For smooth curves like the ones shown in FIG. 13, only one crossing is observed, while for the traded volume curves more crossing may be identified, as shown in FIG. 12. $N_{below}$ corresponds to the "front month below" and may be defined as a number of curves for which the front month open interest or traded volume was always below the second month for any particular interval being analyzed. Similarly $N_{above}$ corresponds to the "front month above" and may be defined as a number of curves for which the front month open interest or traded volume was always above the second month for any particular interval being analyzed.

From an analysis on all commodities=, the traded volume may become highly volatile over the last days, making the measurement of the last crossing day difficult. For example, there can be more than one crossing of the curves during this time period. Conversely, the open interest curves may be more stable and their crossings may be easily predictable. In both cases, the distributions of the crossing days are right skewed with in some cases where no crossings may be observed for a full month. For example, this may be the case for illiquid products (e.g., coal) or when there is a strong seasonal pattern in the demand (natural gas, heating oil, etc.). To be robust with regards to this right skew the median of the distribution is proposed to retain only one roll-ahead by commodity. In some cases, several observations may be made based on an analysis of the tables and figures discussed above. However, in cases where minimal data is available, such as for gulf coast sour, no derivation of values may be possible. For example, the procedure can only be applied to the crossing of the front month and the second month. For longer generics maturities the time series of open interest and traded volume are likely to either not cross at all or to cross multiple times. Further, these indicators cannot be used for futures with a low liquidity like coal, for which the curves usually do not cross at all. For commodities with a strong seasonal component, the crossing of open interest may be complemented by a demand factor analysis to correct for structural higher or lower levels of supply, such as in a case concerning the storage levels of natural gas. In some cases, the crossing of the open interest curves may take place very early while the open interest of the front month still remains very high, as determined in a case analysis for ICE Brent as compared with WTI shown in FIG. 13 in which the open interest of the front month is in clear decline when the two curves meet. Finally, the numbers may differ significantly between the different liquid commodities, such as ICE Brent Crude and WTI Crude oil.

Having different roll-ahead parameters for different commodities would create major distortion of the inter-curve correlations. Moreover, obtaining the roll-ahead parameter using the indicator variables (e.g., traded volume and open interest, etc.) is difficult due to the unreliability of the curves for one or more reasons, including multiple crossing, no crossing at all in traded volume/open interest and/or the like. For these reasons, we may calibrate the roll-ahead based on the median crossing day of the open interest of crude oil (e.g., 7 days). Using roll-ahead for the generics has the advantage to provide a clean time-series without any short term maturity effects. However it also has the disadvantage to leave a few returns fully uncovered by the models (the so-called generic 0). Final backtests may be performed with a decrease roll-ahead parameter to assess how large the impact of the short time-to-maturity effect is once processed through all the steps. For instance, it could be captured and/or mitigated through the residuals of the PCA approach by the dimension reduction module 232, and thus not impacting the multi-curve results.

In some cases, the time series generator 230 may process instructions to construct the returns of generic future contracts utilizes interpolation of price times series $F_{Tj}(t)$. In some cases, the time series generator 230 may use one or more interpolation methods including linear interpolation, cubic spline interpolation, piecewise cubic hermite interpolation (PCHIP). As a first step, the time series generator 230 may retrieve historical information (e.g., pricing information) corresponding in maturity for a union of time points of the individual contracts of the financial products (e.g., futures) in question. Next, the time series generator 230 may interpolate to daily granularity in maturity. For example, for each time t, a data vector:

$$[F_{T_1}(t), \ldots, F_{T_{N(t)}}(t)] \tag{7}$$

may be used to determine an interpolating function $F_T(t)$, where T denotes a refined (daily) grid in maturity dates. From the interpolated forward curves (log) returns on the contract level may be computed using:

$$r_T(t) = \log(F_t(T)) - \log(F_{t-1}(T)). \tag{8}$$

The prices and returns are transformed from maturities of contracts to time-to-maturity (ttm) by:

$$\tau_j = T_j - t, \tag{9}$$

where $\tau_j$ is the time-to-maturity of contract j. Without extrapolation at the front end of the curve the anchor points in the time-to-maturity are set as follows: starting from smallest time-to-maturity for all observation dates (e.g., at the end of the front month) the time series generator locates an anchor point every 22 business days in maturity direction. Given a set of points $x_i$ and function values $y_i$, with i=1 . . . N, an interpolation method finds a smooth function graph f in between the grid points ($x_i$; $y_i$). The function f(x) is called the interpolating function for the data points ($x_i$; $y_i$). Unless more information on the desired function is known, such as an approximate analytical form, the time series generator 230 uses simple functional spaces to approximate the interpolating function. The most simple form is piecewise linear interpolation. The general form reads:

$$y = A|y_j + By_{j+1}, \tag{10}$$

where the coefficients are given by:

$$A = \frac{x_{j+1} - x}{x_{j+1} - x_j} \text{ and } B = 1 - A = \frac{x - x_j}{x_{j+1} - x_j}. \tag{11}$$

The piecewise linear interpolating function has vanishing second derivative and a discontinuous first derivative at the grid points. Because of the latter deficiencies a common alternative is interpolation using cubic polynomials. Both, the second and third interpolation method, capitalize on this approach. Cubic splines are locally (cubic) polynomials that are glued together at the grid points by continuity and smoothness constraints. The constraints include:

Interpolating function reproduces data points, $$f_i(x_i) = y_i, \tag{12}$$

$$f_i(x_{i+1}) = y_{i+1}, i = 1 \ldots N-1. \tag{13}$$

first derivative matches at grid points, and $$f_i'(x_{i+1}) = f_{i+1}'(x_{i+1}), i = 1 \ldots N-2 \tag{14}$$

second derivative matches at grid points.

$$f_i''(x_{i+1}) = f_{i+1}''(x_{i+1}), i = 1 \ldots N-2 \tag{15}$$

In particular, using cubic splines the interpolating function may be required to generate a continuous first and second derivative. There are $$4(N-1) - 2(N-1) - 2(N-2) = 2 \tag{16}$$

leftover degrees of freedom that are fixed by boundary conditions. We consider the not-a-knot boundary conditions for the cubic splines. Therefore the three data points close to the boundaries (e.g., (y1; y2; y3) and ($y_{N-2}$; $y_{N-1}$; $y_N$)) are each described by a cubic polynomial. This leads to a matching condition for the third derivative at the middle points:

$$f_1'''(x_2) = f_2'''(x_2), f_{N-2}'''(x_{N-1}) = f_{N-1}'''(x_{N-1}). \tag{17}$$

In comparison, PCHIP constrains the interpolating function in a first step such that the function and its first derivative are continuous. The time series generator 230 may uniquely determine the interpolation based on the data points $y_i$ and first derivative $y_i'$ at the knots. Besides the conditions (12) the time series generator 230 has for PCHIP:

$$f_i'(x_{i+1}) = f_{i+1}'(x_{i+1}) = y_{i+1}', i = 1 \ldots N-2, \tag{18}$$

$$f_1'(x_1) = y_1', \tag{19}$$

$$f_{N-1}'(x_N) = y_N', \tag{20}$$

The time series generator 230 may process an interpolation routine to estimate the first derivative from the data numerically and chooses the slopes at the knots such that the shape of the data and the monotonicity is retained. However, using PCHIP may cause the second derivative of the interpolant can be discontinuous. Generally, considering higher order polynomial interpolants is not useful as it leads to strongly fluctuating interpolating functions. In an illustrative example of liquid commodities (e.g. WTI crude oil), one or more of the discussed methods may produce satisfactory results. As such, a quantitative criterion for deciding which interpolation method would be most preferred may be used. Further, the stability and/or sensitivity of the interpolation against missing data should be assessed. To do so, we may test the stability of return distribution spreads between the first and/or second data points by comparing:

$$r(t) = (F_{\tau 2}(t) - F_{\tau 1}(t))/F_{\tau 1}(t), \tag{21}$$

where 1; 2 are the ttm of the first two prices at fixed observation time t, to $$\tilde{r}(t) = (\tilde{F}_{\tau 2} - F_{\tau 1})/F_{\tau 1}, \tag{22}$$

where $F_{\tau 2}$ is interpolated.

Figure 17:
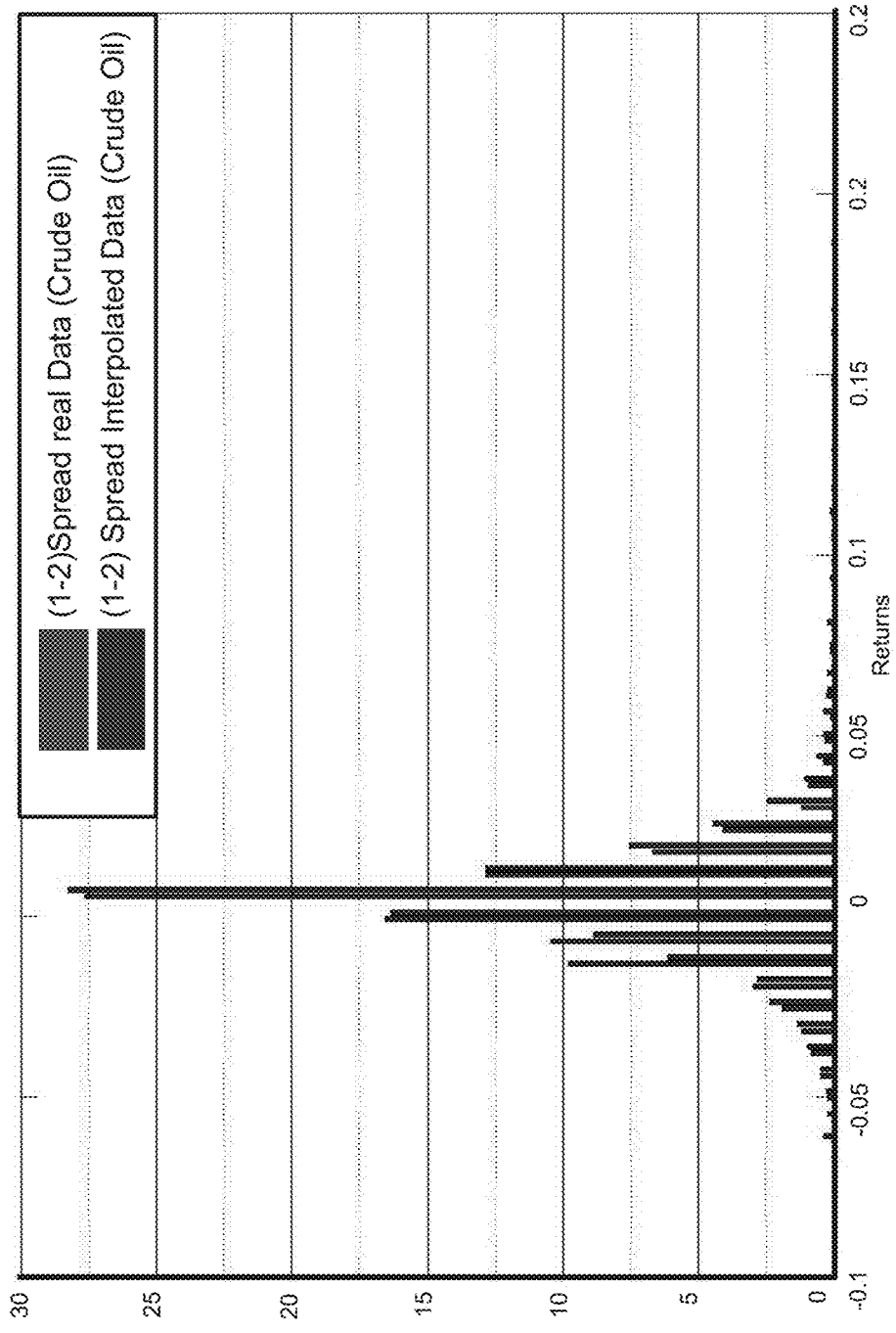
FIGS. 17-19 show illustrative histograms for the return distributions a plurality of interpolation methods according to aspects of this disclosure.
Figure 18:
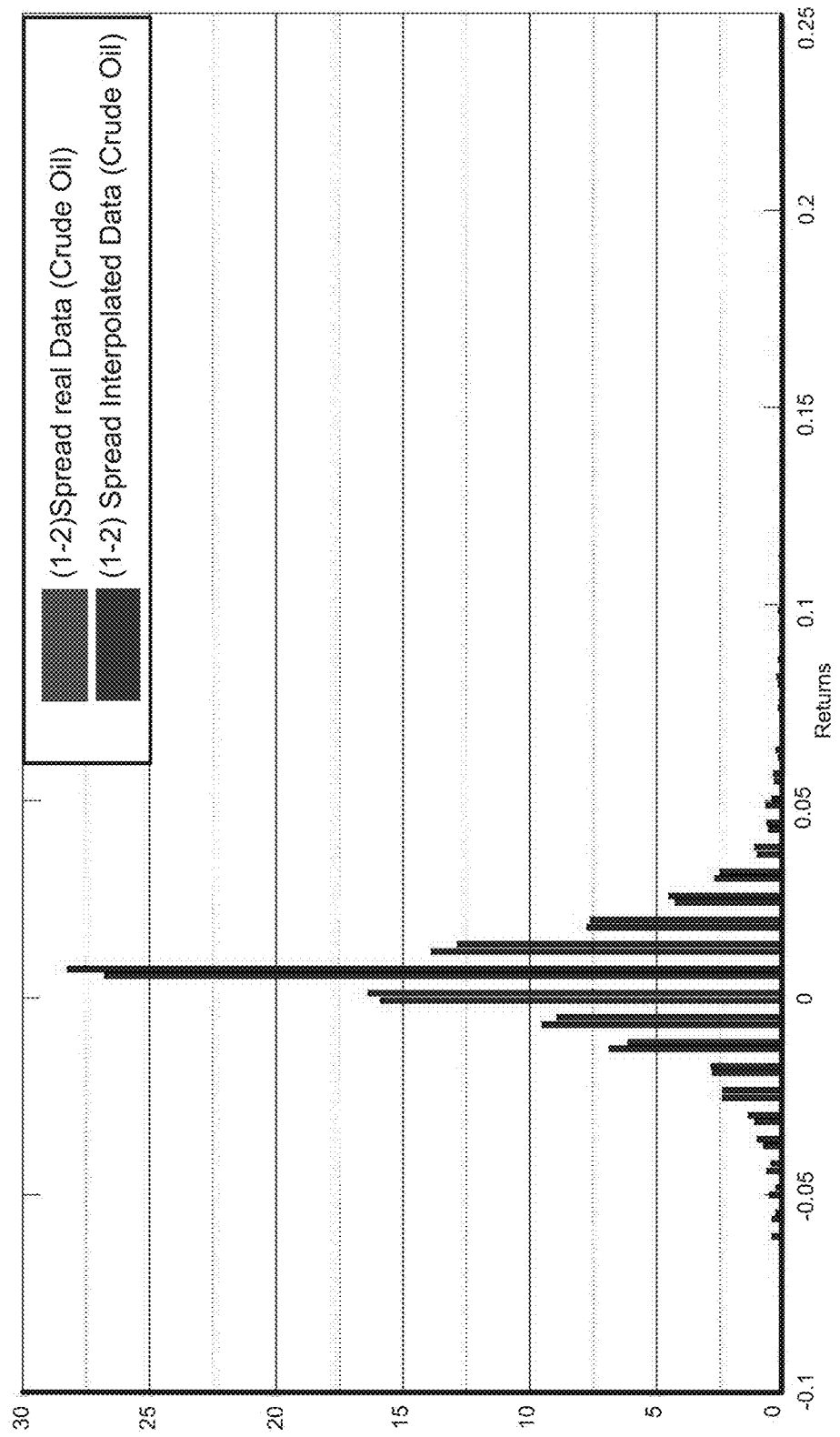
Figure 19:
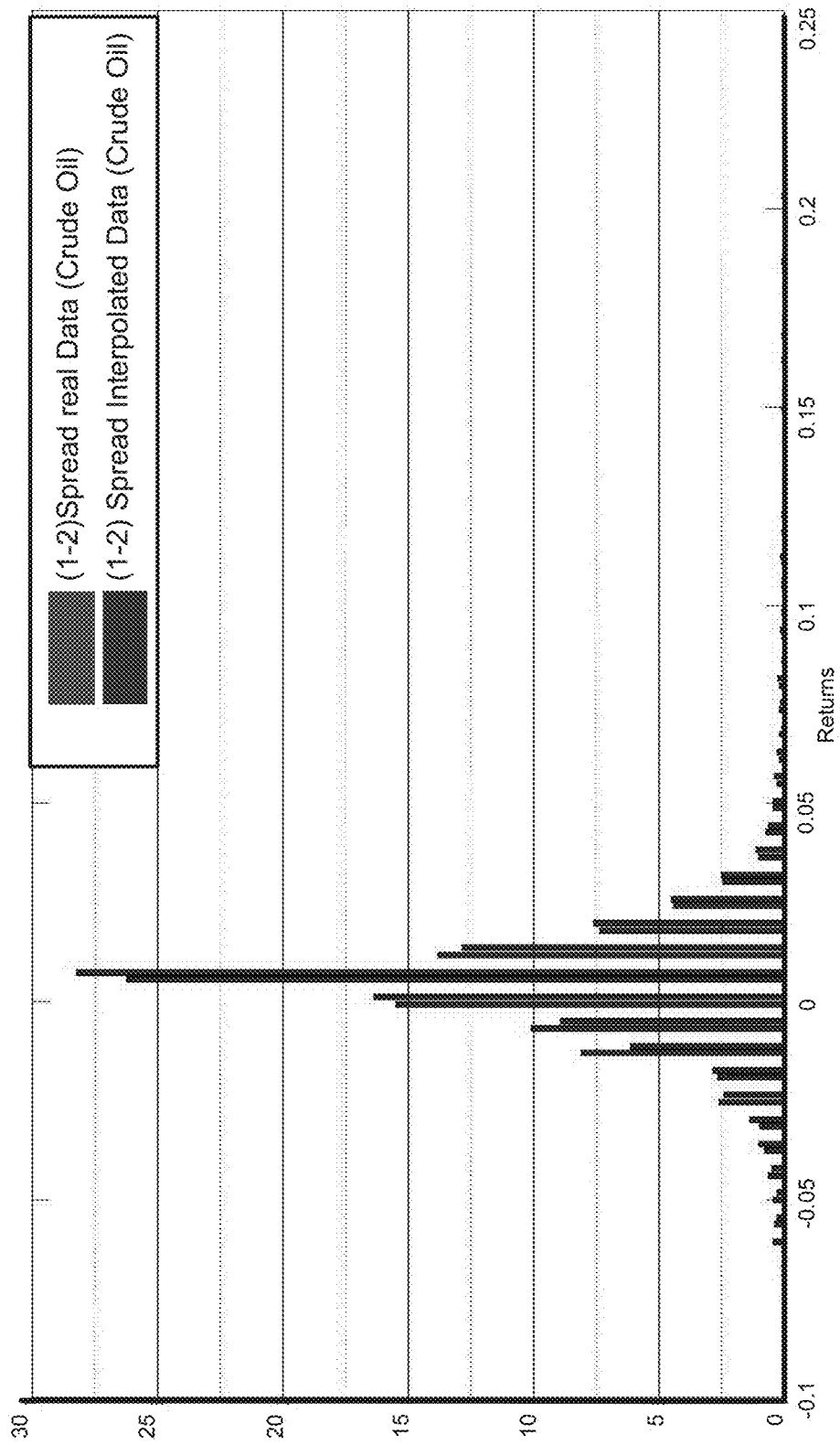

To process the test, we remove the second data point and repeat the interpolation on the reduced data set. Using the 2-sample Kolmogorov-Smirnov (KS) with significance level $\alpha = 0:05$ the hypothesis was tested as to whether the samples of spreads with genuine data and interpolated data points are drawn from the same distribution. Resulting from this, in addition to other findings, is the rejection of linear and PCHIP interpolation for at least crude oil. In these tests, the full set of available contracts with a starting date of Jan., 3, 2001 were used. The FIGS. 17-19 show the corresponding histograms for the return distributions all interpolation methods. For example, FIG. 17 shows a 1-2 data point spread (e.g., return) distribution of crude oil with linear interpolation, FIG. 18 shows 1-2 data point spread (e.g., return) distribution of crude oil with spline interpolation, and FIG. 19 shows 1-2 data point spread (e.g., return) distribution of crude oil with PCHIP interpolation. The p-values of the KS test are given in FIG. 16 as related to equations (21) and (22). As expected cubic splines and PCHIP are perform similarly, where differences between the two splines are observed especially where the removed point is a price maximum/minimum. Here, this result causes the rejection in the KS test for crude oil. Results for all commodities are presented in FIG. 20 which shows a result table for various commodities according to aspects of the disclosure. Here, fields that are shown to be marked (e.g., 'X') are rejected interpolation methods using the various KS tests and the blank fields are not rejected. The results for other illiquid commodities, like coal and golf coast sour, are inconclusive as all interpolations are rejected (or not rejected) according to the KS tests.

Figure 21:
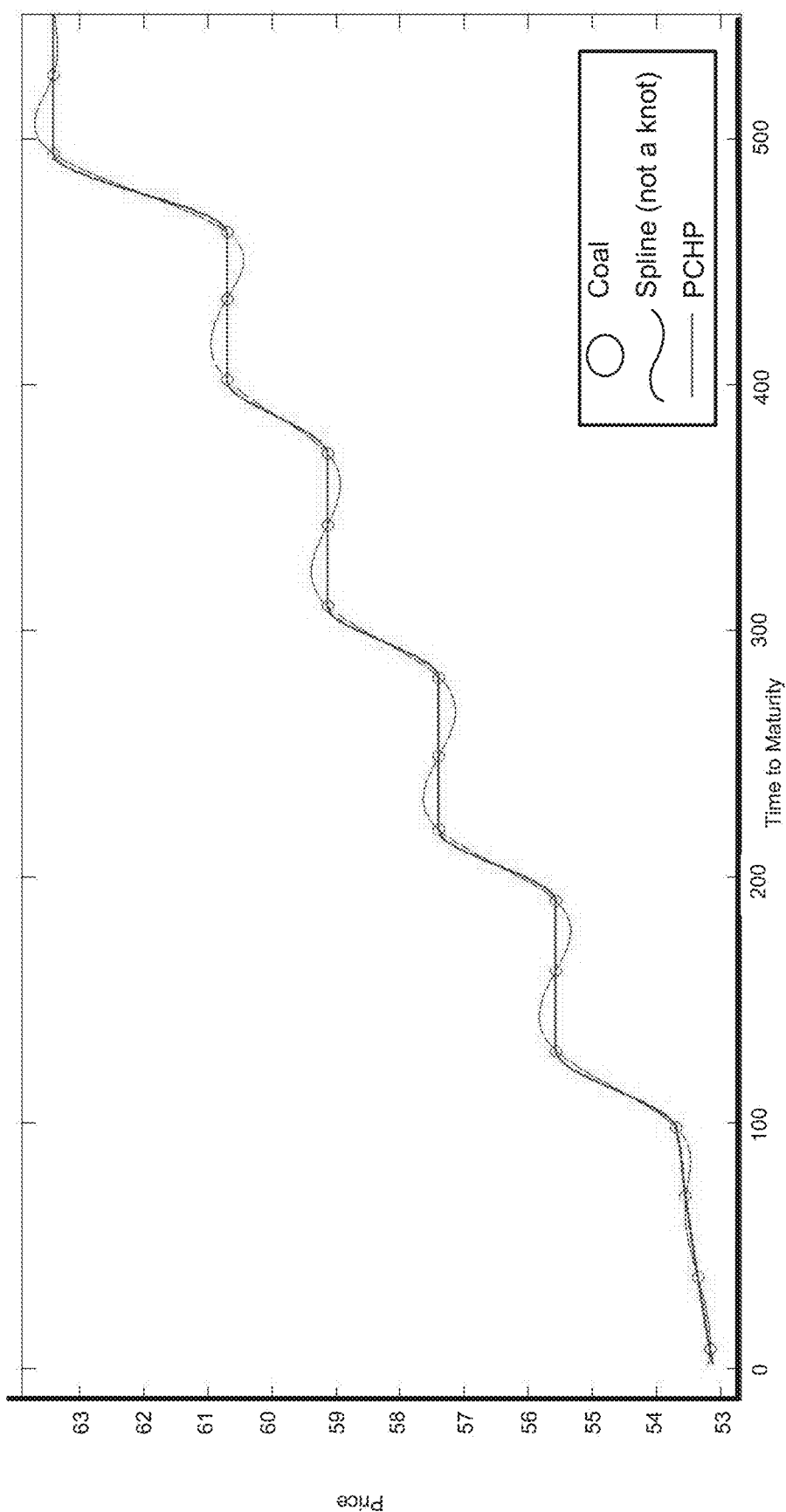
FIG. 21 shows illustrative chart showing an example for the performance of the spline interpolation and PCHIP for coal price data according to aspects of the disclosure.

FIG. 21 shows illustrative chart showing an example for the performance of the spline interpolation and PCHIP for coal price data. Visual control for specific dates favors PCHIP or linear interpolation because cubic splines (with 'not-a-knot' boundary conditions) may introduce more variance to the curve. The choice of interpolation method, however, does also depend on the settlement pricing of the considered products. For example, coal uses piecewise constant interpolation for settlement prices, which explains why cubic spline interpolation may not be a suitable method for coal futures.

For some commodities like coal the granularity of the maturity in the back-end of the futures curve decreases. Only specific contracts, such as June or December contracts may be available. To keep the granularity in maturity constant when rolling generics returns across the back-end of the PFC, the missing prices are constructed using an interpolation procedure. In some cases, the interpolation method that is best suited to the corresponding commodity may be choses. For example, cubic spline interpolation may be chosen for all but coal for which linear interpolation may be favored. The returns of the filled futures curve may be used to build the time series of generic contracts, such as by the time series generator 230.

In an illustrative example, the time series generator 230 may identify that in November 2013 the generic number 73 corresponds to the December 2019 contract and that at day $t_0$ that contract has to be rolled but the next available contracts are June 2020, December 2020, June 2021, and December 2021. The 73rd generic return at time $t_0+1$ may be determined by the time series generator 230 in the following steps:
1. interpolate the curves $$[F_{Dec2013}(t_0), \ldots, F_{Dec2019}(t_0), F_{Jun2020}(t_0), F_{Dec2020}(t_0), F_{Jun2021}(t_0), F_{Dec2021}(t_0)]$$

at the maturity January 2020, obtaining $F_{Jan2020}(t_0)$.
2. interpolate the curve $$[F_{Jan2014}(t_0+1), \ldots, F_{Dec2019}(t_0+1), F_{Jun2020}(t_0+1), F_{Dec2020}(t_0+1), F_{Jun2021}(t_0+1), F_{Dec2021}(t_0+1)] \quad (21)$$

at the maturity January 2020, obtaining $F_{Jan2020}(t_0+1)$
3. The returns at time $t_0$ and $t_0+1$ for the generic 73 are respectively $$R^{73}(t_0) = \log(F_{Dec2019}(t_0)) - \log(F_{Dec2019}(t_0-1)) \quad (22)$$

$$R^{73}(t_0+1) = \log(F_{Jan2020}(t_0+1)) - \log(F_{Jan2020}(t_0)) \quad (23)$$

In some cases, the back end of the curve may occur when the number of available contracts increases, particularly when little to no historical data may be available for the generics corresponding to these contracts. For in an illustrative example, new contracts for an entire year maturities may be listed in November and may correspond to the generics 61-72 in December. These generics may not have a full historical time series, since the length of the futures curve oscillates between 61-72 contracts. Reconstructing these data the curve length is extended to the fixed number of 72 by linear extrapolation of the available PFC curves. The generic returns may then be obtained from these extrapolated prices as for real contracts. The same procedure may be applied when the historical curves are shorter in specific time periods than the currently observed time period.

In some cases, the time series of different basic products start at different time points (see FIG. 4). For this reason we define an approach that allows us to build multi-curve models in such a way that longer time series data (possibly including very important period of crises) may be efficiently exploited. An effective extension is especially import for historical multivariate scaled innovations. Those innovations are scarcely populated, especially in the tails, but may be heavily used in the historical simulation step.

In some cases, products having shorter time series may be handled in different ways depending on the liquidity of the particular products. If the product is not liquid the shorter time series is problematic and therefore may be modeled independently from the other curves. As a result of the modeling, a margin for the problematic product $M_{\neg LP}$ with $\neg LP$ representing a non-liquid product. This ensures that jointly modeling the problematic curve with longer curves, does not relevantly deteriorate the model performance of the longer curves of more liquid products. The total margins for a portfolio containing the problematic curve among other products may then be obtained by adding the margin for the illiquid product to the margins of the remaining portfolio. Therefore the total margin is given by:

$$M_{tot} = M_{LP} + M_{\neg LP}. \quad (24)$$

This approach may be justified by the fact that illiquidity leads to price movements which are not observed in standard time series dynamics of liquid products. Capturing the dependence structure between illiquid products and liquid ones a sufficiently large data set is required. For illiquid products, with time series that does not satisfy the sufficient data requirement, this attempt could lead to spurious correlation effects. This, in turn, may decrease the needed margins in a unjustified way. Decoupling of the time series modeling and of the margin calculation is therefore a necessary step in the case of scarce data and low data quality.

When we have a short time series for a liquid product, a consideration remains regarding a situation that a product is only very recently traded. In that case a meaningful inter-curve dependence structure cannot be estimated and the product may be treated as being analogous to illiquid products. In all other cases a joint modeling and margin estimation procedure with longer time series curves is desirable. By assumption the length and the quality of the considered time series allow the estimation of the dependence structure of this curve with other products, on the period where all products are available. In particular, the dynamic of the co-variance matrix can be estimated and is used in filtering the multivariate returns. Furthermore, this implies the possibility to estimate higher order dependence effects which are generally assumed as static and left in the filtered innovations. The extension of the curves is only done at the levels of innovations to avoid reconstructed and/or extended returns biasing the dynamic model estimation.

For times series extension of scaled returns, N curves with returns $R_i^{(n)}$, where I labels the single futures on the curve and n may be assumed with starting dates of time series $S_n$ as ordered in ascending order), $n=1, \ldots, N$. At current time point $t_0$ we consider the following set of time series $$[R^{(1)}(|t), \ldots, R^{(n)}(t)], t \in [S_n, t_0], n=1, \ldots, N. \quad (25)$$

Figures 20, 22:
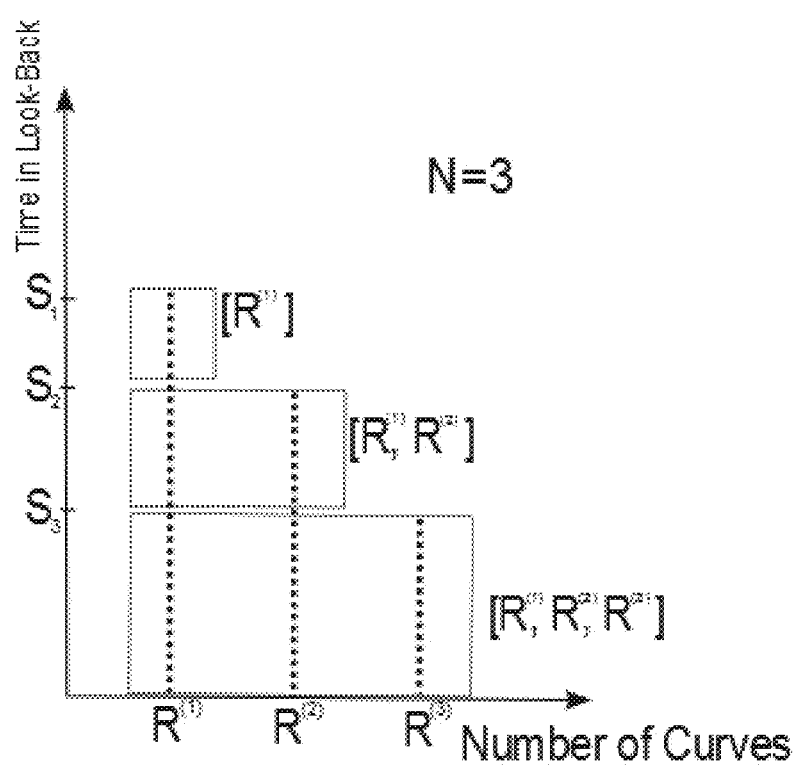
FIG. 20 shows an illustrative result table for various commodities according to aspects of the disclosure.
FIG. 22 illustrates a schematic explanation of the data input into the time series extension according to aspects of the disclosure.

We refer to the FIG. 22 for further illustration of the introduced notation. FIG. 22 shows an illustrative representation of a time series extension according to aspects of the disclosure. For example, FIG. 22 shows a representation of equation 25, where N=3 and the boxes indicate the set of return time series for different time intervals.

The same dimensional reduction and filtering procedure described below is applied to the return time series to get the variance and co-variance scaled scores UI (so-called uncorrelated innovations)

$$[UI^{(1,n)}(t), \ldots, UI^{(n,n)}(t)], t \in [S_n, t_0], n=1, \ldots, N, \quad (26)$$

where the second index in $UI^{(1,n)}(t)$ describes which set of returns has been used to estimate the correlation matrix. A multivariate student t-distribution $\tau(\mu, \Sigma, \upsilon)$ is calibrated to the data:

$$[UI^{(1,N)}(t), \ldots, UI^{(N,N)}(t)], t \in [S_N, t_0]. \quad (27)$$

using an expectation maximization (EM) procedure. By using the EM algorithm the time series generator 230 can iteratively determine the maximum log-likelihood estimate for parameters of a stochastic distribution. Here, the EM algorithm may be used to determine the parameters of the multivariate t-distribution, $(\mu, \Sigma, \upsilon)$. Taking the example of FIG. 22, $\mu$ is a 3×1 mean vector, $\Sigma$ is a 3×3 covariance matrix and $\upsilon$ is a scalar for the degrees of freedom. This distribution may be fitted on the period where all curve data are available, such as the largest set of return time series equation. (27). This describes the static dependence structure of the scores innovations and can be used to generate the missing data $UI^{(k,N)}(t)$ with $t \in [S1, \ldots, S_k-1]$ (compare FIG. 22). To this end the following conditional distribution formula may be used:

$$X_1 \mid X_2 \sim \tau(\mu_{1|2}, \Sigma_{1|2}, \nu_{1|2}), \quad (28)$$

$$\mu_{1|2} = \mu_1 + \Sigma_{12}\Sigma_{22}^{-1}(X_2 - \mu_2), \quad (29)$$

-continued $$v_{1|2} = v + dim(X_2), \quad (30)$$

$$\Sigma_{1|2} = \frac{v + (X_2 - \mu_2)\Sigma_{22}^{-1}(X_2 - \mu_2)}{v_{1|2}}(\Sigma_{11} - \Sigma_{12}\Sigma_{22}^{-1}\Sigma_{21}), \quad (31)$$

where $$|X_1, X_2| \sim \tau\left([\mu_1, \mu_2], \begin{bmatrix} \Sigma_{11} & \Sigma_{12} \\ \Sigma_{21} & \Sigma_{22} \end{bmatrix}, v\right) \quad (32)$$

hold.

In the present case we use (28) to generate simulated score innovation $$X_1 = [UI^k(t), \ldots, UI^N(t)] \quad (33)$$

for $t \in [S_{k-1}, S_k-1]$, conditional on the available data $$X_2 = [UI^{(1,k-1)}(t), \ldots, UI^{(k-1,k-1)}(t)] \quad (34)$$

for all $k = 2, \ldots, N$. Note that for the conditional distribution the parameters $$\mu_1, \mu_2, \Sigma_{11}, \Sigma_{12}, \Sigma_{21}, \Sigma_{22}, v \quad (35)$$

are obtained directly from the parameters $\mu$, $\Sigma$, $v$ of the multivariate student t-distribution that may be calibrated on $[S_N, t_0]$. Setting $UI^k(t) = UI^{(j,k-1)}(t)$ for $t \in [S_{k-1}, S_k-1]$ and $j \geq k$, results in the extended scores innovations $UI^k(t)$ for all curves k and the whole time range $t \in [S_1; t_0]$. In comparison, the error terms time series may be extended simply by bootstrapping historical errors for each curve independently.

Note that X1 and X2 may be collections of curves and the Equations (27) to (34) may be in general for a multi-curve case. Regarding the example the FIG. 11 there are two steps in the extension: first, $X_1 = [UI^3]$ for $[S_2; S_3-1]$ under the condition $X_2 = [UI^1; UI^2]$ and second, $X_1 = [UI^2; UI^3]$ is filled on $[S_1; S_2-1]$ under the condition $X_2 = [UI^1]$.

Figure 23:
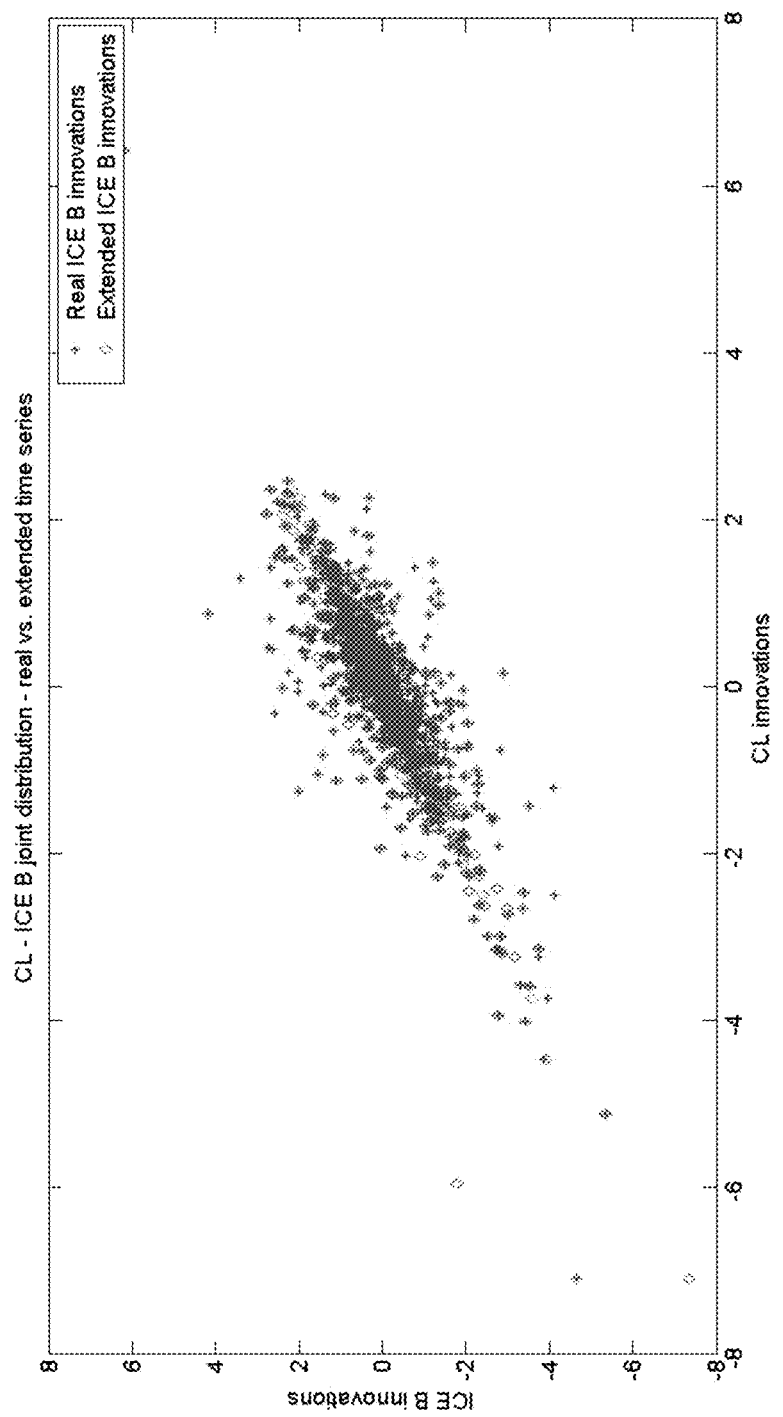
FIGS. 23-26 show illustrative charts showing plots of real versus extended volatility scaled price daily log returns of futures products according to aspects of the disclosure.
Figure 24:
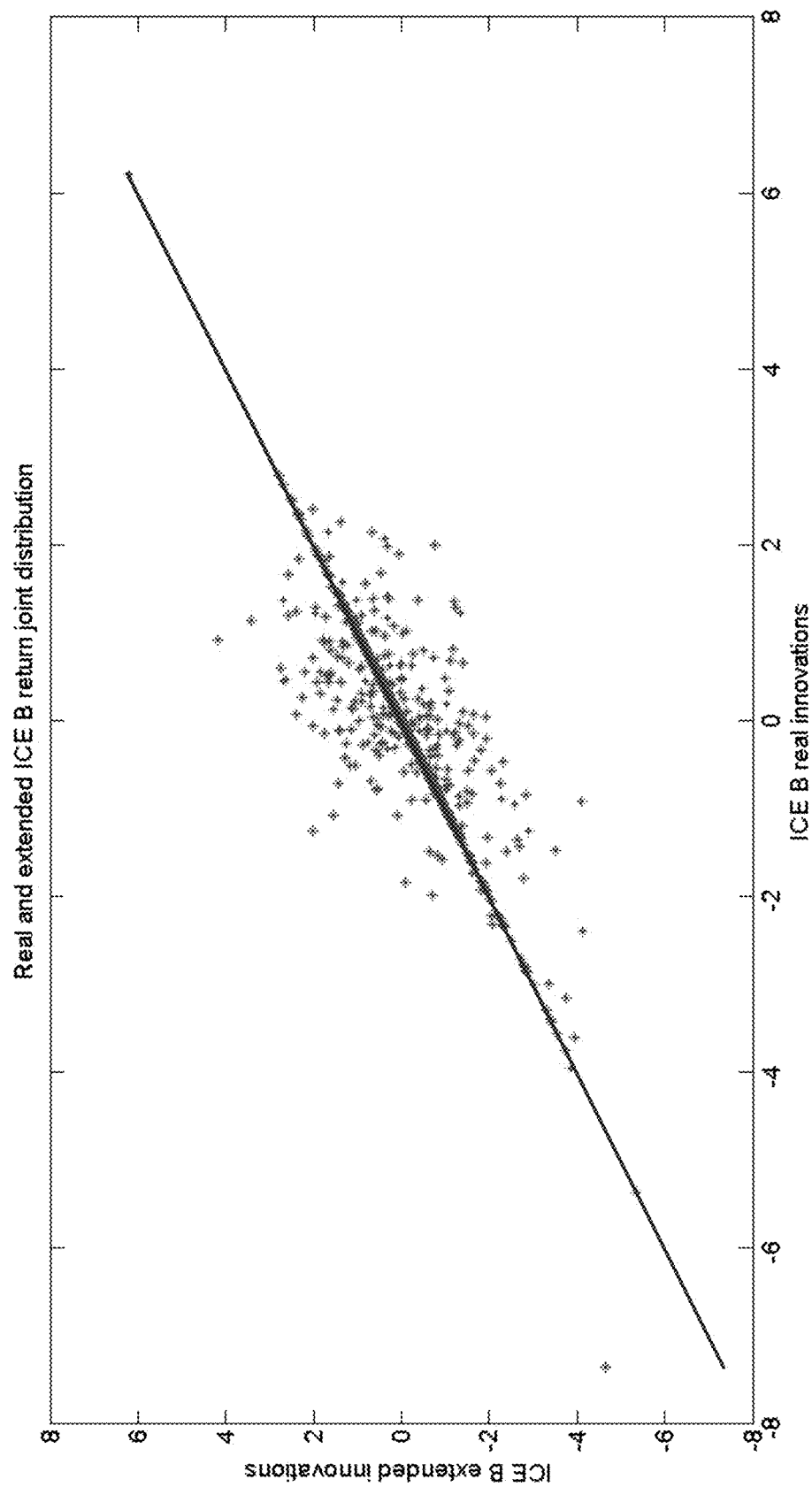
Figure 25:
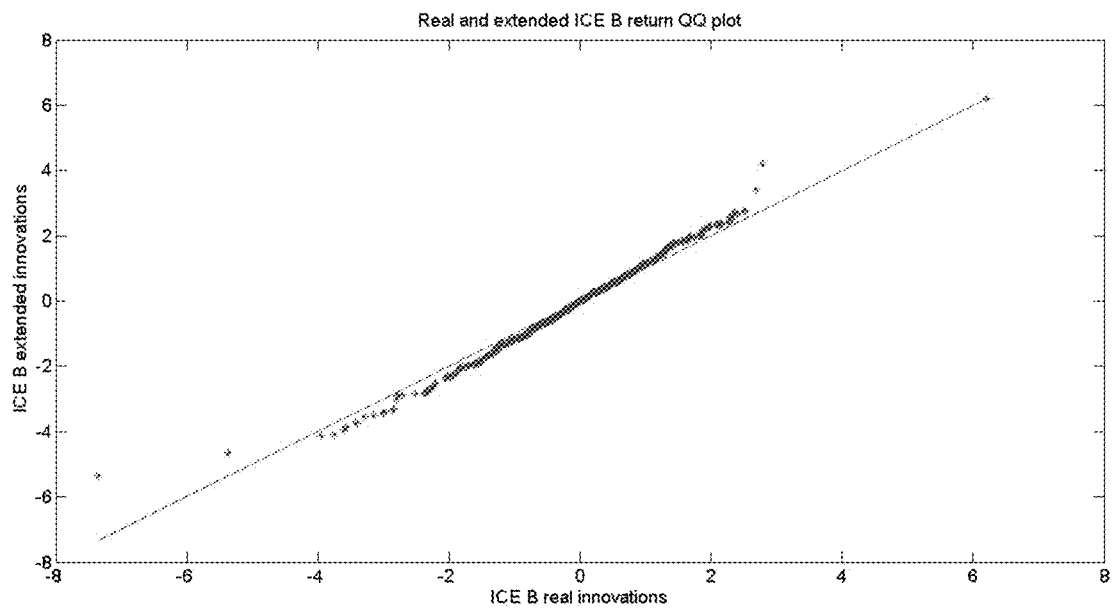
Figure 26:
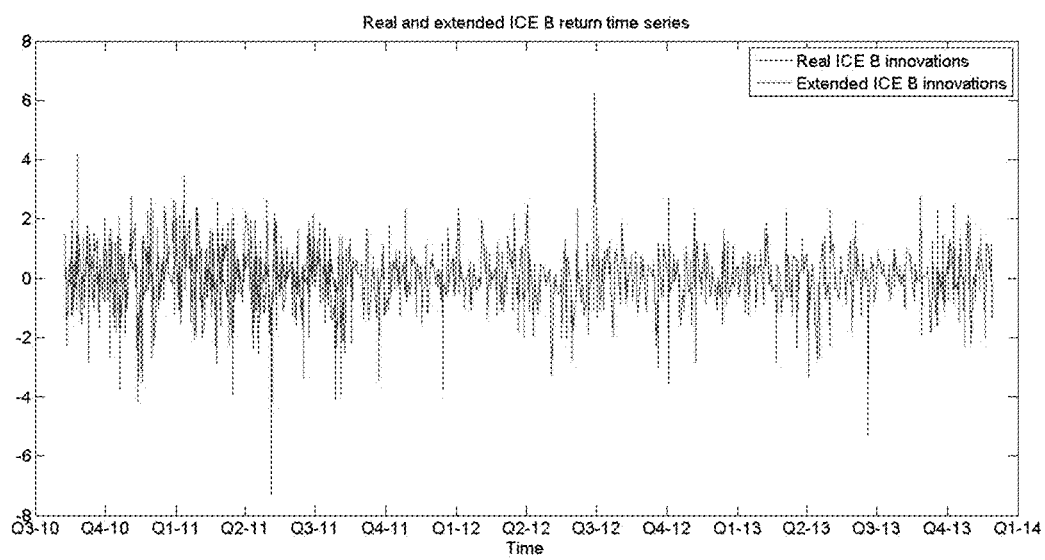

In an illustrative test case, the approach is tested on the volatility scaled WTI and ICE Brent returns for the period from 1 Jan. 2010 to 29 Nov. 2013. First we compute the volatility scaled return for the time period 9 Aug. 2010 to 29 Nov. 2013 based on the original time series with a burn-in period. Afterwards we artificially cut the ICE Brent return time series to 1 Jan. 2011 to 29 Nov. 2013 and calculate volatility scaled returns based on 9 Aug. 2011 to 29 Nov. 2013. Next, the cut time series may be extended with the described approach to the period 9 Aug. 2010 to 9 Aug. 2011. We then compare real innovations versus artificial innovations by overlapping the WTI-ICE Brent joint distribution as in FIG. 23 and FIG. 24 shows observed versus extended ICE Brent innovations time series, while FIG. 25 presents a QQ plot of the innovation distribution. The real and extended time series of ICE B innovations are given in FIG. 26. As shown, this approach, as implemented by the time series generator, allows time series extensions by roughly preserving the distributional properties of the considered time series. The time series, when created by the time series generator 230 may be stored in the one or more the memory devices 214 and/or the data repository 218

The dimension reduction module 232 may be communicatively coupled to the time series generator 230 and may process instructions stored in the one or more memory devices 214 to perform dimension reduction on the time series generated by the time series generator 230. In general, dimension reduction refers to the process of capturing the curve dynamics in a few factors instead of all generics as may be required in the context of the multi-curve model, which uses a matrix Cholesky decomposition for the dynamic correlation model. Note that the dimension reduction technique does not imply any loss of volatility, as the residuals (the omitted dimensions) are still considered in the single curve case. The only assumption made is that the correlation dynamic, at the multi-curve level, is described by a reduced set of factors. Three alternatives are investigated to decrease the dimensionality. For example, the orthogonal component, i.e. the PCA method, as determined by the dimension reduction module may allow for high reactivity and fast computation but may lack interpretability for illiquid commodities. A parametric model may allow the dimension reduction module 232 to control the forward shape of the dimension reduced time series, however parameter instability and/or auto-correlation of parameter changes may be experienced along with fit issues associated with the front month. A Benchmark model which directly models the generics may be simple, however this model does not include any dimension reduction and may be difficult, at best, for use on a multi-curve model.

The orthogonal curve model may be used for high correlations between the different generic contracts to achieve a significant dimensional reduction. Accounting for the short-term volatility dynamics, the orthogonal model is investigated for a covariance matrix C of the generic futures provided by an exponential weighting with decay $\lambda_{PCA}$:

$$C_{i,j} = \lambda_{PCA} C_{i,j}(t-1) + (1-\lambda_{PCA})(R_i(t) - \langle R \rangle(t))(R_j(t) - \langle R \rangle(t)), \quad (36)$$

where $R_i(t)$ is the log-return at time t of the generic future i. The EWMA estimate $\langle R \rangle(t)$ is derived as)

$$\langle R \rangle(t) = \lambda_{PCA} \langle R \rangle(t-1) + (1-\lambda_{PCA})R(t) \quad (37)$$

using the same $\lambda_{PCA}$ parameter as in equation (36). The estimated covariance is diagonalized $$C(t) = PC(t)\Lambda(t)PC^T(t), \quad (38)$$

where $\Lambda(t) = \text{diag}(\lambda_1(t), \ldots, \lambda_N(t))$ (in descending order) and $PC = [PC_1(t), \ldots, PC_N(t)]$ is an orthonormal matrix. The principle component (PC) matrix defines a rotation and this transformation is used to decompose the returns into uncorrelated components ("scores"). Using the PC matrix the kth score is defined as:

$$pc_k(t', t) = \sum_{j=1}^{N} PC_{jk}(t) \cdot R_j(t'), \quad (39)$$

where t' is the time indicator in the training window, while t is the derivation date of the PCs. Note that the scores can be rotated back, as will be done at the generic simulation step by the dimension reduction module 232:

$$R_i(t', t) = \sum_{k=1}^{N} PC_{ik}(t) \cdot pc_k(t'). \quad (40)$$

The dependencies on both time t and t' in the scores and returns are used to clearly track the time dependence of the PC matrix. A unique time dependence may be fixed to distinguish between updated and non-updated scores. For updated scores the PC transformation of the derivation day may be used by the dimension reduction module 232 to find the time series of the scores. For the non-updated scores the transformation matrix PC may be time-aligned with the time series of the scores. Note that for the transformation of the scores (and residuals) back to return space the most recent PCs are used in both, the update and non-update case. Considering the high correlations between the different contracts, we consider only the first n components explaining the majority of the dynamics. The share of explanation for each PC may be provided directly by the ratio of the individual eigenvalue $\Lambda$ $(t)_{kk}$ to the sum of the eigenvalues.

The returns $R_i(t')$ can then be re-expressed as $$R_i(t', t) = \sum_{k=1}^{n} PC_{ik}(t) \cdot pc_k(t') + \varepsilon_i(t'), \quad (41)$$

$$\varepsilon_i(t', t) = \sum_{k=n+1}^{N} PC_{ik}(t) \cdot pc_k(t'). \quad (42)$$

The quantities $\pounds_i$ are commonly known as compression error. This term is misleading in this context as these contributions are not dismissed in the returns. As later explained, distinguishing scores and errors are only important on the simulation level.

Figure 27:
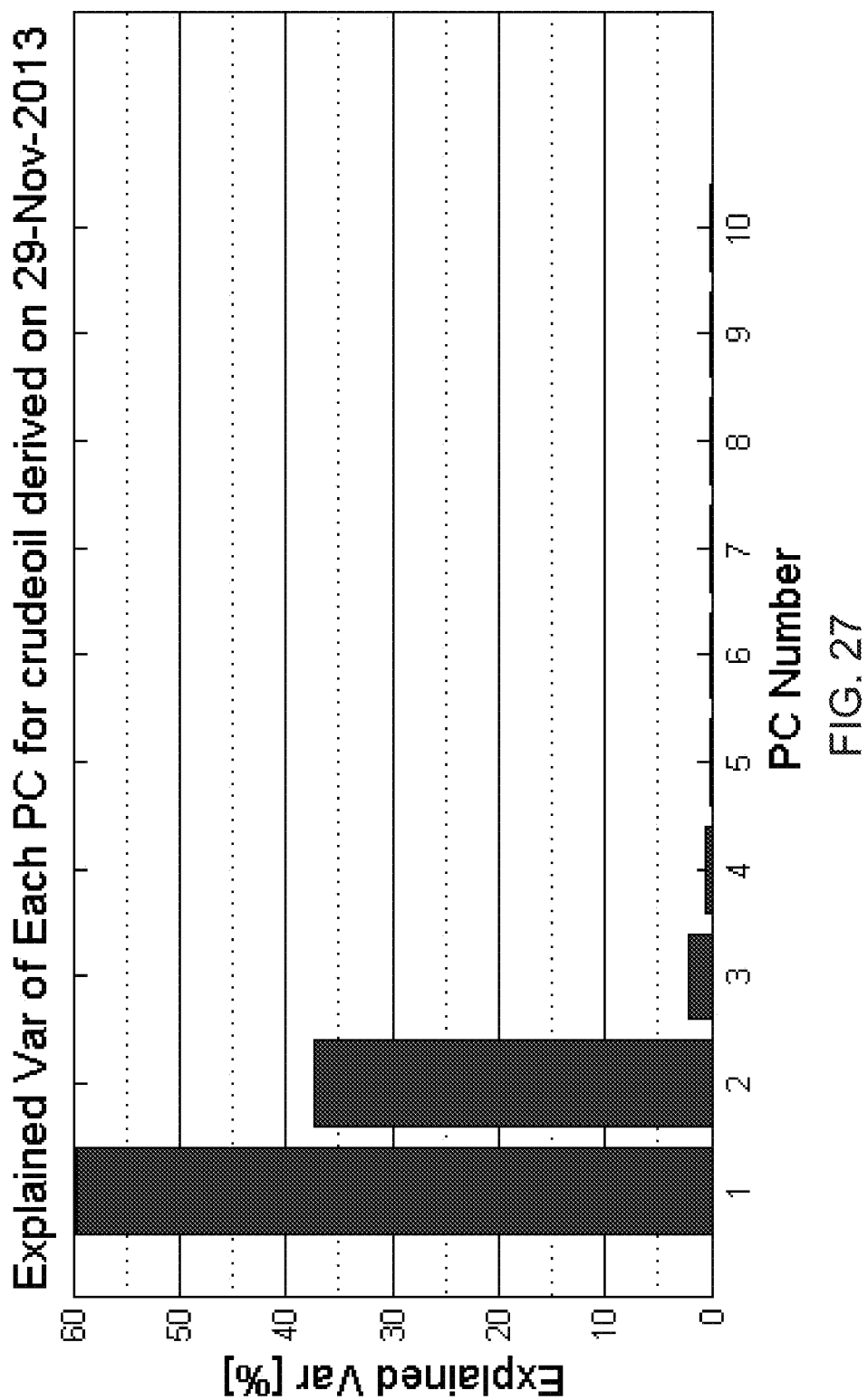
FIG. 27 shows an illustrative chart showing explained variance per principal component (PC) with Principal Component Analysis (PCA), a dimension reduction model using orthogonal components, for crude oil according aspects of the disclosure.
Figure 28:
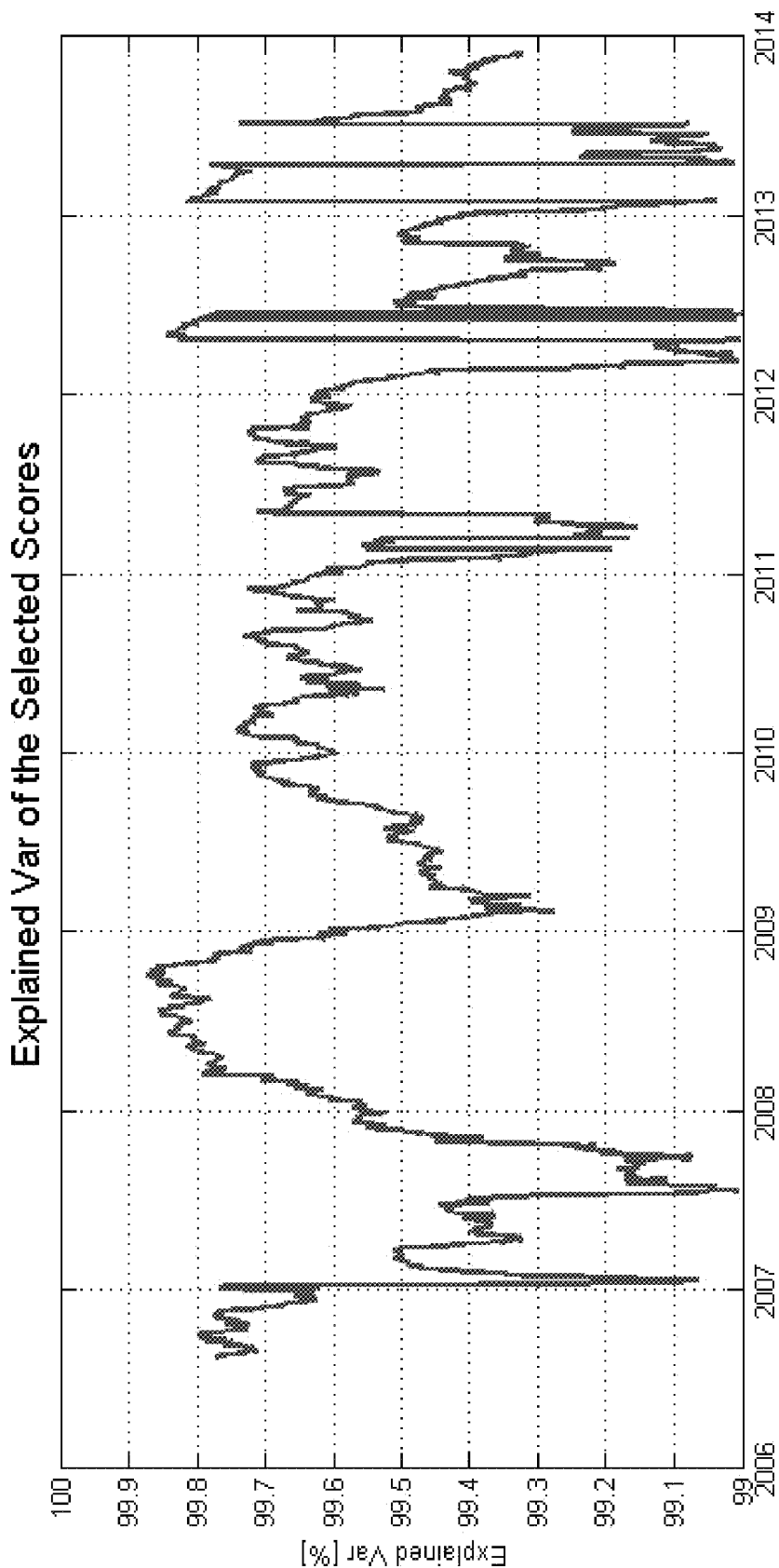
FIG. 28 shows an illustrative chart showing explained variance for a threshold selection criteria for a financial product according to aspects of the disclosure.
Figure 29:
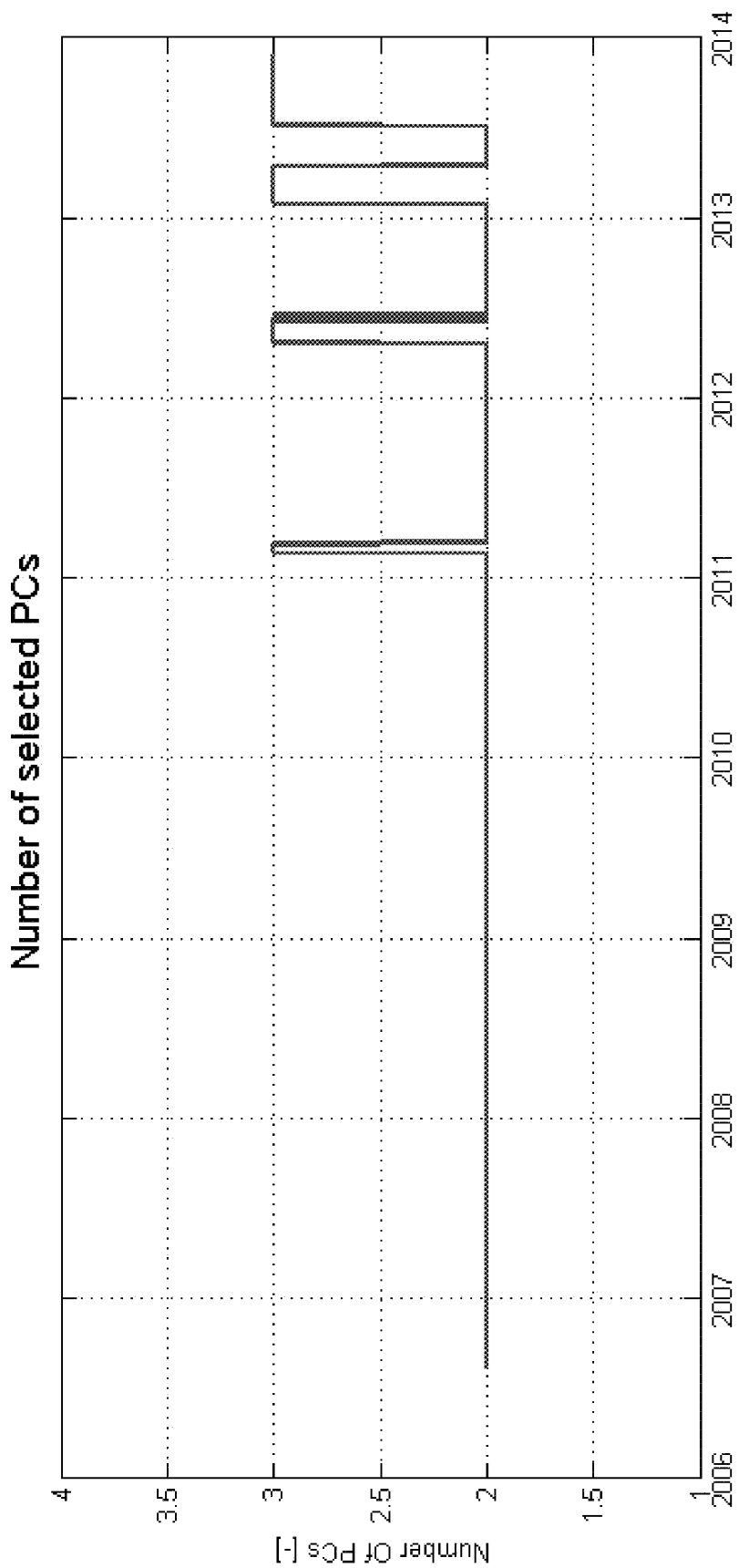
FIG. 29 shows an illustrative chart showing a number of selected PCs needed to reach the variance explained threshold for a financial product according to aspects of the disclosure.

FIG. 27 shows an illustrative chart showing explained variance per PC for crude oil according aspects of the disclosure. From a visual check, the explanation power of the different PCs is not distinguishable as of the 5$^{th}$ PC. FIG. 28 shows an illustrative chart showing explained variance for a 99% threshold selection criteria for a financial product using a covariance matrix estimated with a lambda of 0.98. The jumps correspond to the switch from 2 to 3 PCs. FIG. 29 shows an illustrative chart showing a number of selected PCs needed to reach the 99% variance explained threshold for crude oil and FIG. 30 shows explained variance using constantly three factors for crude oil.

The dimension reduction module 232 may determine an appropriate number of scores according to one or more selection processes. For example, a variance based selection may be used or a constant number of factors may be used. For a variance based selection, the number n of PCs selected is defined as the minimum number of scores needed to explain a given percentage of variance, usually 99%. The advantage of this approach is the direct control of the risk explained by the factors, relatively to the error term. The disadvantage is that the number of PCs may change in the course of time, thus creating discontinuity in the multi-curve correlation model for the non-updated case. A practical test case is provided in FIGS. 28 and 29, where the achieved level of variance explanation and the number of PCs selected are reported for crude oil. A maximum of 3 PCs are needed to explain this level of variance. The number of selected PCs fluctuates between 2 and 3 as of 2011. This result is reflected in FIG. 16, where the first two PCs sum up to 97%.

In some cases, the dimension reduction module 232 may receive a number of factors n from a user via a user interface, where the number of factors are fixed by the user. A usual estimate is 3. The estimate should be high enough to explain at least around 99% of the variance. The advantage of this approach is not only having a threshold level of explained risk, but also controlling the number of factors for the multi-curve model.

Figure 30:
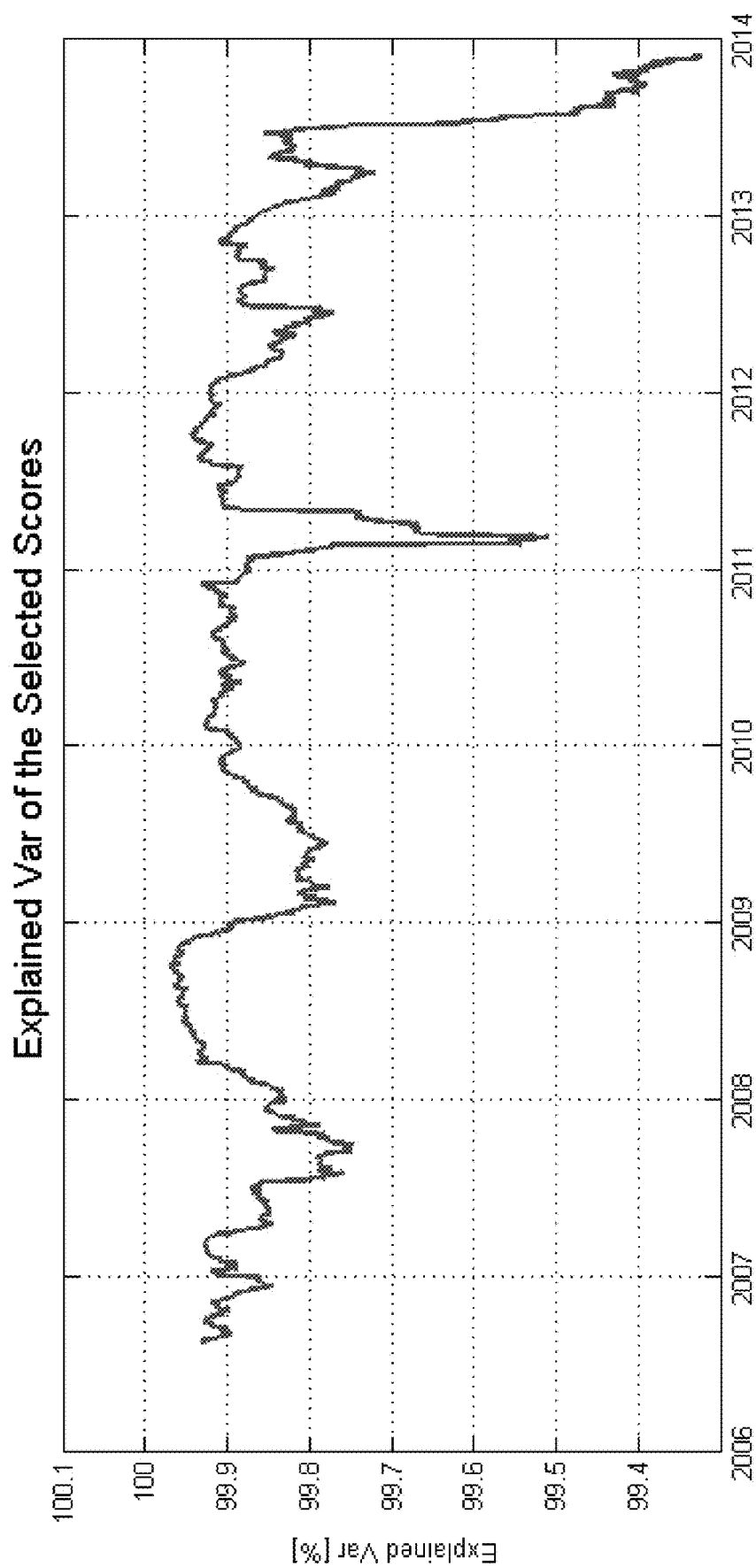
FIG. 30 shows an illustrative chart showing explained variance using constantly three factors for a financial product according to aspects of the disclosure.

An example is displayed in FIG. 30 for crude oil. As FIG. 30 indicates three factors are always enough to explain at least 99% of the curve for WTI crude oil. The proposed parameterization is to use a constant number of PCs, which would be monitored by commodities. If the share of explained variance falls below a threshold, the number of components would be increased. As a result one avoids a fluctuating number of PCs around an arbitrary value (in this example, 99%).

Figure 33:
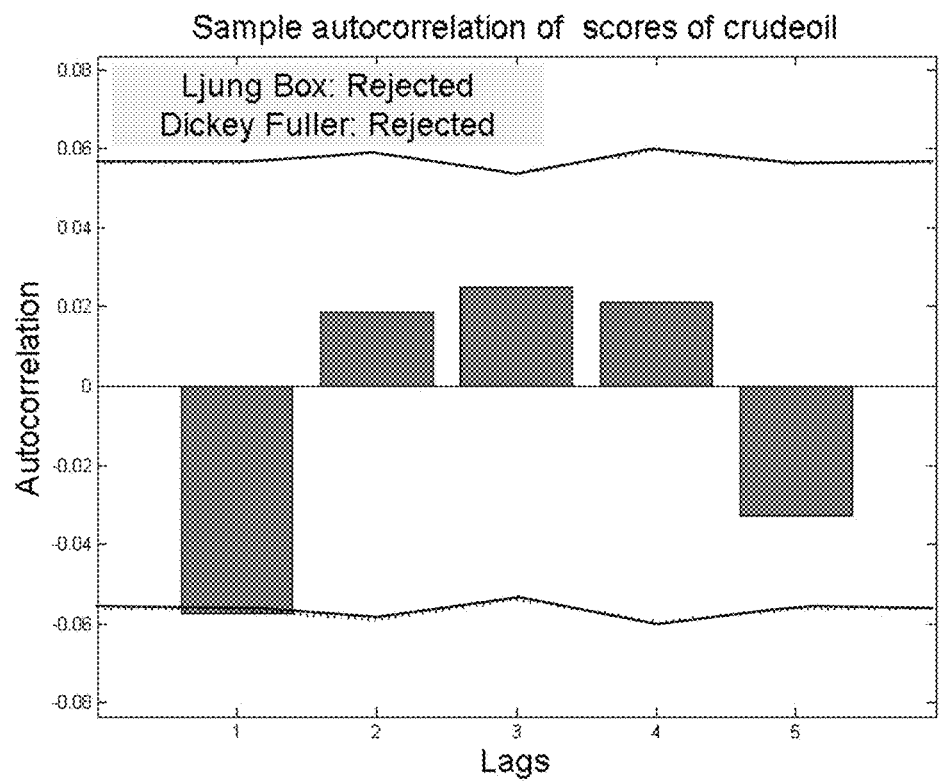
FIGS. 33 and 34 show illustrative charts showing the insignificance of the autocorrelation and the significance of volatility clustering of the selected PC scores for a financial product according to aspects of the disclosure.
Figure 34:
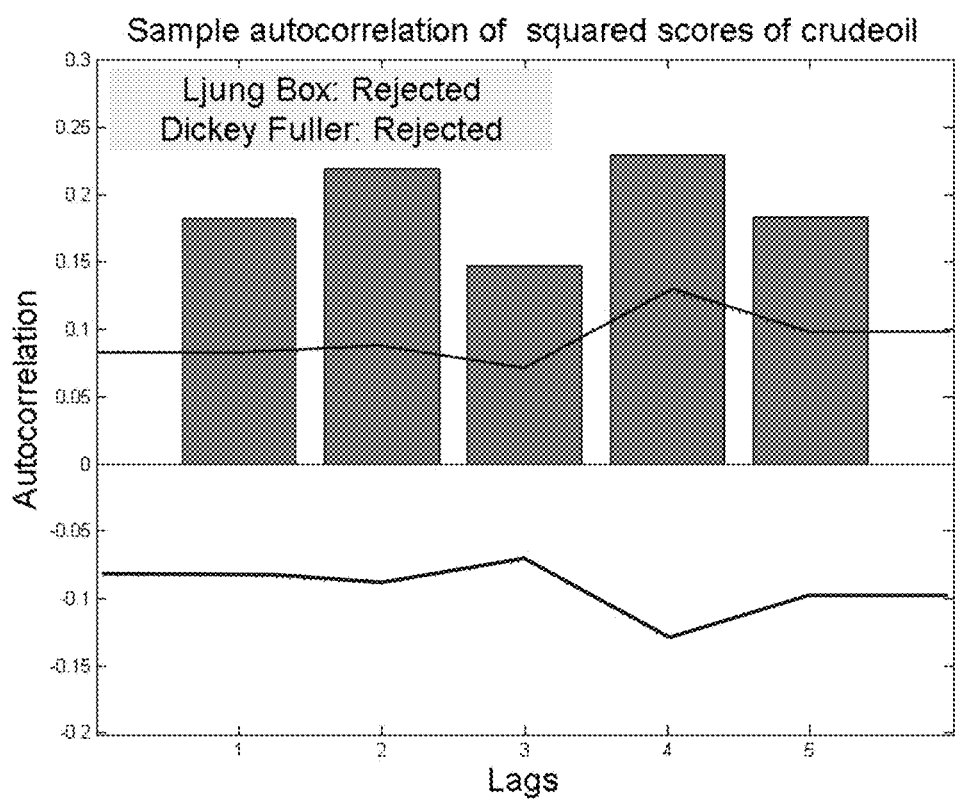

FIG. 31 represents the time-series of the leading three scores of crude oil using updated PCA. From a visual check, this time series exhibits volatility clustering and heavy tails, as does any financial time series. Since the PC vectors are orthonormal, the scale of the score time series gives a direct indication of each score's contribution to the total variance. FIGS. 33 to 34 illustrate and quantify this dynamics for crude oil. For example, FIG. 33 shows an autocorrelation of the first scores, in an updated setting, from a PCA on crude oil. FIG. 34 shows an autocorrelation of the first scores squared (in the updated setting) from a PCA on crude oil. The negative autocorrelation on the first PC may be translated into the mean-reversion feature of commodity prices, while the strong positive auto-correlation of the squared scores quantifies the volatility clustering. The volatility model chosen in the next section will require capturing this effect. FIG. 32 shows an illustrative table corresponding to visual inspection of PC surface stability for the different curves according to aspects of the invention.

Figure 35A:
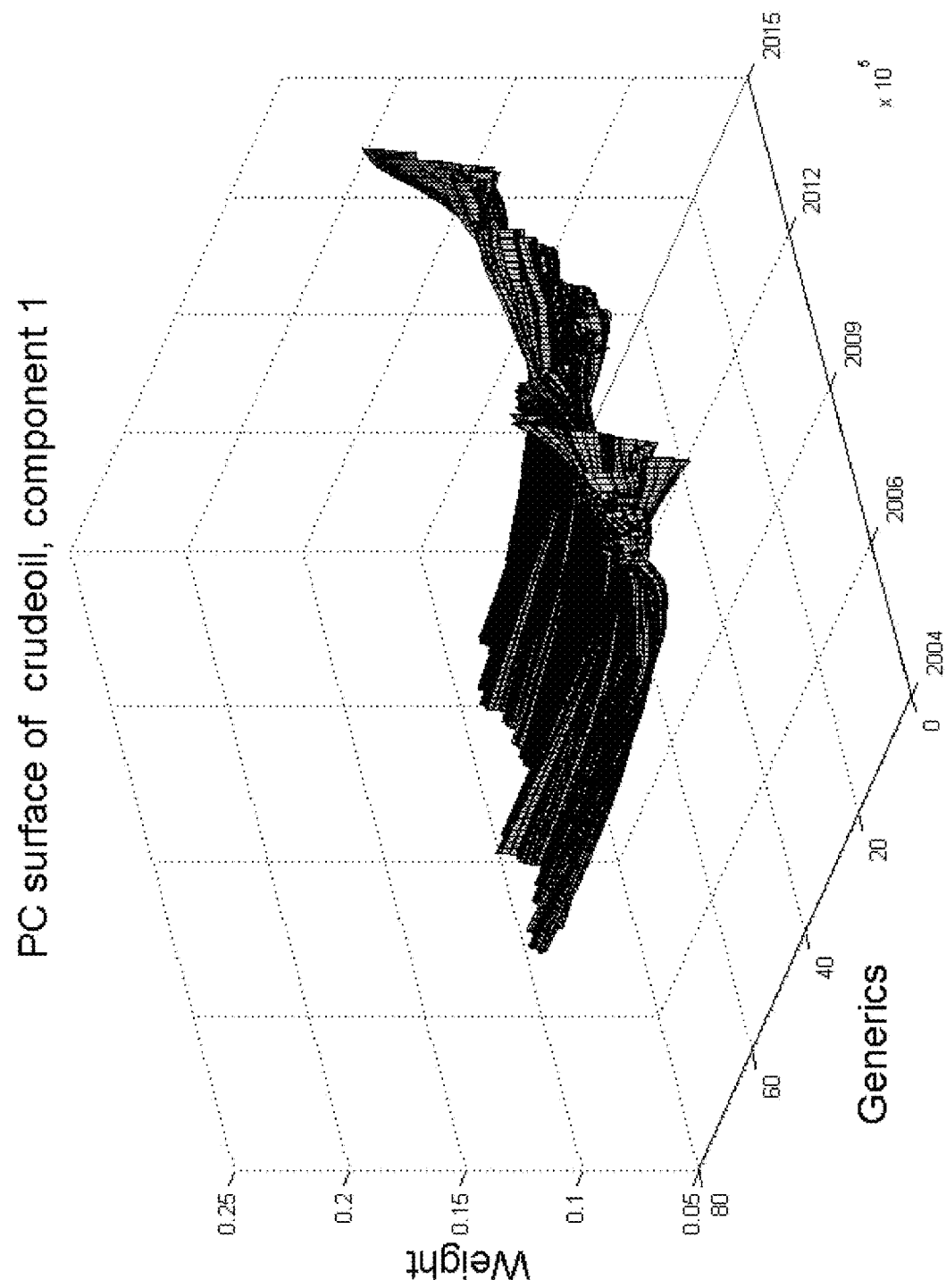
FIGS. 35A-35C show a visual representation of an inspection of PC surface stability for a plurality of curves according to aspects of the disclosure.
Figure 35B:
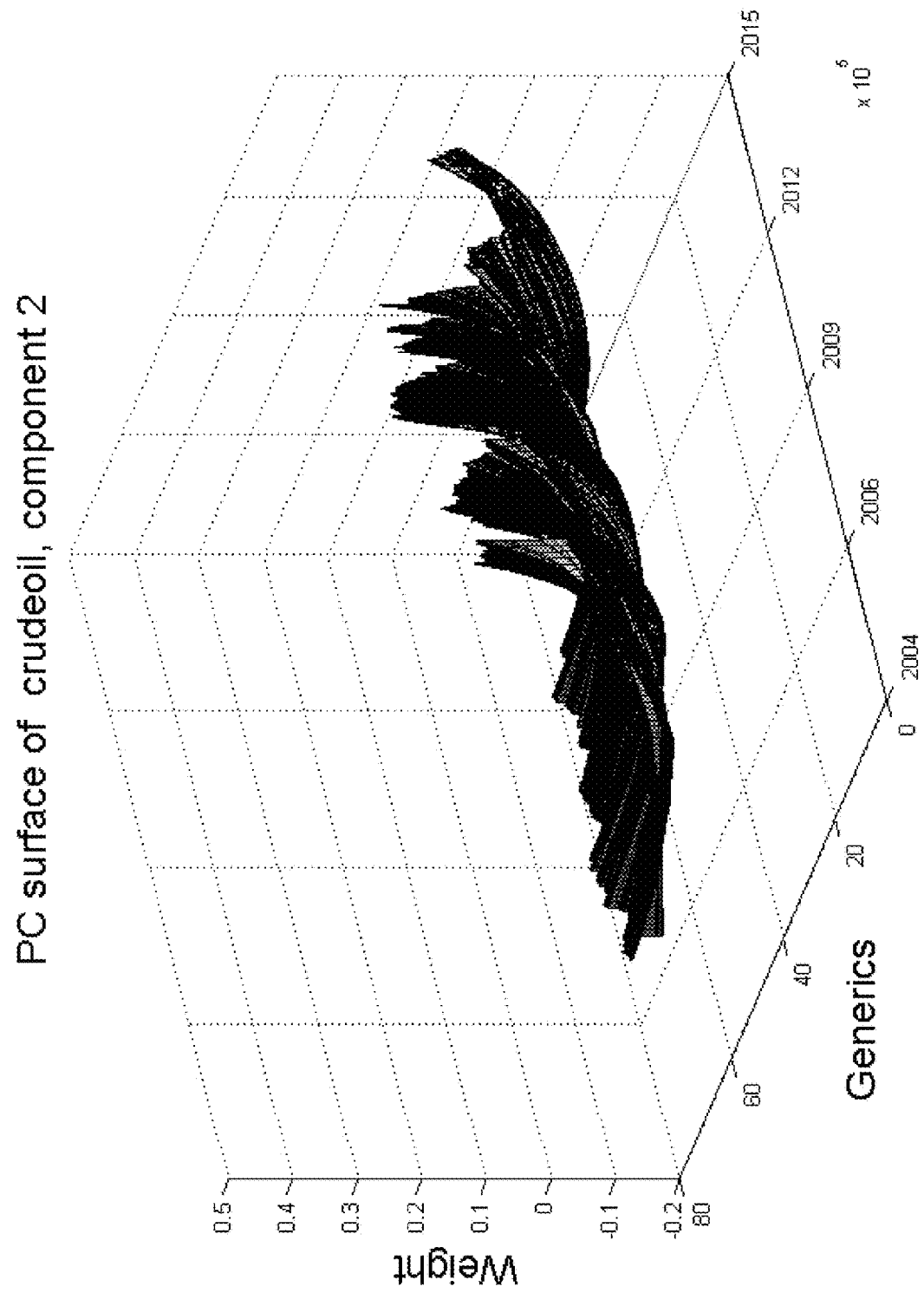
Figure 35C:
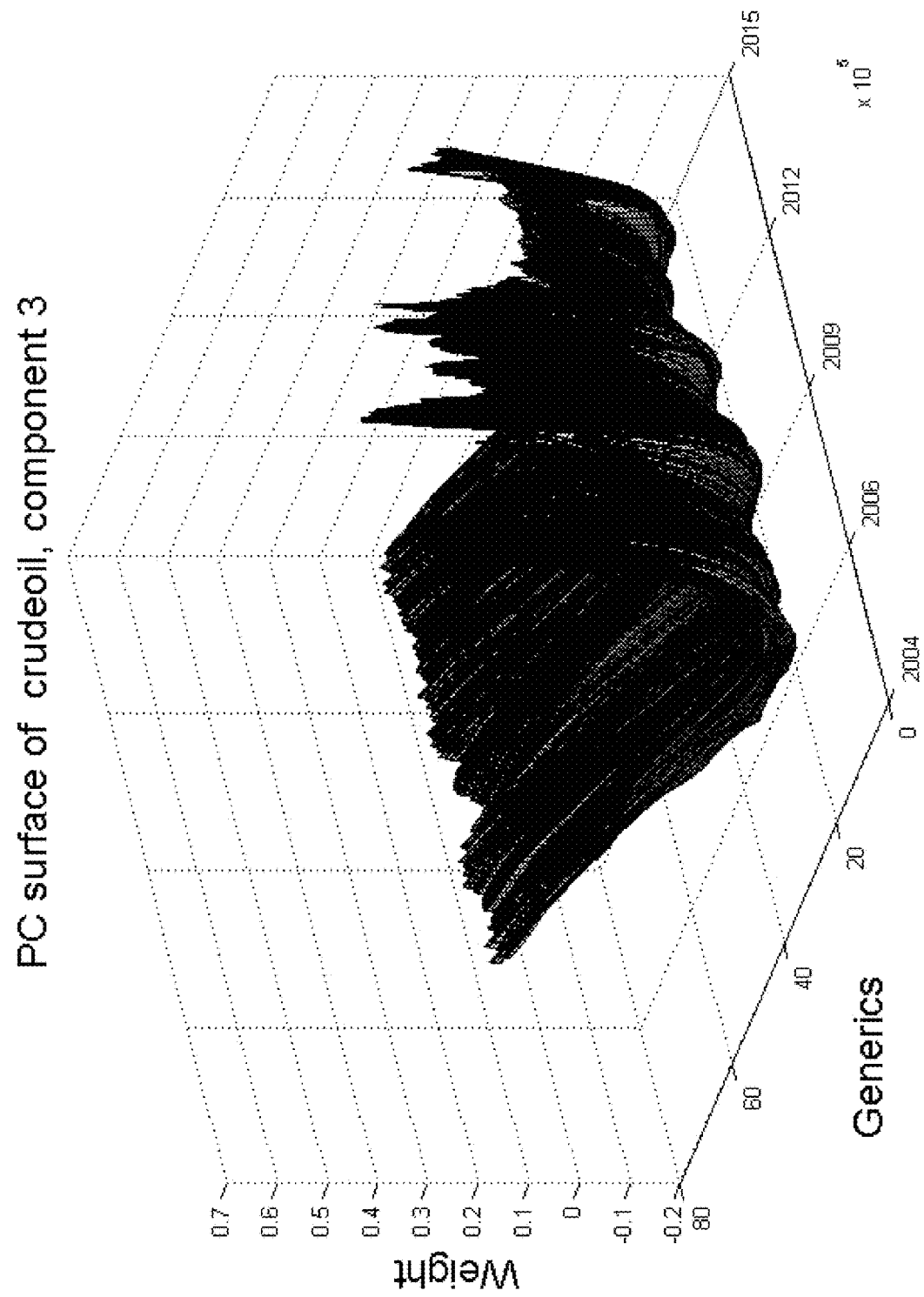

In some cases, the dimension reduction module 232 may identify a stable set of time series. For example, a core assumption behind the orthogonal component approach is that the PCs exhibit a certain stability characteristic. This feature is an important factor to have stable parameters of the multi-curve model, and for monitoring the update process of the scores volatility. Beyond that, this feature could prove useful in the context of injecting stress and risk views in the model. As a stylized fact, the first three PCs of a PCA on a forward surface (whether commodities or interest rates) usually yield respectively the level, the slope and the curvature. The first three PCs of WTI crude oil are represented by FIGS. 35A-C. Visually, the level, slope and curvature appear clearly. Importantly, the small decay in the level component illustrates a higher volatility in the front-end of the curve and is consistent with the Samuelson effect. FIGS. 35A-C show a visual representation of an inspection of PC surface stability for a plurality of curves according to aspects of the disclosure.

The dimension reduction module 232 may identify one or more orthogonal components associated with a time series. The orthogonal components are rotating the generic time series in an orthonormal space according to initial exponential decay used for the covariance matrix. The scores thus do not have a vanishing correlation between one another. Two approaches may be used by the dimension reduction module 232 to tackle this issue.

Figure 36:
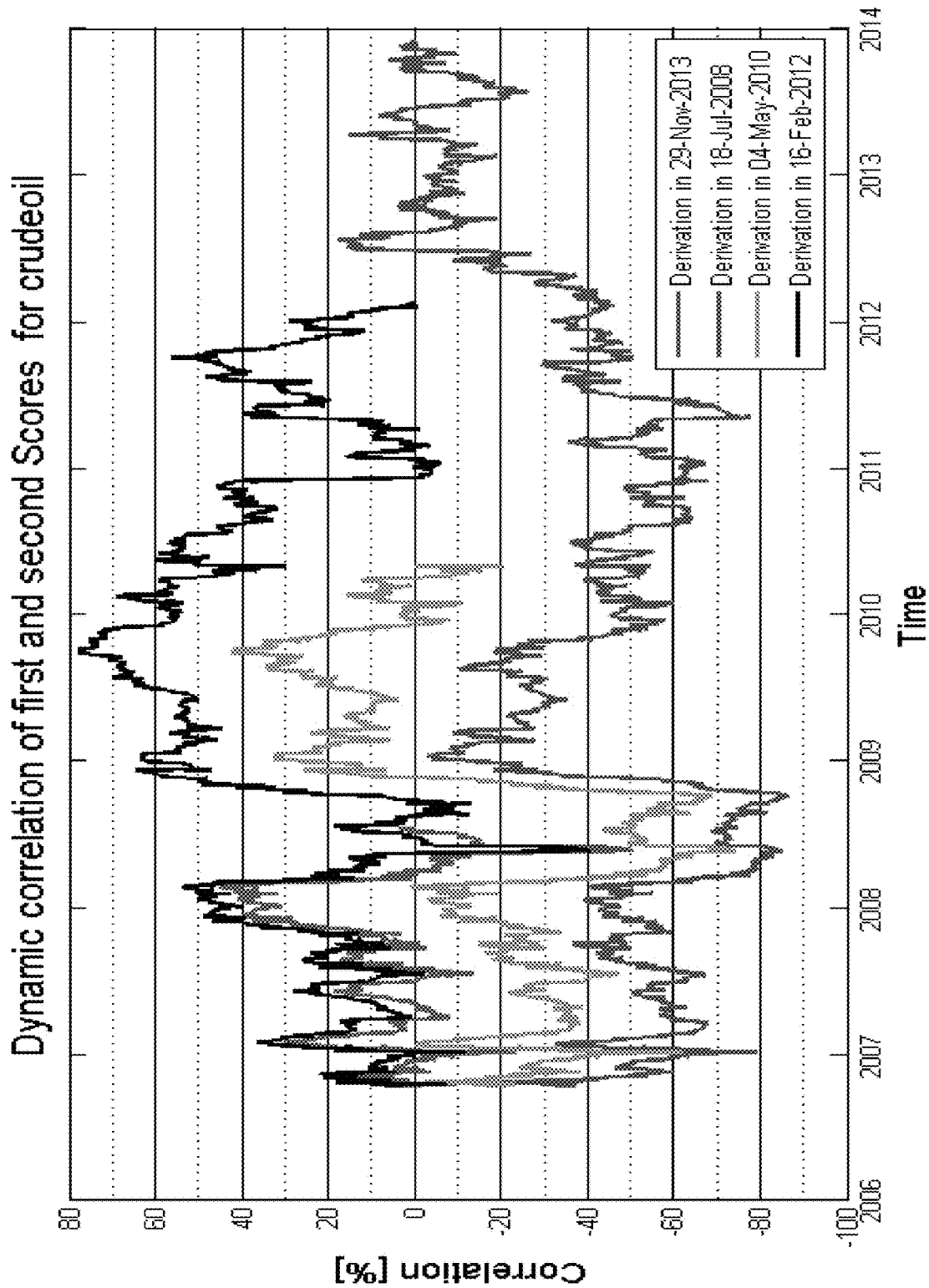
FIG. 36 shows an illustrative chart showing dynamic correlation between PC scores using updated PC associated with a financial product according to aspects of the disclosure.

The first approach may involve updating of the scores at every time-step, the full history of the scores is derived based on the latest orthonormal basis. The modified version of Eq. (39) therefore reads:

$$pc_k(t') = \sum_{j=1}^{N} PC_{jk}(t) \cdot R_j(t'), \quad (43)$$

where t is fixed to the end of the time series, i.e. t'<t. The update setting of the PC analysis is favored when the correlation structure is strongly changing over time and the assumption of stable orthogonal components is not justified. For the first two scores $pc_1(t')$ and $pc_2(t')$ the dynamic correlation may be estimated using equation (36) with $\lambda=0.97$. We normalize the covariance following $$p_{12} = \frac{\text{Cov}(pc_1, pc_2)}{\sqrt{\text{Cov}(pc_1, pc_1)} \sqrt{\text{Cov}(pc_2, pc_2)}} \quad (44)$$

to obtain the dynamical correlation. The derivation date of the PCs between may vary between 2008 and 2013. For time-steps far in history with regards to the derivation date, the local dynamic correlation of equation (44) can be very different from zero. FIG. 36 illustrates this effect. The scores, rotated with the covariance matrix derived in November 2013, get a strong negative correlation in 2007. The interpretation of this negative correlation with regards to the PCs of November 2013 is complex, and can combine for instance a different intensity of the Samuelson effect with a different dynamic of the second component (inversion of the curve slope). FIG. 36 shows an illustrative chart showing dynamic correlation of time series scores associated with a financial product according to aspects of the disclosure.

In some cases, the dimension reduction module 232 may be configured not to update any scores for the time series. The alternative to the full update of the history of the scores is to keep the historical projections in time. Practically, Equation (39) becomes:

$$pc_k(t') = \sum_{j=1}^{N} PC_{jk}(t') \cdot R_2(t'). \quad (45)$$

Figure 37:
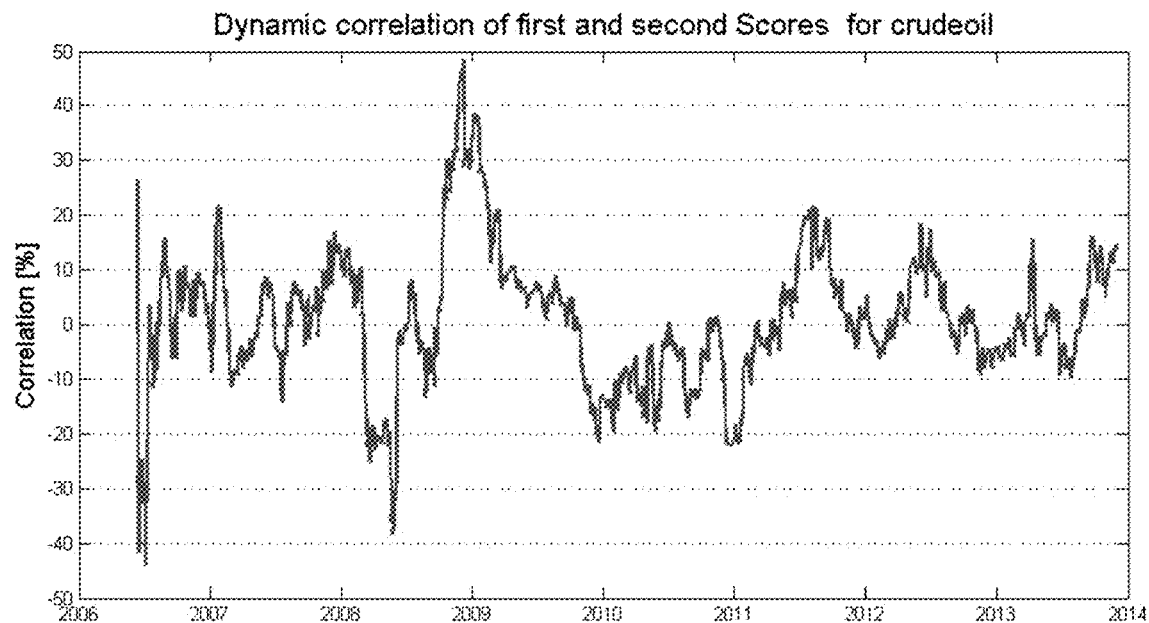
FIG. 37 shows an illustrative chart showing dynamic correlation between PC scores using non-updated PC corresponding to a financial product according to aspects of the disclosure.

The historical transformation vectors $PC_{jk}(t')$ are used instead of the derivation date vectors $PC_{jk}(t)$. The resulting correlations (computed using Equation (44)) may fluctuate between about 50% and about −50%, with peaks around the financial crisis, indicating that locally the correlation structure changed significantly. For example, FIG. 37 shows a dynamic correlation of the first and second scores in the no-update case for crude oil using a covariance matrix derived with a lambda 0.98. Further, when contrasted with FIG. 35 there is no need to represent different derivation dates as they would lead to a same curve.

The basic assumption behind the no-update case is that the correlation between the scores is small enough to allow to be considered as uncorrelated. Even in regimes showing dynamical correlation the no update procedure can be advantageous since it results in less fluctuating scores. The gained stability of the scores can possibly lead to more stable (and satisfactory in terms of VaR coverage and clustering) margins as compared to the update procedure. Note that if the correlation structure is very stable, i.e. the dynamical correlation between scores is small, the update and non-update procedure lead to similar results for the scores. In this case the latter procedure may be used for computational reasons. The advantage of the no-update procedure is that only the last point is added to an existing set of scores, thus making the calculation extremely fast and providing extra control on the update process of the risk measures. A drawback of the no-update approach is that it assumes a high stability of the PCs. In particular, the PCs should not flip or fluctuate strongly, which brings some limitations in the context of curves with a lesser liquidity.

Figure 39:
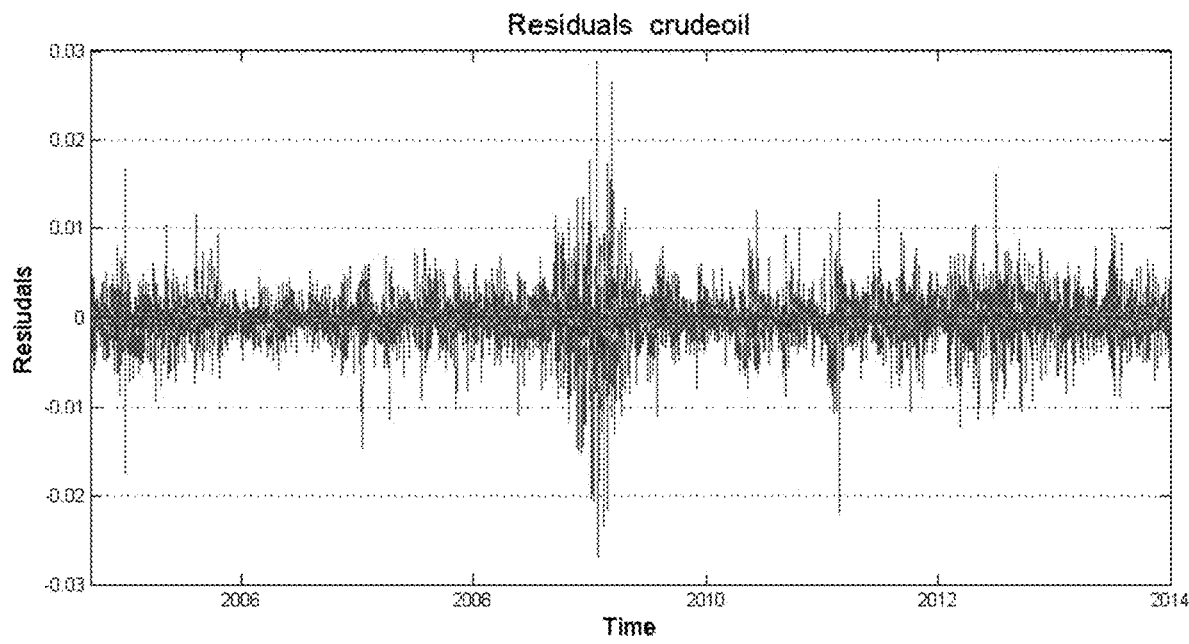
FIG. 39 shows a graphical representation of the residuals (e.g., the non-selected PC score) time series for an orthogonal model for a particular underlying commodity of the financial product according to aspects of the disclosure.
Figure 38:
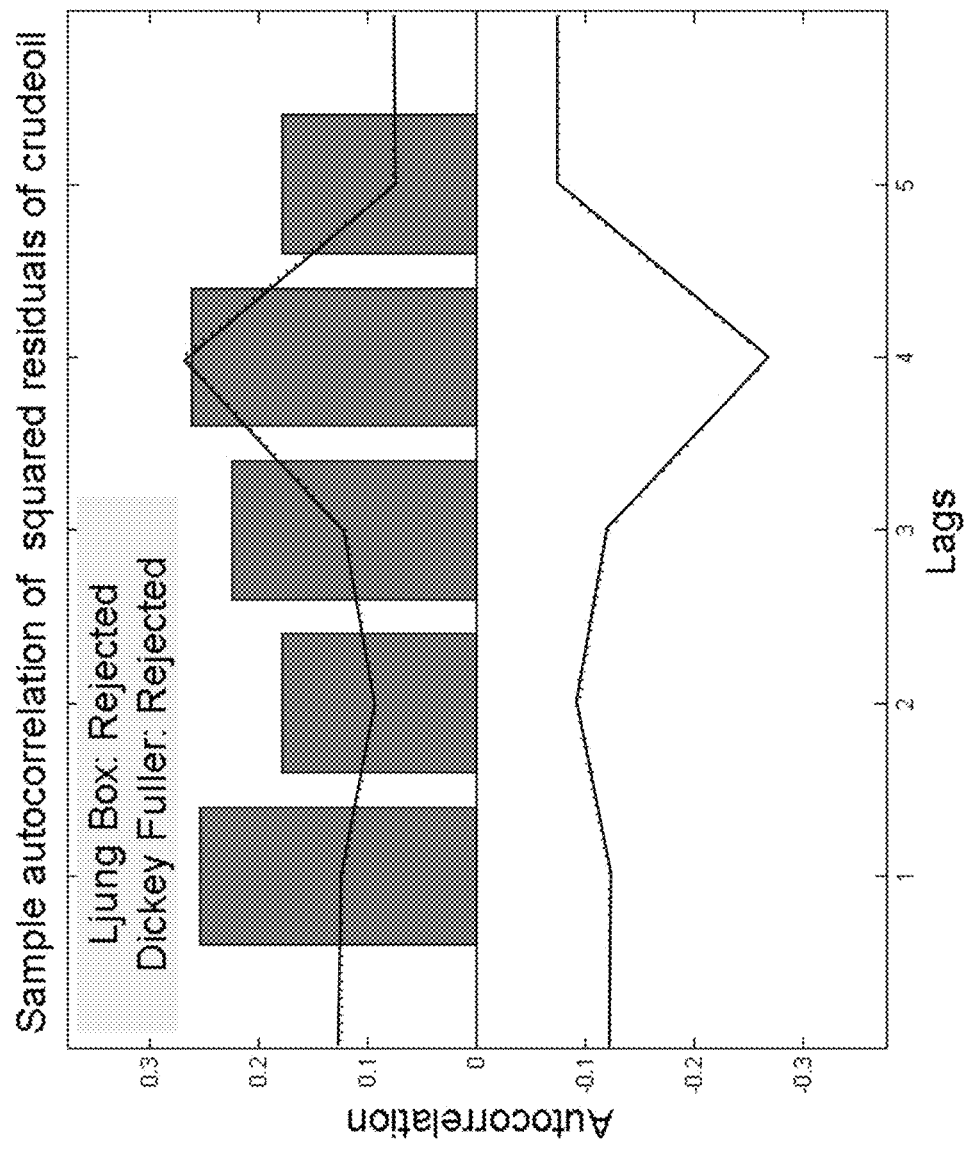
FIG. 38 illustrates and quantities the volatility clustering of the residuals, i.e. the non-selected PC scores according to aspects of the disclosure.

There are no strong theoretical arguments to reject or prefer the update or non-updated approach. The decision may be made by evaluating VaR back testing results. Performing a PC analysis we are selecting $N_{PC}$ from the N components $pc_k(t)$; k=1, . . . ; N in equation (39). These components explain almost all the observed correlation. The remaining $N_{Generics} - N_{PC}$ components are the residuals. Although they explain less than 1% of the price surface variance, they still contain some volatility dynamics and so should not be considered as pure white noise. FIG. 39 represents this set of time series for an orthogonal model on WTI crude oil. The scale of the time series (peaks around 0.01) may be compared with the scale of the scores in other examples. In some cases, only the third score has a similar scale. As can be seen in FIGS. 38 and 39 for crude oil some volatility clustering is contained in the residuals, and thus a dynamic volatility model is useful also for the residuals.

Dimension reduction can also be achieved using a parameter-dependent model. As a result, the future prices are described by the time evolution of the parameters. We have investigated two models two-factor model where the price FT (t) given by:

two-factor model of Schwartz/Smith [2] where the price $F_\tau(t)$ is given by $$\ln F_\tau(t) = X_t^1 + X_t^2 \tau + X_t^4 (1 - e^{-X_4^3 \tau}) + (1 - e^{-2X_4^3 \tau}) X_t^5 \quad (46)$$

where $X_t^i$ with i=1 . . . 5 are parameters and $\tau$ is the time to maturity.

polynomial fitting model $$F_\tau(t) = X_t^5 \tau^4 + X_t^4 \tau^2 + X_t^3 \tau^2 + X_t^2 \tau + X_t^1 \quad (47)$$

wherein $X_t^i$ with i=1 . . . 5 are the model parameters.

Following the fit of the models to crude oil data we investigate the stability of the parameter time series, test for autocorrelation in the parameters differences and apply AR-GARCH filtering in order to remove volatility clustering and autocorrelation effects. Both models are fitted to and tested on the data set June 2006-December 2013. The parameters of the Schwarz/Smith model are estimated using non-linear optimization of the squared error:

$$s = \sum_i (\tilde{F}_i - F_i)^2 \to \min, \quad (48)$$

where i indexes all available price data and ~Fi are the modeled prices. Gauging the quality of the model description on crude oil we observe overall satisfying model description except at the front end of the futures curve.

Figure 40:
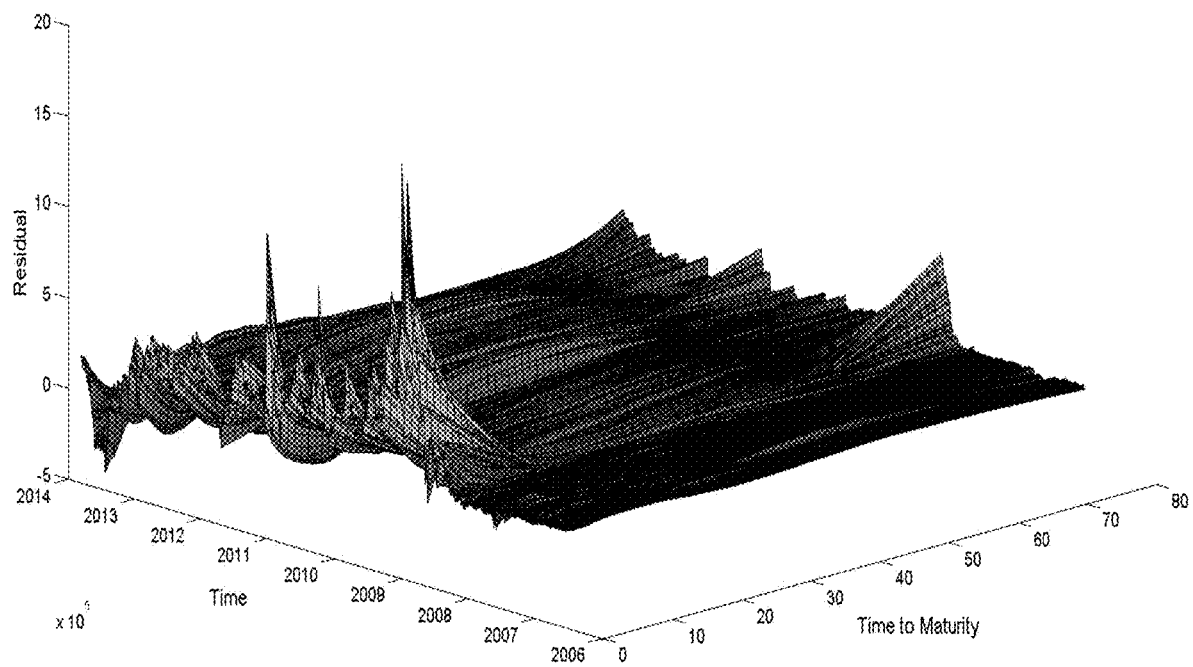
FIGS. 40 and 41 show illustrative representations of the residual surface with the 2-Factor model, an alternative dimension reduction method for PCA, for crude oil with and without regularization according to aspects of the disclosure.
Figure 41:
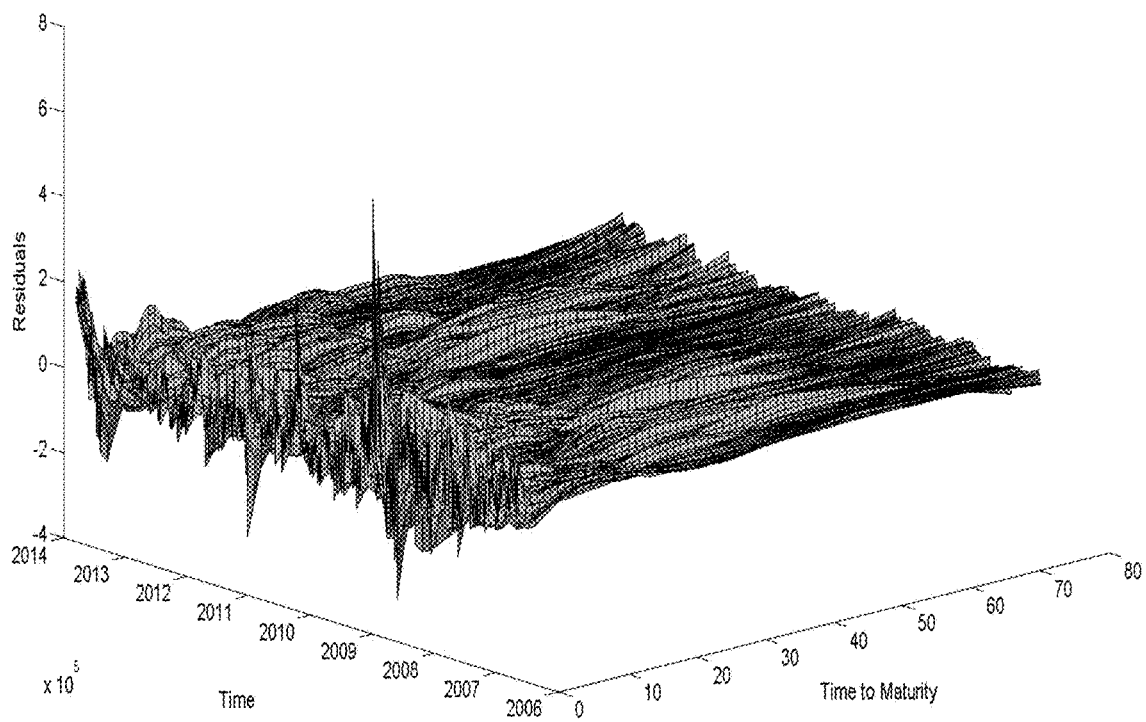

The FIGS. 40 and 41 show the model residuals for crude oil with and without regularization. FIG. 40 shows a residual surface for crude oil with the 2 factor model (46) without regularization. FIG. 41 shows a residual surface for crude oil with the 2 factor model (46) with regularization.

Figure 42:
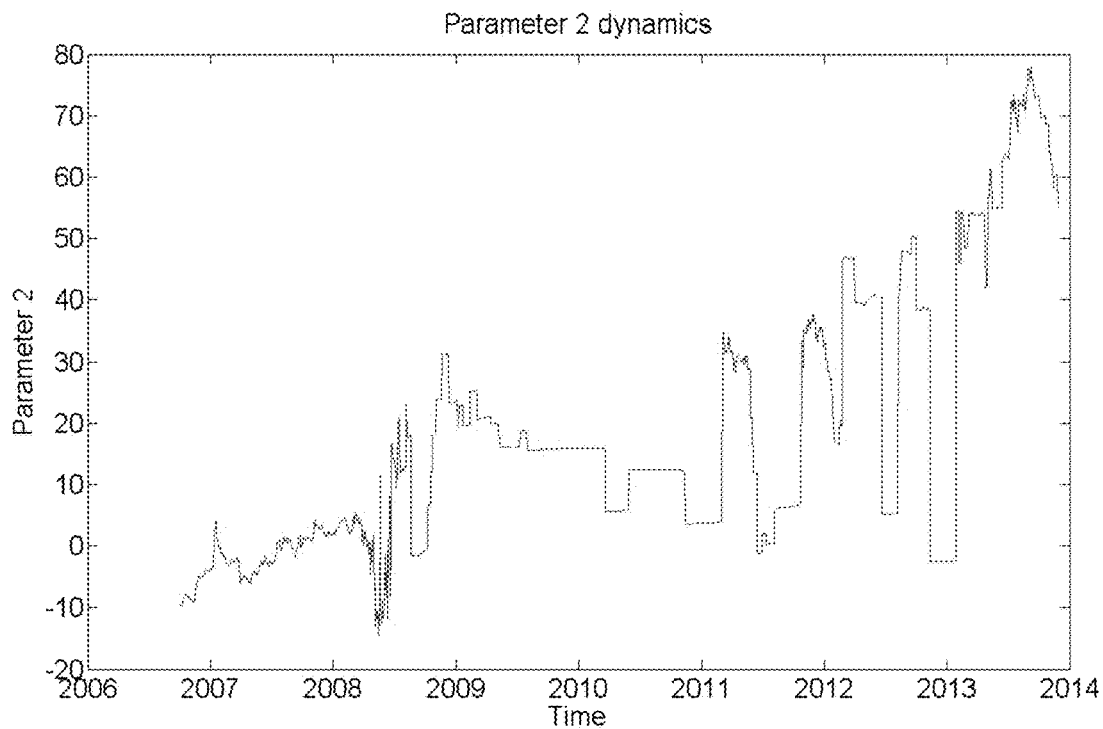
FIG. 42 shows an illustrative chart showing a time evolution of the second parameter of the 2-Factor model without regularizations according to aspects of the disclosure.
Figure 43:
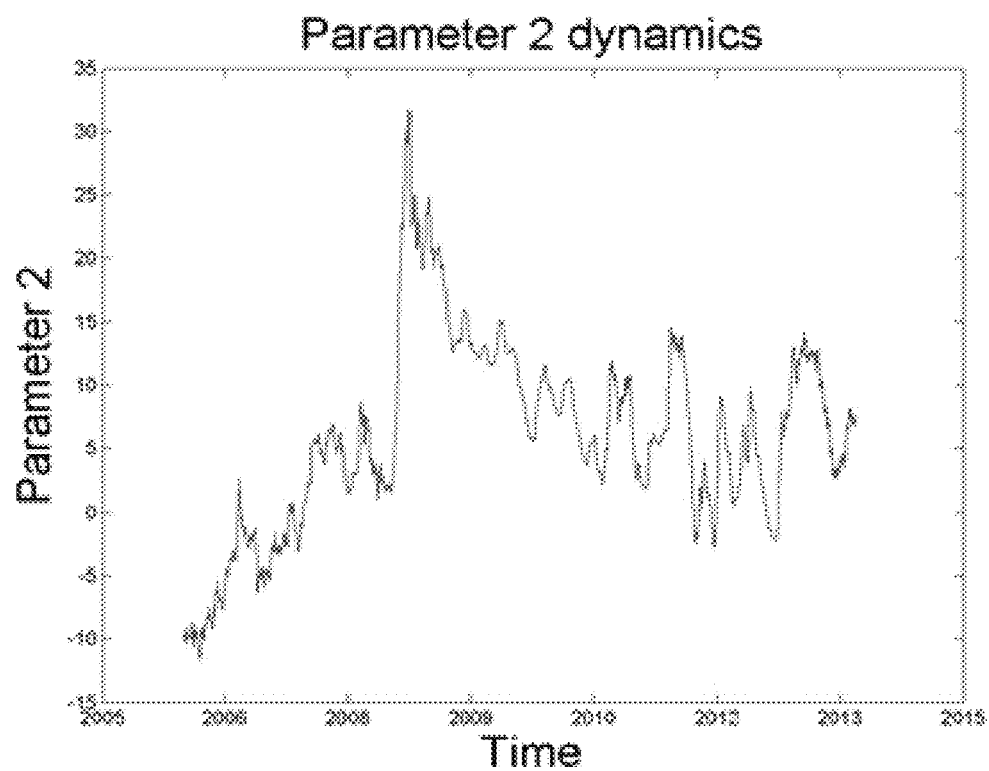
FIG. 43 shows an illustrative chart showing a time evolution of the second parameter of the 2-Factor model using the regularization according to aspects of the disclosure.
Figure 45:
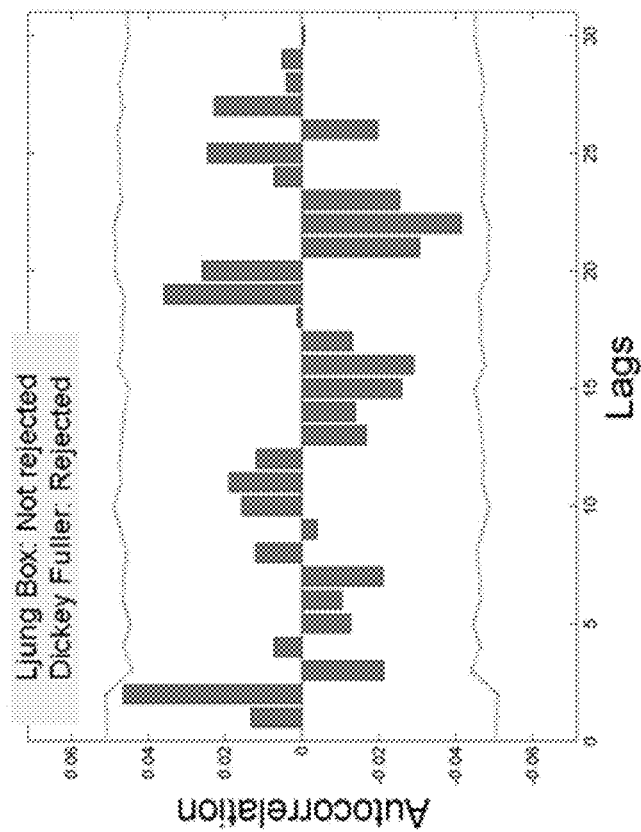
FIG. 45 shows an illustrative chart showing autocorrelation for the first innovation, which is obtained by filtering the first parameter changes by a dynamic autoregressive and volatility model, of the 2-Factor model using regularization, according to aspects of the disclosure.
Figure 44:
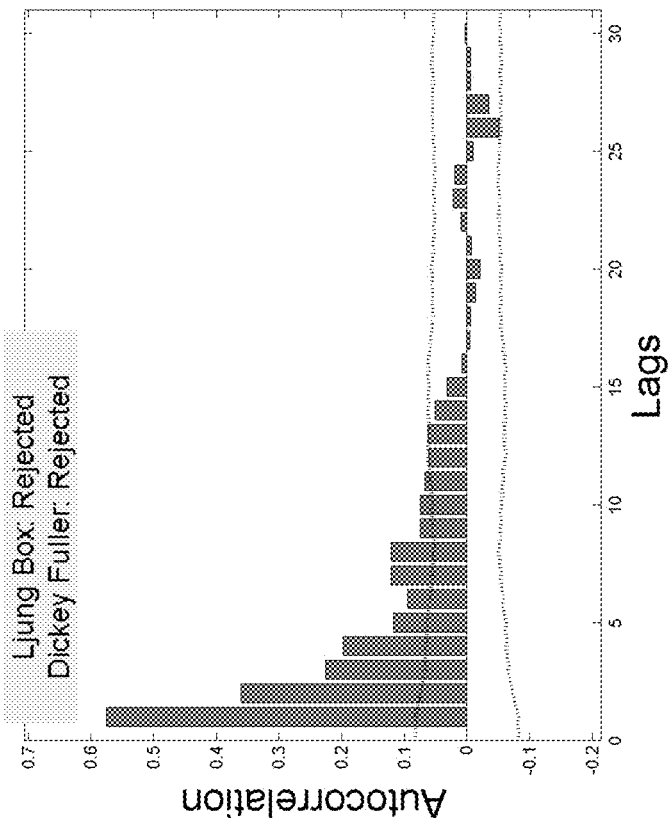
FIG. 44 shows an illustrative chart showing autocorrelation for the first parameter changes of the 2-Factor model system according to aspects of the disclosure.

The time evolution of the first parameter $X_t^i$ is depicted in FIG. 42. FIG. 42 shows an illustrative chart showing a time evolution of the second parameter of the 2 factor model without regularizations. FIG. 43 shows an illustrative chart showing a time evolution of the second parameter of the 2-factor model using the regularization. The individual parameters show a rather erratic time dependence which is hard to treat with time series modeling techniques. To avoid large jumps in the parameter evolution we change the objective function (48) by an additional regularization term. The regularized objective function reads of the form $$s = \sum_i (\tilde{F}_i - F_i)^2 + \lambda \sum_j (X_t^j - X_{t-1}^j)^2, \quad (49)$$

where j indexes the parameters. The results for the time series of the first parameter X1 with regularization term, for λ=1, is shown in FIG. 44. Additional time series for the parameters can be found in Appendix C. As the next step the autocorrelation of the time series of parameter differences $$\Delta X_t^i = X_t^i - X_{t-1}^i, i=1,\ldots,5 \tag{50}$$

is assessed and the (augmented) Dickey-Fuller test is used to test for non-stationarity. The autocorrelation up to 30 lags for the first parameter is given in the FIG. 44. We include the autocorrelation plots of the remaining parameters. The null hypotheses of vanishing autocorrelation based on the Ljung-Box test is consistently rejected for 1 parameter. As autocorrelations are present in the parameter differences (50) a AR(1)–GARCH(1,1) model for filtering. Following the computation of innovations (58) we check again for autocorrelation in the innovations. The test result is shown for the first parameter in the FIG. 45. Clearly, the autocorrelation in the innovations is reduced and these innovations are used for risk estimation and backtesting. Our results for the VaR violation backtesting show that the VaR estimation is biased towards the front end of the curve. FIG. 44 shows an illustrative chart showing autocorrelation for a 2-factor model system. FIG. 45 shows an illustrative chart showing autocorrelation using regularization.

Note that the changes in the futures price may be modified by a first order approximation parameter changes $$\Delta F = \sum_t \nabla_X F(X) \Delta X_i, \tag{51}$$

where we for simplicity left out the time arguments in the future prices F and the parameters X.

The term ∇F(X) is the gradient on the future price surface with respect to the changes in the parameters X. For the 2-Factor model:

$$\frac{\partial F(X)}{\partial X_1} = 1 \tag{52}$$

$$\frac{\partial F(X)}{\partial X_2} = \tau \tag{53}$$

$$\frac{\partial F(X)}{\partial X_3} = X_t^d \tau e^{-X_t^3 \tau} + 2 X_t^5 \tau e^{-2 X_t^8 \tau} \tag{54}$$

$$\frac{\partial F(X)}{\partial X_4} = 1 - e^{-X_t^3 \tau} \tag{55}$$

$$\frac{\partial (X)}{\partial X_5} = 1 - e^{-2 X_t^3 \tau} \tag{56}$$

Moreover, ΔX denotes the parameter changes in time, cf. Eq. (50). Due to the non-linear dependence of the future price on the parameters, historically observed parameter changes ΔX can result in wrongly estimated price changes in the present. In formulae, one uses $$\Delta F = \sum_i \nabla_{X_i} F(X_0) \Delta X_i, \tag{57}$$

where $X_0$ denotes the present parameter values, to compute the prices distribution instead of mapping historical parameter changes to historical price changes using (51).

Figure 46:
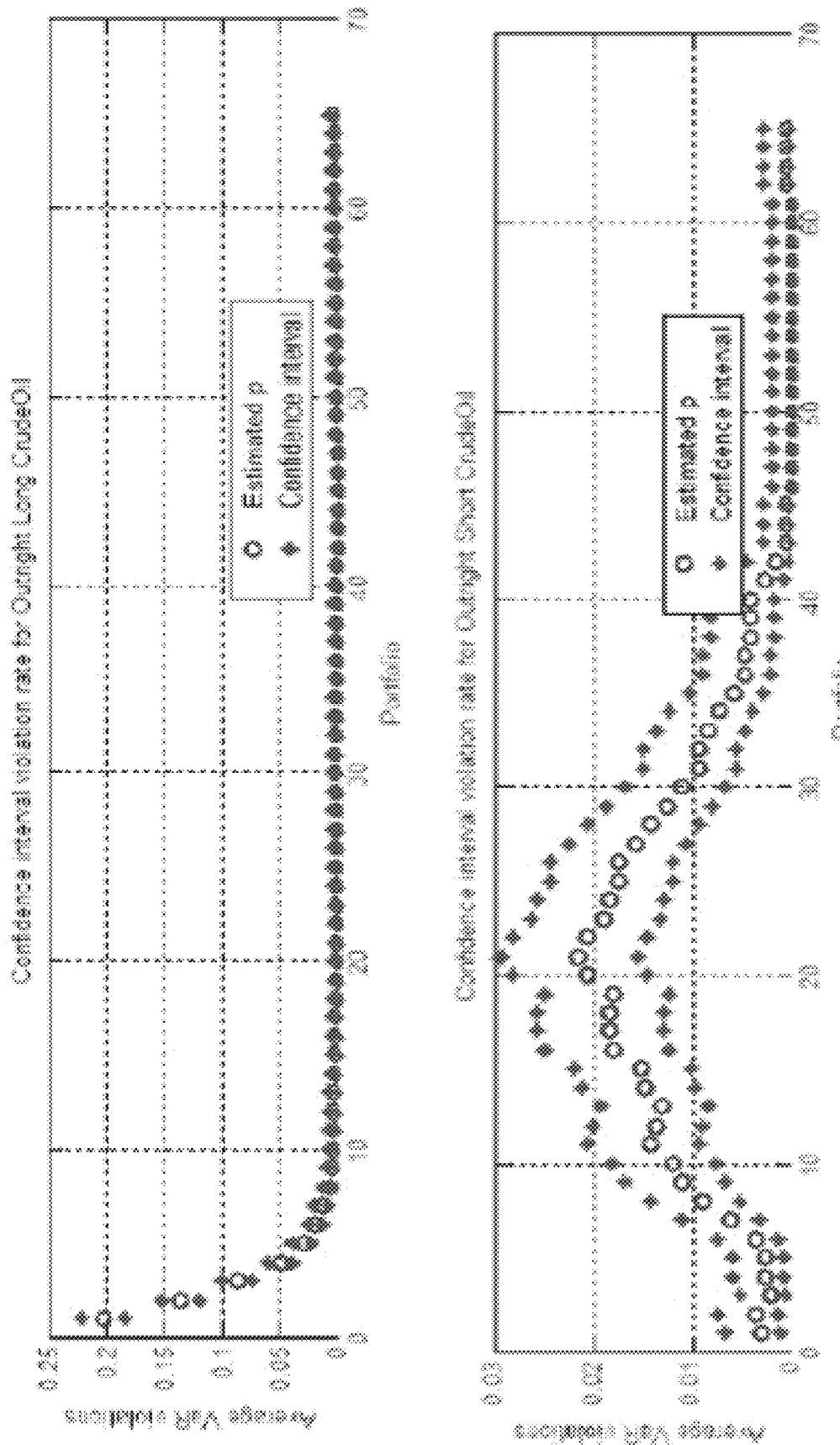
FIG. 46 shows an illustrative chart showing results of a violation coverage test for the 2-Factor model according to aspects of the disclosure.
Figure 47:
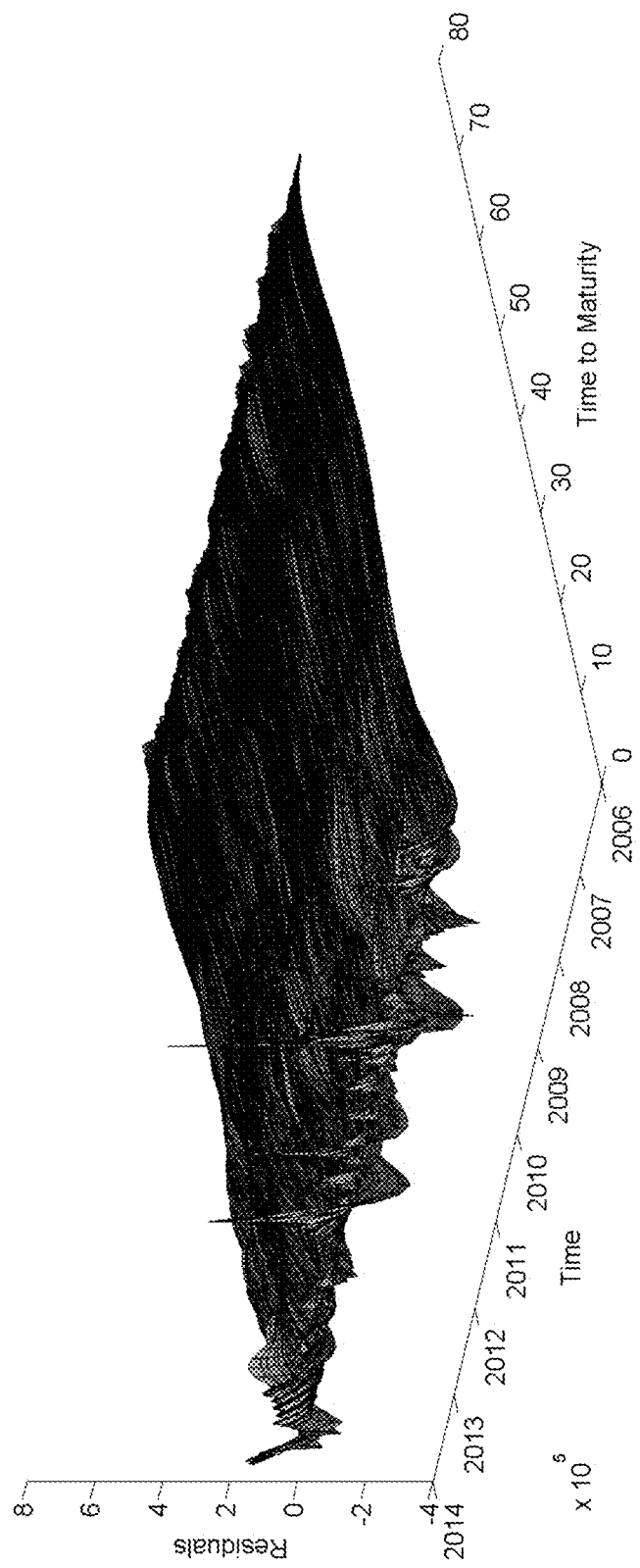
FIG. 47 shows an illustrative residual surface for a financial product with the polynomial model, another alternative dimension reduction method for PCA, and without regulation according to aspects of the disclosure.
Figure 48:
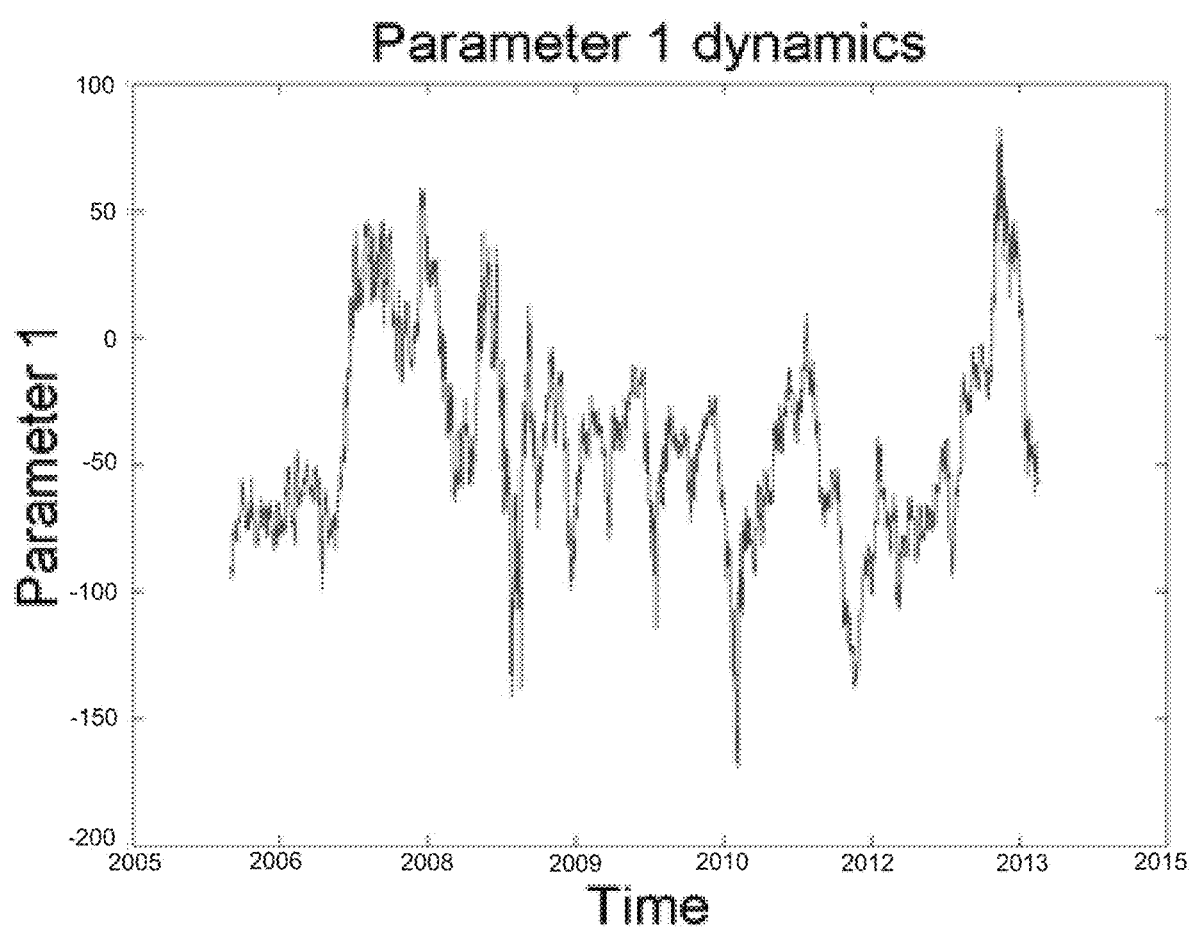
FIG. 48 shows an illustrative chart of a time series of the first parameter for the polynomial model without regularization according to aspects of the disclosure.

FIG. 46 shows an illustrative chart showing results for VaR99 violation coverage test for the 2 Factor model for outright long (upper panel) and outright short (lower panel positions on a financial product. FIG. 47 shows an illustrative residual surface for crude oil with the polynomial model 47 and without regulation. FIG. 48 shows an illustrative chart of a time series of the first parameter for the polynomial model without regularization.

In some cases, the dimension reduction module 232 may operate using a polynomial model according to aspects of the disclosure. The residuals are plotted in the FIG. 47 without regularization. We find again that the overall fit to data is satisfactory except for the front month. The parameter dynamics (FIG. 48) are more stable compared to the 2-Factor model and, from this perspective, there is no need to introduce a regularization. The autocorrelation in the parameter changes, shows a slow decay and indicates a complex model dynamics (with possibly long memory). The VaR violation plots show no bias with respect to positive or negative returns as it is expected from a linear model. The performance is however not satisfactory, in terms of VaR violation rates and clustering, at the front end of the curve.

The approach using parametric models presents already of series of difficulties at the single curve level. Both models have problems describing the front end of the curve. Additionally, future curves with high curvature are fitted rather poorly. Without including a regularization term in the fitting procedure the parameters is instable (for the 2-factor model). These instabilities are partly cured by the penalization of large jumps in the parameter time series. However, the parameter changes are strongly autocorrelated. These autocorrelations can be successfully reduced using AR filtering for the 2-Factor model but more investigations are needed for the polynomial model. The autocorrelations in polynomial model do belong to the AR-GARCH(1,1) model type and the removal of such effects by filtration is less successful. The tests on VaR violation fail for the front end of curve where the model description for both functional forms is poor. Additionally, the VaR estimation shows biases for long and short positions for the 2-Factor model. The biases could be due to the not-accounting for non-linear effects when mapping the simulations of parameters to price simulations. Note that for the parametric models the "scores" are the parameter changes ΔX. In detail, from the filtered simulations of the parameter changes ΔX the forecast price distribution is computed using the linear relationship (51). The gradient ∇F(X) is estimated using the parameters at derivation date (or the date of the forecast)—not the dates with each date of the historical parameters. Given the increased complexity of a satisfactory parametric model even before considering multi-curve settings, the PCA method to dimensional reduction of the price future data are clearly favored.

The variance scaling module 234 may use any number of approaches to model volatility of the scores. Three approaches are investigated to model the volatility of the scores. Additionally, engineering techniques are reviewed to constrain the pro-cyclicality feature of the risk measures, namely the volatility flooring and the dual lambda approach. The methods may include EWMA which allows fast computation and/or control of the model reactivity by the choice of λ. However EWMA requires the need to set or fit the parameter λ. A GARCH approach may also be used, which may provide fast reactivity in periods of crisis, however no clear gain compared to EWMA to justify the model complexity. A dual lambda approach may offer fast reactivity when necessary (e.g., in periods of crisis) and would prevent margin from shrinking consecutively to a set of small returns (e.g., in calm period). Dual Lambda approach requires input or calibration of two decay parameters λ and may be too conservative sometimes. Similarly, volatility flooring approach may provide anti-procyclicality but may result in very conservative (e.g., high) margins as well.

TABLE 3

Overview of methodologies for use in variance scaling

| Method | Pros | Cons |
| --- | --- | --- |
| Dual Lambda | Fast reactivity in periods of crisis<br>Prevents margin from shrinking consecutive to a set of small returns | Two parameters to set<br>Conservative measure: Likely failing of the Kupiec test |
| Volatility Flooring | Anti-procyclicality | Can potentially lead to very conservative (high) margins |
| EWMA | Fast Computation<br>Control of the model reactivity by the choice of λ | Need to set of fit the parameter λ |
| GARCH | Fast reactivity in periods of crisis<br>Account for volatility clustering | More complex than EWMA with similar results |

Figure 49:
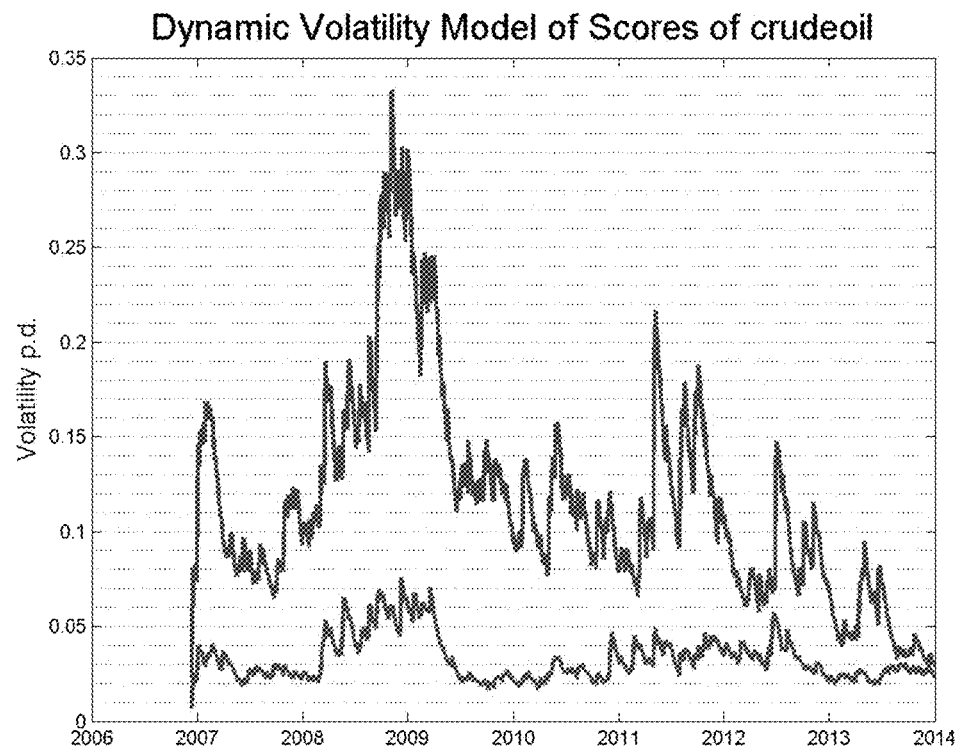
FIG. 49 shows an illustrative chart plotting the volatility of the first two PC scores with EWMA method, a dynamic volatility model, for a financial product according to aspects of this disclosure.
Figure 50:
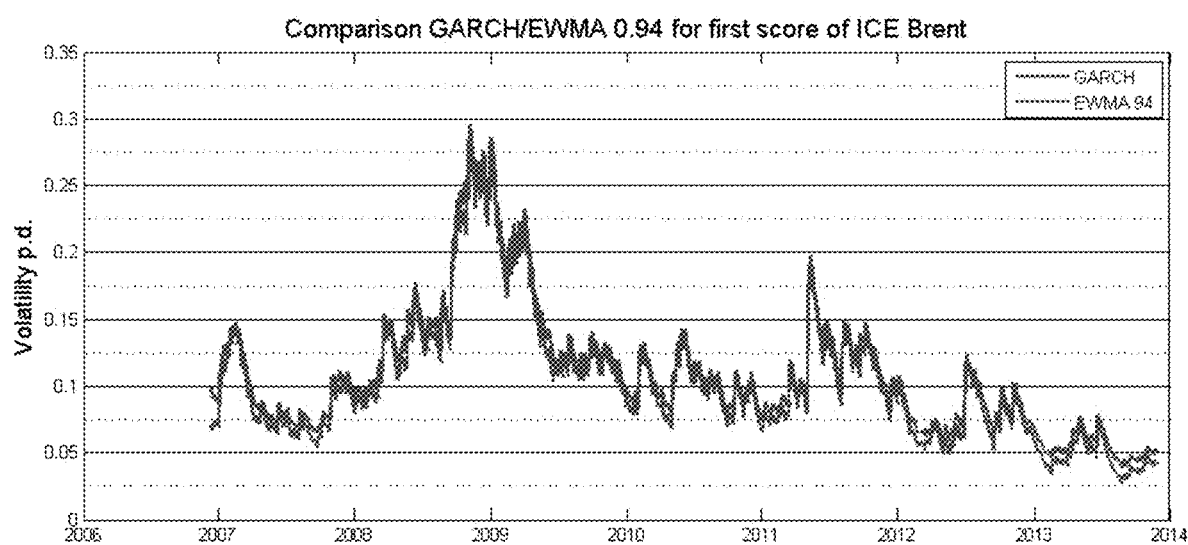
FIG. 50 shows an illustrative chart showing a comparison between EWMA model and one of its alternative methods on the first PC score for a financial product according to aspects of the disclosure.

The dimension reduction module 232 may be used to reduce the dimensionality (e.g., number of risk factors) when computing a margin requirement for a portfolio of financial products and/or to present such to a user via a user interface screen. The variance scaling module 234 may be used to process a dynamic volatility model to scale a number of new risk factors obtained from dimension reduction module 232 and/or to present such to a user via a user interface screen. The dynamic volatility model processed by the variance scaling module 234 may be used to provide a sound set of innovations for simulations and to provide a forward looking volatility measure suited for margin measurements. When considering a time series r(t') of returns, whether using scores or using another time series, the innovations may be defined as $$\text{innovation}(t') = \frac{r(t')}{\sigma(t'-1)}, \tag{58}$$

where σ(t'−1) denotes the volatility estimate of the previous day. The one day time lag is introduced to account for the forecast uncertainty of volatility. A good volatility model may remove the dynamics of the individual scores, such as the volatility clustering as shown in FIG. 31. Further, successful volatility models fulfill the operational requirement of the margin measure (e.g. smoothness of the margins). Further, forward looking volatility will be used in the filtered historical simulation to reinsert the desired volatility to the sample of uncorrelated innovations. The volatility models are always trained on the expanding windows, starting at the beginning of each observation window being considered. Practically, a "burning" of 50 days may be used to avoid any instability caused by the first volatility estimate, as can be seen in FIG. 49.

The variance scaling module may process a score, an error term or a time series of parameter changes, where an exponentially weighted average (EWMA) volatility module may be defined as $$\sigma_r(t) = \sqrt{\lambda_{EWMA}\sigma_r^2(t-1)+(1-\lambda_{EWMA})(r(t)-<r>_\lambda(t))^2}. \tag{59}$$

$\lambda_{EWMA}$ is the decay parameter, r(t) is the time series (e.g. scores, error term, parameter changes, factor loadings), and $<r>_\lambda$ is the exponentially weighted estimate of the mean. A de-meaning procedure is only used in the estimation of the time-varying volatility by complying to the second term in the variance formula var(X)=E(X²)−E(X)². However, note that no model for the mean, such as an AR process, is used. The volatility estimate is utilized only for filtering purpose, as the mean model may not be required because that would require an extra model and parameterization to measure the mean and de-meaning would require to enter the mean value back in both the margin and the backtesting engine.

Therefore the process for the average is $$<r>_\lambda(t)=(1-\lambda)r(t)+\lambda<r>_\lambda(t-1). \tag{60}$$

and the time window is always expanding.

The parameter $\lambda_{EWMA}$ usually ranges from about 0.94 to about 0.97. Values larger would fail to capture crisis as the static case is reached with a lambda of 1. We adopt an offset window (e.g., a burn in window) of 50 days to avoid finite size effects in the EWMA process. A seed value for the EWM average is the first return value and zero for the EW variance. Expanding the recursive definition (59) of the EWMA volatility model one observes that the model assigns the weights $$\omega_n=\{(1-\lambda),\lambda(1-\lambda),\lambda^2(1-\lambda),\ldots,\lambda^N(1-\lambda)\}, \tag{61}$$

to the N historical dates, backwards from the most recent date. The finite sum of weights is $$\sum_{n=1}^{\infty} \omega_n = (1-\lambda)\cdot\left(1+\sum_{1}^{N-1}\right), \tag{62}$$

where, $$\sum_{1}^{N-1} = \sum_{k=1}^{N-1}\lambda^k. \tag{63}$$

in the limit of N→∞ the sum of weights (62) is equal to unity. For finite and not large N, the sum of weighs may deviate from unity and leads to an underestimation of the volatilities. To correct this finite size effect, (1−λ) may be replaced in (59) by $$1-\lambda \to \frac{1}{1+\sum_{1}^{N-1}}. \tag{64}$$

Consequently, for the coefficient λ equation 59, $$\lambda \to \frac{\sum_{1}^{N-1}}{1+\sum_{1}^{N-1}} = \lambda\frac{1+\sum_{1}^{N-2}}{1+\sum_{1}^{N-1}}. \tag{65}$$

Figure 49A:
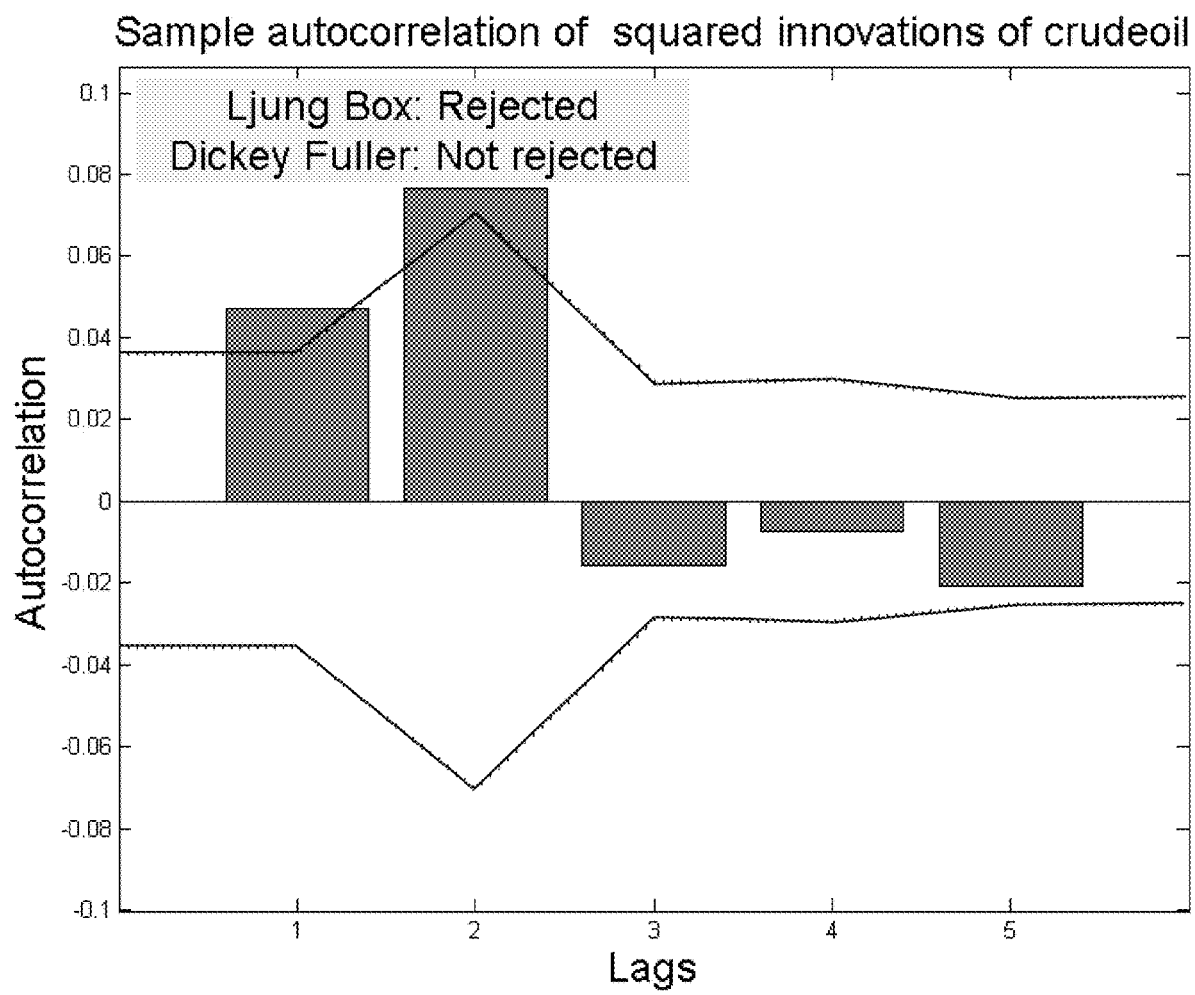
FIG. 49A shows an illustrative plot of the squared innovations derived from the first principle component (PC)

In the implementation the initial window (e.g., burn in window) may be set to a number in the range of about 50 to about 100 business days for the volatility estimate to avoid statistical effects due to the short length of the time series. Using a burn-in window the replacements in Eq. (64) and (65) have no practical effect for the EWMA volatility estimate. FIG. 49 shows a EWMA 0.94 on the first two PCs of crude oil. This figure is to be compared with the exact same plot, but using a GARCH model (FIG. 49). The volatility clustering of the scores, seen in FIG. 34, is almost disappeared as indicated by the autocorrelation plot of the squared innovations of the first component, as shown in FIG. 49A.

In some cases, a GARCH(1,1) model may be considered as candidate for the dynamic volatility model for use by the variance scaling module 234. The GARCH tends to provide slightly larger volatility spikes. At the peak of the energy crisis in 2008, the EWMA first score volatility reaches 0.33, while the GARCH model reaches 0.36. ^By construction, the GARCH model captures better the volatility clustering contained in the scores time series, yet the difference for the first lag is negligible. The biggest difference is observed for the day 2 lag. As such, the advantages provided by using the GARCH process may provide more complexity than is necessary with regards to its value added in terms of risk figures.

Figure 50A:
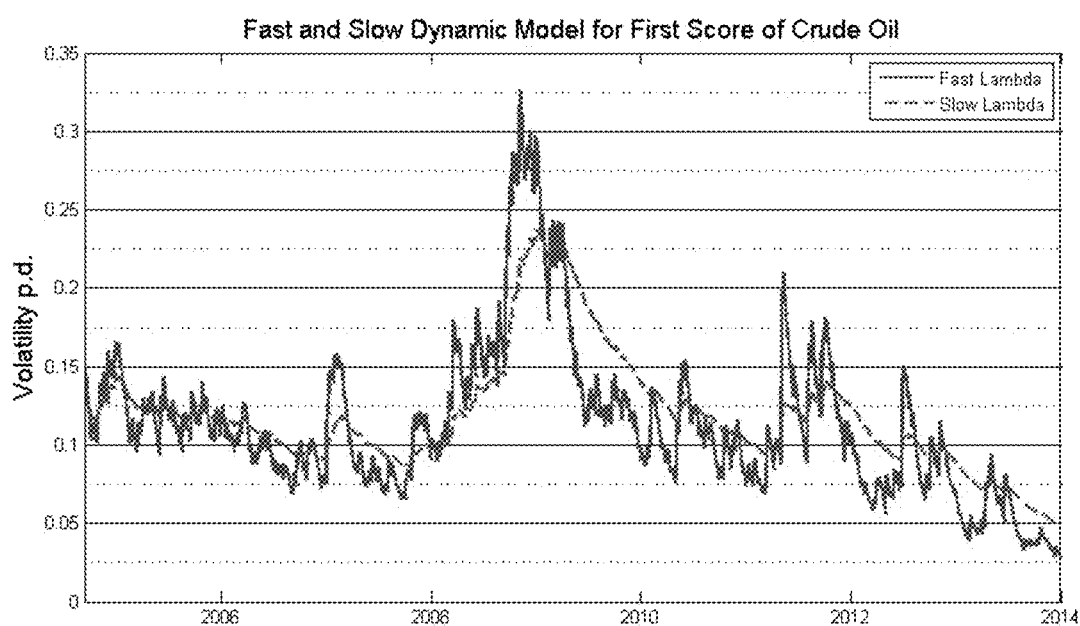
FIG. 50A shows an illustrative chart plotting illustrative parameters for a fast and slow dynamic model associated with a dual-lambda approach for the first score of crude oil.

In some cases, the variance scaling module 234 may use a dual lambda approach that may include using two lambda parameters, $\lambda_{fast}$ and $\lambda_{slow}$, instead of one. Both lambda parameters are used in the EWM Var setup (59) for variance estimation. The innovations are derived using $\lambda_{fast}$ solely, optimized for a daily horizon. However, the maximum of the two volatility estimates is taken when the innovations are multiplied by the volatility forecast to find the P&L simulations. FIG. 50A represents this interplay of two the parameters for the first score of crude oil. The dual lambda approach has several consequences, such as smoothing of the margins, high reactivity to crisis and slow reactivity to periods of calm. For example, the post-crisis margins are usually scaled using the slow lambda instead of the fast ones, making the decay more progressive and smoother. Further, The dual lambda approach allows taking a highly reactive fast lambda. Also, in periods of relative stability, such as observed in 2006 and 2013, the margins get driven by the slow lambda, providing a slow decay towards lower margins. In this sense, the dual lambda is a first step towards anti-procyclicality condition, yet it does not prevent the margins from shrinking to vanishing.

The volatility flooring is an extra layer added on top of the volatility model used, meant to add robustness and stability to the margins, and to prevent pro-cyclicality. At the generic simulation step, the volatility used to simulate a given score or error term is floored by the nth volatility quantile in a growing window as measured within the dynamic model.
—In some cases, a configuration for which ICE Brent Crude first score volatility may be floored for a simulation. In an example, the floor may be set to the 10% quantile, preventing the margins to become too low in late 2013.

Figure 51:
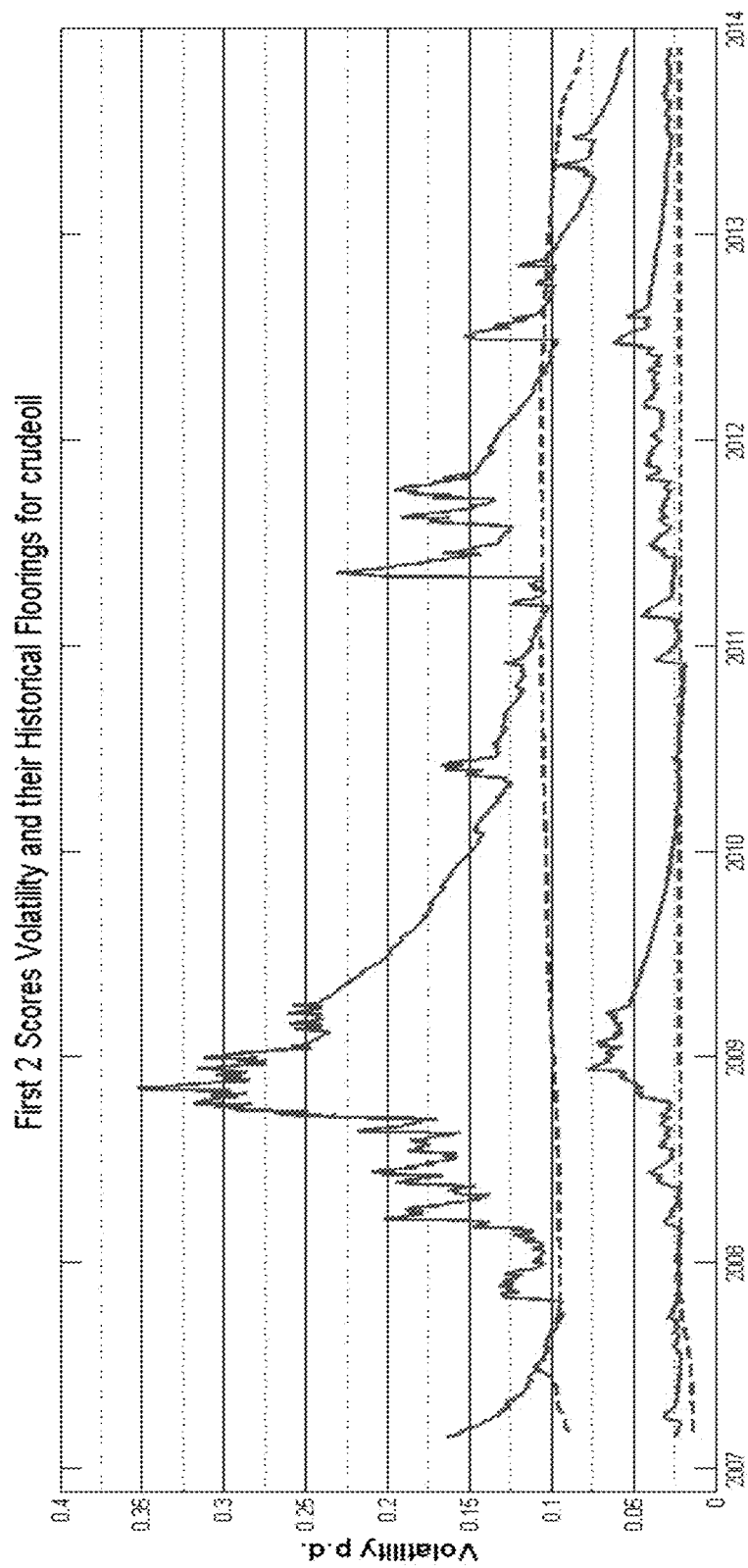
FIG. 51 shows illustrative charts showing the historical value of the floor through time for a financial product, according to aspects of this disclosure.
Figure 52:
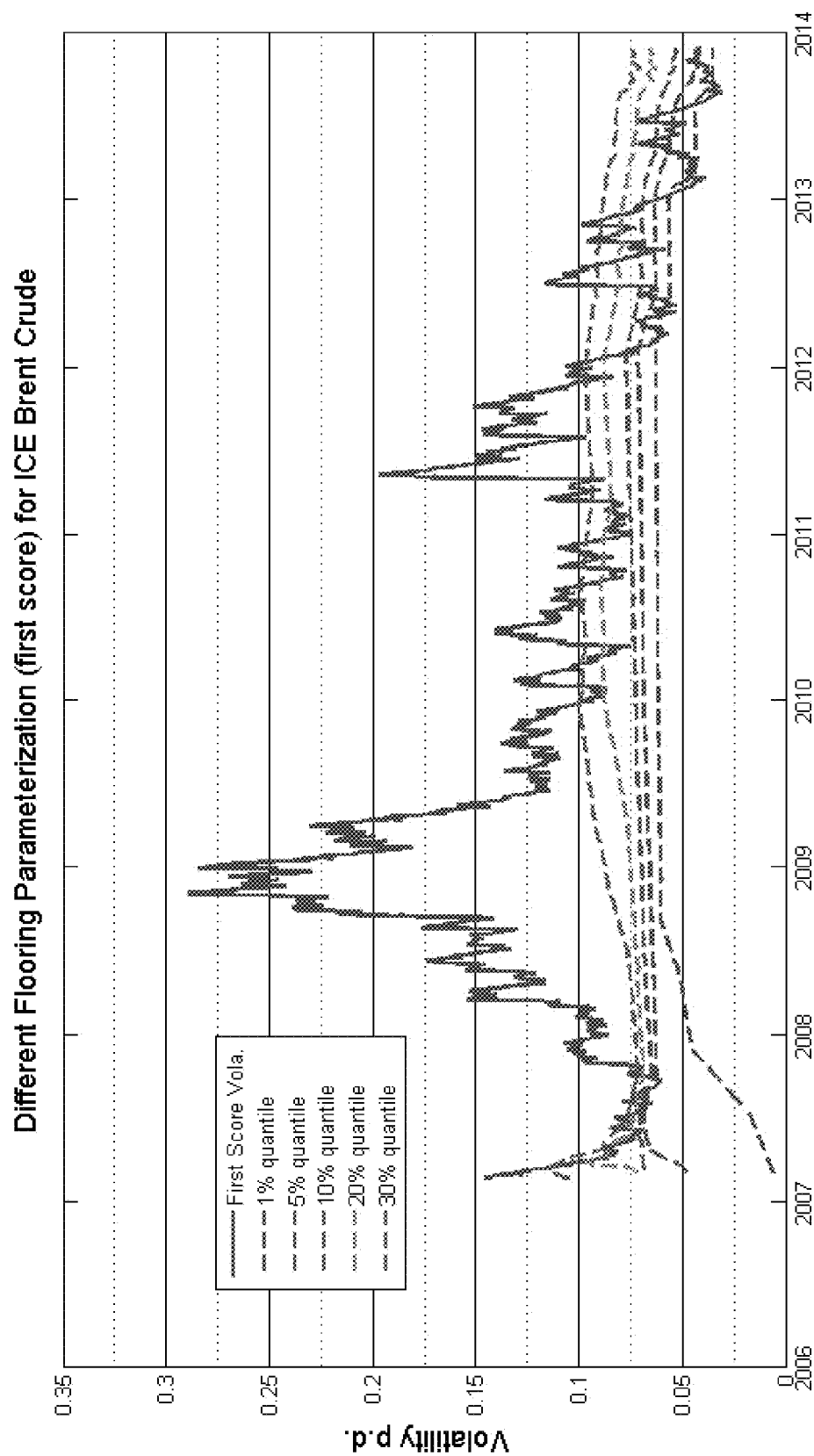
FIG. 52 shows an illustrative chart showing historical dynamic floor for different quantile for a financial product, when a standard EWMA is applied as volatility model according to aspects of this disclosure.

FIG. 51 illustrates the historical value of the floor through time for the first two scores of crude oil. As the quantile is measured on a growing window, the learning effect results in a high stability of the floor, making it nearly static. As the scores, and in particular the first one, are driving about 99% of the generics variance, to floor them has a very strong impact on the risk measures and make the model very conservative. For this reason, it is recommended to use a very low quantile (e.g. 10%). FIG. 52 illustrates the sensitivity of the quantile parameterization when applied to the first score of ICE Brent. As illustrated by the fast evolution of the floor at the beginning of the simulation, the procedure requires a significant time history to be efficient.

The error term does not drive the variance of the generics, however it plays a significant role for the risk of intra-curve spreads such as condors and butterflies. For intra-curve spreads very high correlations between consecutive generics can make the margin measures very small. These correlations are described by the scores and residual terms. Note, that the PC analysis leads to uncorrelated scores but the generic contracts can nevertheless be highly correlated. Therefore the error terms do have significant contributions to the correlations of generics and flooring the error terms influences the backtesting results for the intra-curve spreads. From these practical considerations and inspection of backtesting results a stronger floor is recommended on the error term, i.e. around 40%.

The covariance scaling module 236 may be used to implement a multi-curve correlation model. Multiple models have been investigated to describe correlation structures, where EWMC and DCC methods may be applied to both intra-curve correlations and to describe correlations among scores at inter-curve levels. The EWMC method may provide fast computation and/or control of the model reactivity by the choice of parameter lambda. However, this necessitates that a lambda value is set or fit before computing a margin value. A DCC method may provide a data driven estimated correlation dynamic and may be more flexible, however the model complexity is increased. Global PCA models may be used which may provide strong dimensional reductions and less inter-curve correlations that need to be captured through explicit covariance models, however, the results may be difficult to interpret and global PCs may not be stable.

TABLE 4

Overview of methodologies for use in covariance scaling

| Method | Pros | Cons |
|---|---|---|
| EWMC | Fast computation<br>Control of the model reactivity by the choice of parameter $\lambda$ | Need to set of fit $\lambda$ |
| DCC | Data driven estimated correlation dynamic<br>More flexible correlation dynamic | Model complexity |
| Global PCA | Strong dimensional reduction<br>Less inter-curve correlation has to be captured through explicit covariance models | Difficult to interpret<br>Global PCs are not stable |

The methodology for dimension reduction of the curves and variance scaling has been discussed above. After the described procedures the returns of the single curves are projected to volatility scaled scores (innovations) and volatility scaled errors. Those innovations however may still contain correlations, especially on the inter-curve level. The most appropriate model to capture these effects will be identified among the following approaches. The first approach is to describe each curve separately and inter-curve correlation effects are implicitly and statically captured through resampling of time-aligned innovations and residuals. The second approach is to describe each curve separately and dynamic inter-curve correlation effects are explicitly captured through a model of the correlation between normalized principal components (multivariate EW correlation/DCC). Static correlation effects are implicitly captured through resampling of time-aligned innovations and residuals. The third approach is to jointly describe the curves by performing a global PC rotation and then modeling the new risk factors using the same techniques used for single curves. The first approach assumes no dynamics in the correlation structure. Results on structural breaks, exponentially weighted correlation and constant conditional correlation (CCC) tests do not support this assumption.

As the EWMC constitutes a weighted sum (with positive weights) of the time series, instabilities of the correlation matrix (for example non-positivity) are excluded. Therefore the first model will be considered as benchmark model. The second approach captures dynamic in correlations but can suffer from dynamic stability issues. A typical sign is the occurrence of not well defined (not positive definite) correlation matrices. The third approach is an extension of the considered single curve methodology, however it suffers from the difficult interpretability and instability of the considered factors.

The EWMC model corresponds to the iterative relation $$C(t)=\lambda C(t-1)+(1-\lambda)\ddot{R}(t)\ddot{R}^T(t), \tag{69}$$

where C(t) is the covariance matrix, R(t) is a vector of time series and $R^T(t)$ is given by $$\ddot{R}(t)=R(t)-<R>(t), \tag{70}$$

where (R)(t) is the EWMA determined by $$<R>(t)=\lambda(R)(t-1)+(1-\lambda)R(t). \tag{71}$$

Equation (69) assumes the same dynamic for both variances and correlations. For the practical implementation the identities (64) to (65) apply also for the EWMC computation. This considered model is slightly more flexible, indeed the diagonal part of the covariance matrix is estimated using an EW variance estimation with different $\lambda$ as described. Whereas the estimation of the covariance matrix of equation (69) focuses exclusively on the off-diagonal elements. Therefore, just the correlation matrix Corr associated with the covariance matrix C is effectively used to filter the scores innovations $I_t=[I_1; \ldots, I_N]$ of the N modeled curves.

$$UI_t=\mathrm{chol}(\mathrm{Corr})_{t-1}^{-1} \cdot I_t \tag{72}$$

where $UI_t$ are the uncorrelated innovations. These are historically resampled during the FHS procedure. For risk management purposes, there is a tradeoff between control and stability of the model and the need of i.i.d residuals for the subsequent filtered historical simulations. In some cases, two models may be compared to capture dynamic correlation. The first model aims at stability and robustness: a EWMC model with a fixed lambda parameter, chosen on historical data. The second model focuses on flexibility and optimal filtering a DCC model retrained at each time step based on maximum likelihood estimation (MLE). There is also the somehow intermediate approach of recalibrating a EWMC model at each time step. This is not considered since for this model the estimation of lambda does not decouple correlation and covariance effects. Therefore it is inconsistent with the use of the correlation matrix scaling as in Eq. (72), but may be useful in other cases.

The covariance scaling module 236 may process instructions to implement a dynamical conditional correlation (DCC) model, as opposed to the EWMC approach, where the DCC model may operate under an assumption of different dynamics for each variance and a different, but unique, dynamic for the correlation structure. For example, $$C(t)=D(t)Q^*(t)D(t) \tag{73}$$

$$Q^*=\mathrm{diag}(Q(t))^{-1/2}Q(t)\mathrm{diag}(Q(t))^{-1/2}, \tag{74}$$

where C is the covariance matrix and D(t) is given by $$D(t)=\mathrm{diag}(d_1(t),\ldots,d_N(t)). \tag{75}$$

The diagonal entries in (75) are defined by:

$$d_i(t)=\sqrt{C_{ij}(t)}, i=1,\ldots,N, \tag{76}$$

where, $c_{ij}(t)$ are the elements of the covariance matrix C(t). The Model dynamics may be given in terms of the matrix Q(t) as $$Q(t)=\alpha Q(t-1)+\beta R^{*T}(t-1)R^*(t-1)+(1-\alpha-\beta)\bar{Q}, \tag{77}$$

where $\alpha$ and $\beta$ are parameters and Q is the normalized unconditional variance matrix of $R_i(t)$. The time series $R_i^*(t)$ is the (normalized) unconditional variance matrix of $R_i(t)$.

$$R_i^*(t)=R_i(t)/\sigma_i(t), \tag{78}$$

where $\sigma_i(t)$ are univariate estimated volatilities of $R_i(t)$. The first step is the estimation of the univariate volatilities $\sigma_i$ by calibrating GARCH(1,1) processes to the time series Ri(t). Second, the matrix Q is the static estimate of the covariance matrix normalized by the static volatilities $\sigma_i$, e.g., $$\bar{Q}_{ij}=\mathrm{Cov}(R_i,R_j)/(\bar{\sigma}_i\bar{\sigma}_j), \tag{79}$$

where $\bar{\sigma}_i$ is given $$\bar{\sigma}_i^2 = \frac{1}{N-1}\sum_{n=1}^{N}(R_i(t_n)-\bar{R}_i)^2 \tag{80}$$

where $\bar{R}_i$ is the mean. Third, the parameters $\alpha$ and $\beta$ are found by a maximum likelihood estimation (MLE) fitting procedure, where the likelihood function reads:

$$L(\alpha,\beta) = \frac{1}{2}\sum_t\left(\ln(2\pi)+\ln(\det Q(t))+\sum R^{*T}(t)R^*(t)/\mathrm{diag}(Q(t))\right). \tag{81}$$

Fourth, the Cholesky decomposition of the DCC correlation matrix $Q_t^*(t)$ is computed and inverted. Finally, the resulting matrix is used to generate uncorrelated innovations $$UI_t=\mathrm{chol}(Q^*(t))_t^{-1} \cdot I_t \tag{82}$$

Note that the time convention in the definition of $UI_t$ for the DCC model is different from the corresponding one for the EWMC model in equation 72. The MLE fitting procedure of this model can be decoupled in a variance estimation procedure and a pseudo-correlation estimation on volatility filtered returns. This makes the calibration of this model consistent with the subsequent use of correlation scaling suggested in Equation (72). Furthermore, this model has the advantage of using a GARCH-like dynamic for the covariance, which is more flexible than the dynamic assumed by using exponential weighted estimation. The model provides therefore a suited calibration procedure for optimal correlation filtering as well as sufficient flexibility to capture changes in the correlation dynamics. The downside is that the dynamics of the parameters and can be substantial and lead to model instability.

Figure 53A:
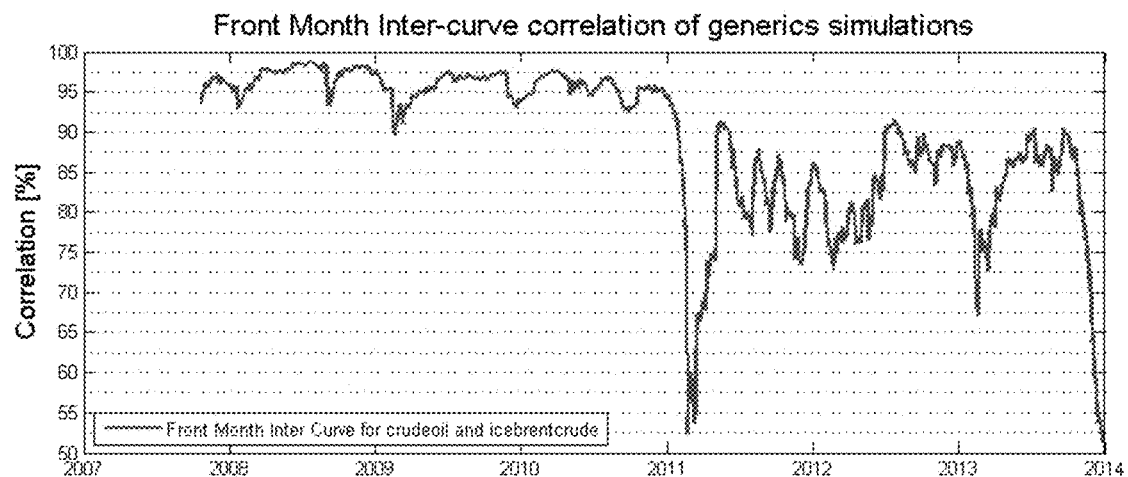
FIGS. 53A and 53B show an illustrative comparison of the resulting correlation using EWMC model against DCC model of the first generics of two commodities.
Figure 53B:
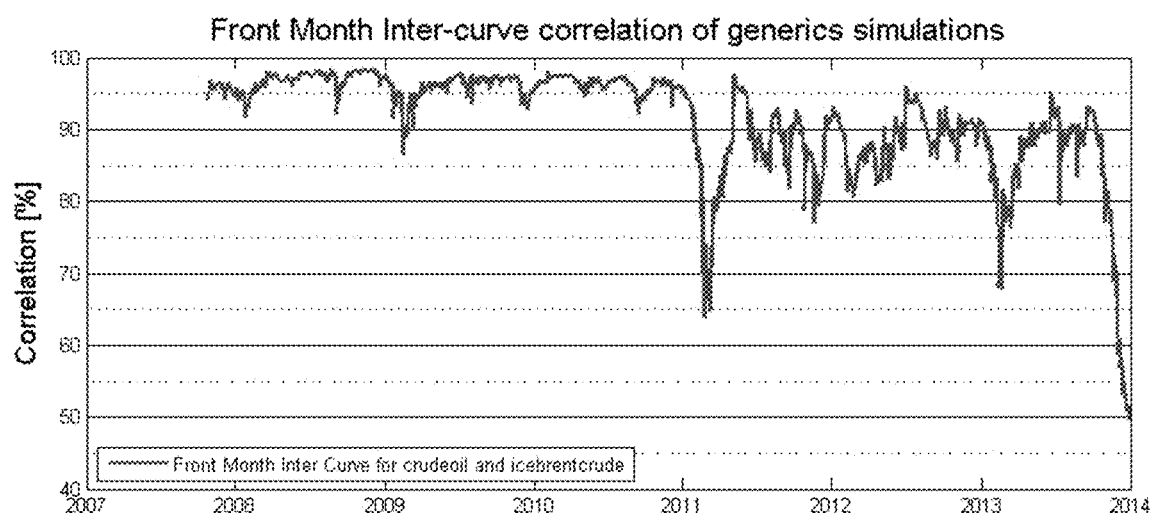

As a test case, the DCC and EWMC models are trained on the pair ICE Brent crude/WTI Crude oil. The two parameters in the used time series were both always positive, and their sum was slightly lower 1, indicating a satisfactory fit. The stability of the fit (based on a growing time window) is supporting a DCC approach. FIGS. 53A and 53B show an illustrative comparison of the resulting correlation of the first generics of the two commodities discussed above. For example, FIG. 53A illustrates front month correlations of the curve spreads from an EWMC 0.97 model. FIG. 53B illustrates front month correlations of the curve spreads from a DCC model. The break in correlation of January 2011 results in both cases in a strong drop. With EWMC, it decreases to 52.5%, and then fluctuates around 80%. While using DCC, it falls to 65%, and then fluctuates around 85%. In the context of a spread product, the EWMC tend to give conservative estimates of the correlations. This observation is confirmed by the large scale results.

The VaR estimation module 238 may process instructions to facilitate a forecast simulation of returns is necessary for obtaining an estimate of the value at risk (VaR). In order to generate scenarios we use filtered historical simulations (FHS). This approach combines two ideas, namely sampling of historical residuals and scaling of residuals by a model driven parameter such as the forecast volatility or correlation.

Given the raw futures price data $F_{Ti}(t)$, where Ti is the expiration date of the ith contract, one finds generic contract return $R_n^{(g)}(t)$, where n is a generic number according to its time-to-maturity. In contrast to interpolation, rolling does not introduce artificial price data. However, with a rolled contract the time-to-maturity is not strictly fixed as is the case using interpolated data points.

Second, the return surface, i.e. the returns depending on time-to-maturity and observation time, is dimensionally reduced. There are two possible reductions: principle component analysis (PCA) or parametric models. The following shows a PCA approach. Having derived an estimate of the covariance matrix C (by EWMC or multivariate GARCH model) we are diagonalizing C as $$C(t)=PC(t)\Lambda(t)PC^T(t) \tag{83}$$

to obtain the principle components. Using the orthogonal matrix $PC=[PC_1(t), \ldots, PC_N(t)]$, the principle components may be found using $$pe_k(t, t') = \sum_{j=1}^{N} PC_{jk}(t) R_j(t'), \tag{84}$$

Where we distinguish the training window (t') and the derivation date of principle components (t). Multiplying the last equation with the PC matrix we can relate the scores to the original return time series.

$$R_i(t') = \sum_{k=1}^{n} PC_{ik}(t) \cdot pc_k(t, t') + \epsilon_i(t'), \tag{85}$$

$$\epsilon_i(t') = \sum_{k=n+1}^{N} PC_{ik}(t) \cdot pc_k(t, t'). \tag{86}$$

where we have noted the two time arguments explicitly. Retaining only a small number of scores, n is usually fixed between n=3 and n=5. Additionally, N-n residual scores are kept in error term $\in(t')$. No matter if non-updating or updating of scores is selected, one finds with the few time series for the scores and the remaining residuals. The total number of time series equals the number of generic futures.

Third, innovations I may be defined as:

$$I_k(t, t') = \frac{pc_k(t, t')}{\sigma_I^k(t'-1)} \tag{87}$$

where $\sigma_I^k(t'-1)$ is the volatility of the kth score $pc_k(t, t')$ on the previous business day. Different volatility models can be used to estimate $\sigma_I$. Again, a choice may be made among EWMC or multivariate GARCH, dual-lambda and the option of volatility flooring. However, note that volatilities limited by flooring are not used to standardize innovations but only to scale back the standardized innovations.

Fourth, filtering the correlation structure on the inter- and intracurve level. The correlation matrix may be estimated using one of the following models: EWMC, DCC, and global PCA. Each of the models leads to a correlation matrix Corr that is used to generate uncorrelated innovations by $$UI_i(t,t')=\text{chol}(\text{Corr})_{t'-1}^{-1} \cdot I(t,t') \tag{88}$$

where chol denotes the Cholesky decomposition and $UI_i(t, t')$ are the time series of uncorrelated innovations at derivation date t. Note, that similar to the volatility scaling step, this decorrelation step is done on each day of the look-back window using that day's correlation matrix.

After the correlation scaling we are left with a set of uncorrelated innovations UI and variance scaled residual terms (85). The latter read $$z_i(t, t') = \frac{pc_i(t, t')}{\sigma_\in^i(t'-1)} \tag{89}$$

where $\sigma_\in^i(t')$ is the variance estimate of $pc_i(t,t')$. The index i in Equation (89) selects only PC scores which contribute to the error term in Equation (85). The time-aligned uncorrelated innovations UI and residuals $z_i$ are assumed to i.i.d and are sampled for scenario generation. In this way the empirical return distributions is accounted for and we obtain the simulations $UI_{sim}(t)$ and variance scaled residual simulation $z_{sim}(t)$. The simulations of uncorrelated innovations are scaled back by $$pc_{sim}(t)=\text{diag}(\sigma(t)) \cdot \text{chol}(\text{Corr}(t)) \cdot UI_{sim}(t). \tag{90}$$

The simulated scaled residual terms $z_{sim}^i(t)$ are multiplied by the corresponding standard deviation $\sigma_\in^i(t)$ and sampled in line with the innovations. Explicitly $$\in_{sim}^i(t)=z_{sim}^i(t) \cdot \sigma_\in^i(t), i=n+1, \ldots N. \tag{91}$$

Furthermore the simulations of scores and rescaled residuals are transformed back to returns as in Eq. (85). Summing both terms leads to the simulated returns:

$$r_{sim}^i(t)=\Sigma_{k=1}^{n} PC_{ik}(t) \cdot pc_{sim}^k(t) + \Sigma_{k=n+1}^{N} PC_{ik}(t) \cdot \in_{sim}^k \tag{92}$$

Using the return simulations $r_{sim}^i(t)$ we obtain P&L simulation on the portfolio level by $$P\&L_{sim}(t) = \sum_{i=1}^{n_L} \omega_i \left( \varepsilon_{sim(t)}^{k6} F_\tau^i(t) - F_\tau^i(t) \right) \tag{93}$$

where $n_L$, $\omega_i$ and $F_\tau^i(t)$ are the number of legs, the ith leg's weight (position size) and the ith futures price at time t and ttm $\tau$, respectively. Finally, the margin VaR is estimated as the a quantile of the simulated sample $P\&L_{sim}$.

Dual Lambda and volatility flooring may be performed by the VaR estimation module 238. The default exponentially weighted estimate with parameter $\lambda$ for the variance of the time series r(t) reads $$\sigma_{EWM}^2(t)=\lambda \sigma_{EWM}^2(t-1)+(1-\lambda)r^2(t). \tag{94}$$

In the dual-lambda approach one considers two parameters $\lambda_{fast}$, $\lambda_{slow}$ and the corresponding processes of the form (94). Here attributes "fast" and "slow" should indicate how reactive the variance estimate is. These values may be chosen from a range of values from about 0.9 to about 1, where typical parameter values are $$\lambda_{slow}=0.99, \quad (95)$$

$$\lambda_{fast}=0.94. \quad (96)$$

In general, the final volatility estimate for the dual-lambda approach may be found by $$\sigma(t)=\max(\sigma_{slow}(t),\sigma_{fast}(t)). \quad (97)$$

However, in deriving the innovations by Eq. (87) $\sigma_{fast}(t)$ is used. The result of Equation (97) multiplies the simulations of the innovations and thereby influences the margin estimation.

Volatility flooring introduces a lower limit to the volatility estimation. The estimate for $\sigma_{Model}(t)$, as computed by processes such as (94) may be compared to fixed nth, quantile $Q_n$ of the historical volatility. Specifically, the sample of historical volatilities $\{\sigma(s) \text{ with } s \leq t\}$ within a growing estimation window is used to estimate the quantile $$\sigma_{Q_n}(t)=\hat{Q}_n\{\sigma(s)|s \leq t\}. \quad (98)$$

The floored volatility is found as $$\sigma(t)=\max(\sigma_{Model}(t),\sigma_{Q_n}(t)). \quad (99)$$

As in the dual-lambda, in the practical implementation the resulting volatility of Equation (99) is only used on the simulation level to rescale the simulation of innovations as in Eq. (90). The flooring is not employed in deriving the innovations. Statistically small volatilities may be avoided by following the flooring strategy and may introduce additional stability to margins.

The VaR estimation module 238 may choose the sample to use for VaR estimates to be equal to the entire currently available $N_{Hist}$ historical innovations. This option has the advantage of providing stable VaR time series. However, a more conservative approach which accounts for Monte-Carlo VaR estimation errors can be considered. In this case the VaR estimation is based on a bootstrapping procedure. This consists first in generating $N_{Btstr}$ samples (e.g., set $N_{Btstr}=100$) of $N_{Hist}$ innovations obtained by resampling with replacement historical innovations and calculating for each sample a VaR estimates $VaR_n$ ($n=1 \ldots N_{Btstr}$). The final VaR is obtained as the 5%-quantile of the obtained empirical VaR distribution.

In some cases, the margin calculator 240 may process a backtesting procedure where various combinations of instruments may be simulated using the proposed parameterization. The selection criteria may be one or both qualitative and quantitative.

In some cases, the margin calculator 240 may perform a quantitative test, such as an unconditional coverage test. The goal of this test may be to measure whether it is statistically reasonable that the reported value-at-risk is violated more (or less) than $\alpha \times 100\%$ of the time. To this end, the Kupiec test may be used. A violation may be described as a Bernoulli trial:

$$V := \begin{cases} 1, & \text{if } VaR_\alpha \text{ exceeded} \\ 0, & \text{else.} \end{cases}$$

These heuristics give rise to the following null hypothesis: $V_t$ follows the binomial distribution with parameters N and $q=1-\alpha$. Thus, the test consists of evaluating if the estimated parameter $$\hat{q} = \frac{n_V}{N}$$

is significantly different from the value $1-\alpha$ with a certain confidence level (CL), $n_V$ being the total number of var violations observed on the sample and N denotes the sample size. We reject the null hypothesis if $\hat{q}$ is significantly different from $1-\alpha$. The confidence interval $[Q_{lb};Q_{ub}]$ at confidence level (e.g., CL=99%) for the estimated parameter $\hat{q}$ is found using the Clopper Pearson method [6]. For the upper bound of the confidence interval one has $$v_1^{ub} = 2(n_V + 1), \quad (103)$$

$$v_2^{ub} = 2(N - n_V), \quad (104)$$

$$X_{ub} = F^{-1}\left(\frac{CL}{2}, v_1^{ub}, v_2^{ub}\right), \quad (105)$$

$$Q_{ub} = \frac{v_1^{ub} X_{ub}}{v_2^{ub} + v_1^{ub} X_{ub}}. \quad (106)$$

The lower bound reads $$v_1^{lb} = 2n_v, \quad (107)$$

$$v_2^{lb} = 2(N - n_v + 1), \quad (108)$$

$$X_{lb} = F^{-1}\left(1 - \frac{CL}{2}, v_1^{lb}, v_2^{lb}\right), \quad (109)$$

$$Q_{lb} = \frac{v_1^{lb} X_{lb}}{v_{22}^{lb} + v_1^{lb} X_{lb}}. \quad (110)$$

The transformation in (106) and (110) may be used to utilize the inverse F-distribution.

Several formulations of the Clopper Pearson method may be used. Alternatively, a β-distribution may be used directly to find the lower and upper bounds. The likelihood ratio for the Kupiec test reads:

$$LR_{kupiec} = -2 \ln(\alpha^{n_V}(1-\alpha)^{N-n_V}) + 2 \ln(q^{n_V}(1-q)^{N-n_V}), \quad (111)$$

where $\alpha$ is the level in $VaR_\alpha$. The likelihood ratio is asymtotically $x_i^2$ distributed with one degree of freedom. Therefore the p-value for the Kupiec test may be given by:

$$p_{kupiec} = 1 - \chi_1^2(LR_{kupiec}). \quad (112)$$

In some cases, margin calculator 240 may perform an independence test, where the goal of the independence test may be to assess the significance of violation clustering throughout the testing set. A good margin model may avoid clustering of the violations, even if the independence test is successful.

The Christoffersen test may be used. The core idea is to investigate whether there is a time dependency (as measured by the time elapsed between two consecutive violations) in the testing sample. Under the violation independence assumption, no time dependency should be detected. Specifically, let $v=(v_1, \ldots, v_n) \in N_n$ be the vector of time indices between two $VaR_\alpha$ violations, where $v_1$ is the time of the first violation. The likelihood ratio for each violation is given by:

$$LR_i = -2\log\left(\frac{p(1-p)^{v_x-1}}{\left(\frac{1}{v_x}\right)\left(1-\frac{1}{v_x}\right)^{v_x-1}}\right),\quad (113)$$

where I=(1, . . . , n). Under the null hypothesis of independent $VaR_\alpha$ violations:

$$LR = \sum_{i=1}^{n}\left[-2\log\left(\frac{p(1-p)^{v_x-1}}{\left(\frac{1}{v_x}\right)\left(1-\frac{1}{v_x}\right)^{v_x-1}}\right)\right].\quad (114)$$

is $x_i^2$ distributed with n degrees of freedom. The p-value for the Christoffersen test therefore reads:

$$p_{Christ}=1-\chi_n^2(LR). \quad (115)$$

The outcome of these two tests is measured by the resulting p-value. The color convention may be specified as a function of the confidence level considered, and is described in FIG. 54.

The margin module may provide an additional quantitative indicators, such as a mean VaR violation rate that may be defined:

$$\text{mean VaR Rate} = \frac{n_v}{N}, \quad (116)$$

with $n_V$ the total number of violations observed on the simulation sample of size N (the training set may be excluded) and may be expressed in percentage. This indicator may be key to understand the impact of a failed Kupiec test, such as whether the risk is over-estimated or under-estimated A mean break size indicator may be defined as a mean ratio of the violations by the corresponding VaR number:

$$\text{mean Break Size} = \frac{1}{n_v}\sum_{w\in V}^{n_v}\frac{PL(t_v)}{VaR_a(t_v)}, \quad (117)$$

with the $t_v$ sample time of each of the $n_V$ violations contained in the violation set V and may be expressed in percentage.

A maximum margin increase indicator may give an overview of the smoothness of the margin curve and may be expressed in percentage and may be defined by:

$$\text{max Margin Increase} = \max_{t\in T}\left(\frac{VaR_a(t+1)}{VaR_a(t)}\right). \quad (118)$$

Figure 55:
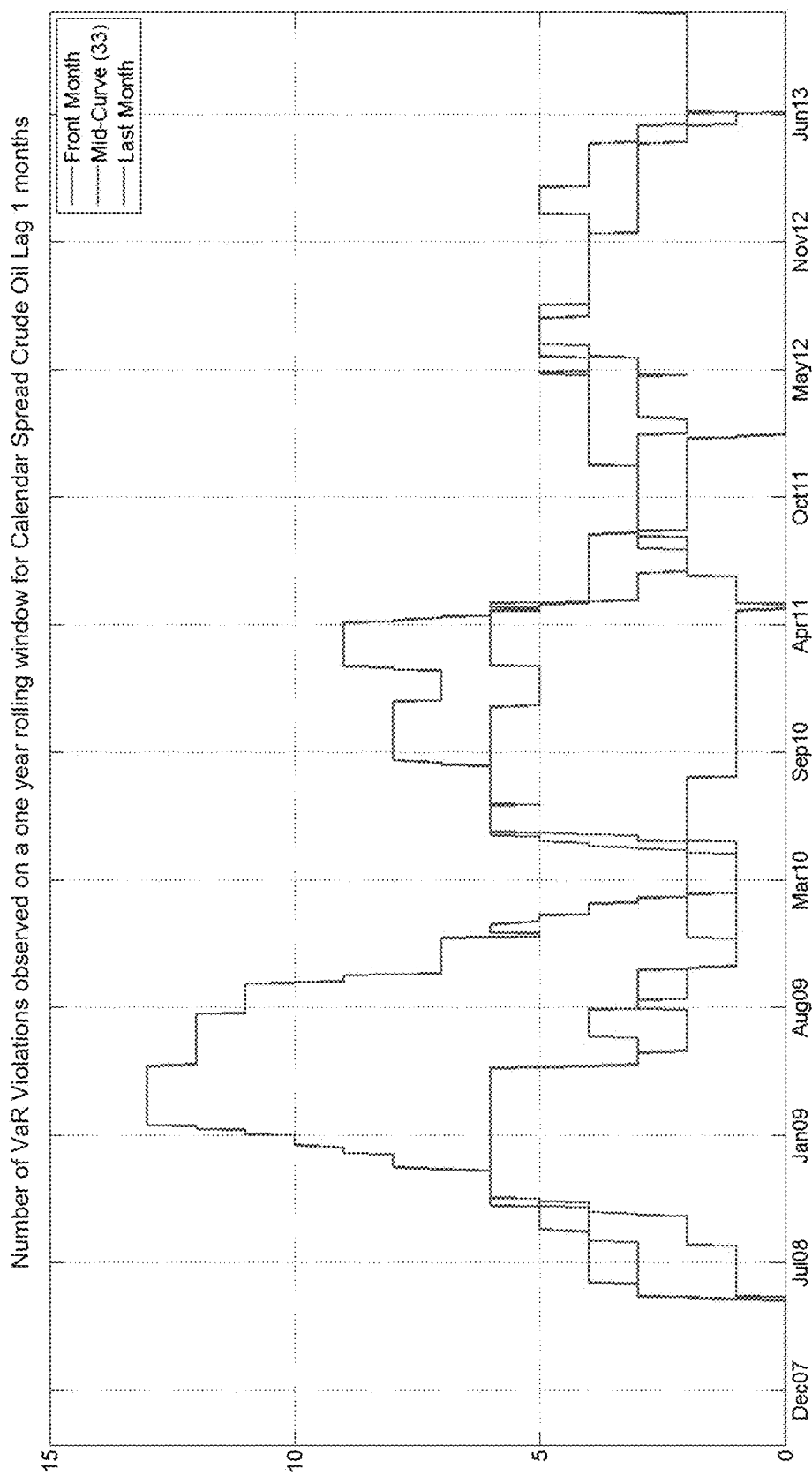
FIG. 55 shows a number of margin violations in a one year moving window for a financial product according to aspects of the disclosure.

In some cases, the margin calculator 240 may determine a maximum number of breaks within a one year moving window (e.g., a 252 moving window) that may be used on the training set. The maximum observed is reported. This indicator may be useful to understand a failing independence test. Moreover, a plot may be provided in the backtesting report that may illustrate when exactly the maximum is reached throughout the backtest period. An example is shown in FIG. 55.

Because the numerical procedures may need to be supported in validating a module, therefore one or more qualitative inspection methods may be provided to provide a visual check of the model. One or more inputs may be provided to the user to allow an indication of whether or not the test has been passed to be used by the margin calculator 240 in computing a margin or indicating that the test has been failed. For example, different scenarios may cause the margin calculator 240 to provide one or more visual indicators to a user via a user interface screen in cases including a failed Kupiec test due to risk over-estimation (e.g., is the over-estimation acceptable) or a failed Christoffersen test due to a local clustering effect. This Christofferson independence test is strongly sensitive not only to the clustering of violations, but also to the number of violations. The results should therefore be subject to interpretation via a user interface screen. Other user interface screens may be used to present results for illiquid curves, smoothness of the margins and/or a level of anti-procyclicality. Some tools (e.g., volatility flooring, dual-lambda) may allow the model to be made more robust regarding economic cycles. However, they tend to make Kupiec tests fail. In some cases, results at the back end of the curve may be presented to a user via a user interface screens. The back-end of the curve can be subject to low liquidity and artificial data creation (e.g., a condor on crude oil in the back end of the curve, which may result in a trinomial distribution, plus or minus 1 cent, or 0). As the model may not be applicable on discrete distributions, the results of the Kupiec and Christoffersen tests should be subject to caution when applied in these cases.

Figure 3:
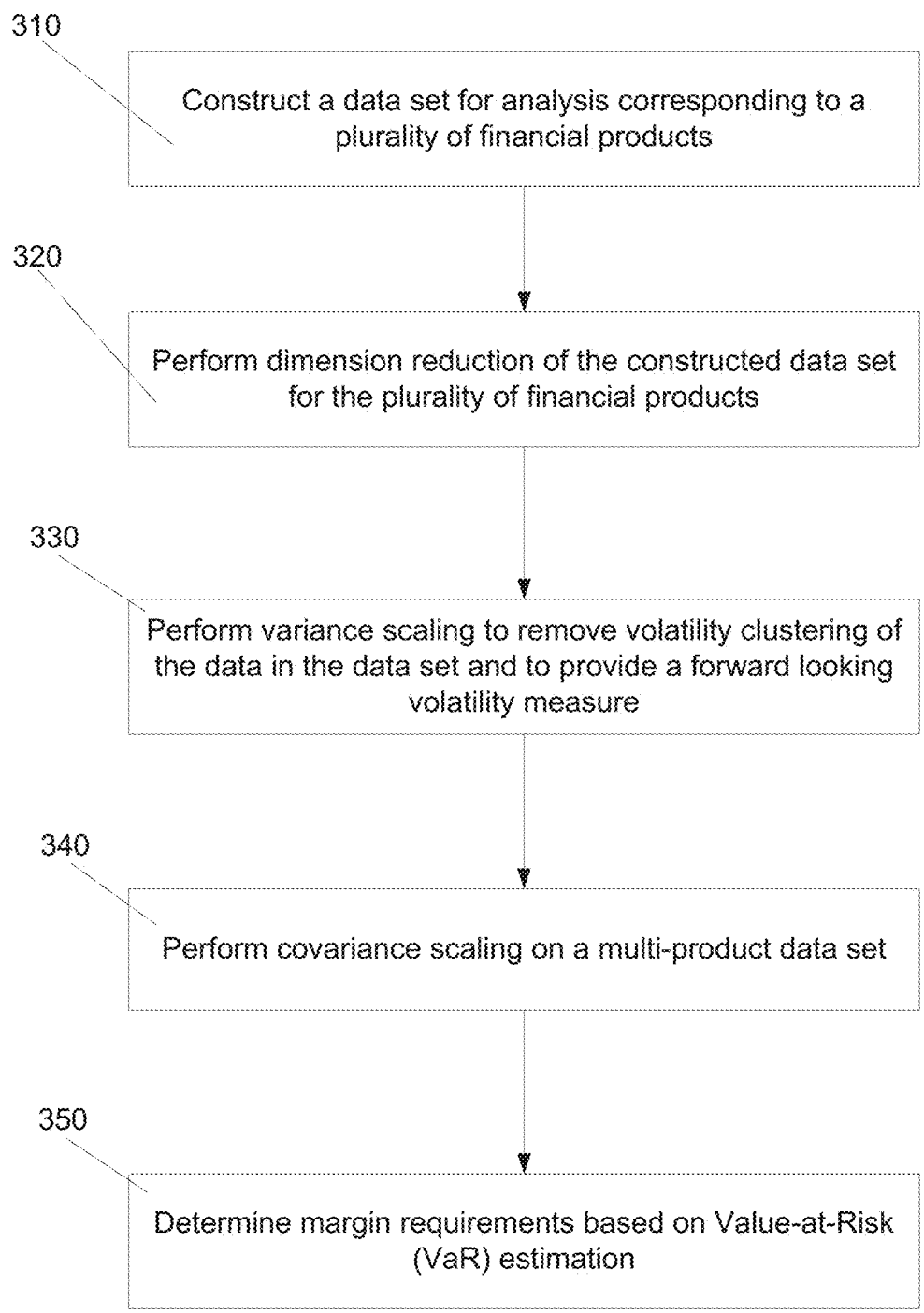
FIG. 3 shows an illustrative method performed using computer-executable instructions when processed by a clearinghouse computing system according to aspects of this disclosure.
Figure 5:
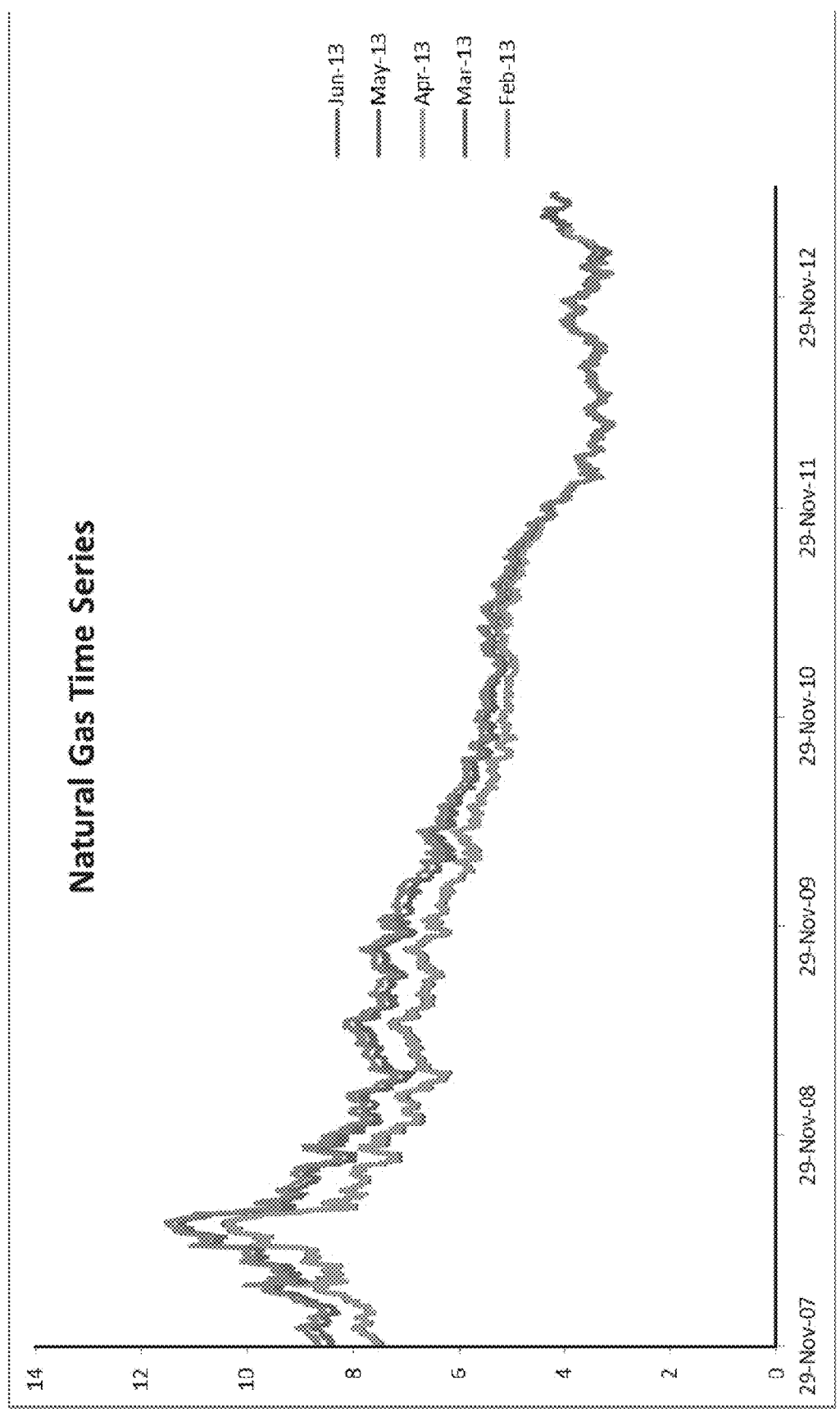
FIG. 5 shows an illustrative chart depicting illustrative time series of settlement pricing information of a futures product having different maturity dates according to aspects of the disclosure.

FIG. 3 shows an illustrative method performed using computer-executable instructions when processed by a clearinghouse computing system according to aspects of this disclosure. For example at 310 the clearinghouse computing system 210 may retrieve information corresponding to a portfolio of financial products including a plurality of futures products. To determine a margin contribution for each of the plurality of futures products, the time series generator 230 may be used to construct generic time series for each futures product and/or family of futures products as discussed above. The rolling procedure may be preferred over the interpolation and has an advantage of allowing one-to-one mapping with the existing future. Empirical statistical analysis has shown that the time to maturity effect for the front month is small. In the back-end of the curve, an extrapolation technique may be used to fill the missing data and thus generate generics for these far months. Linear extrapolation is used on the price level. If a time series is missing, an extension model is designed to generate artificial data. The time series generator uses the maximum data available and does not truncate long-time-series because some of the curves have limited time-range. Specifically, a Student's t-distribution inverse conditional expectation formula may be used.

At 320, the dimension reduction module 232 may process instructions stored in the memory 214 to perform dimension reduction for the generic time series generated by the time series generator. Here, every listed product price and maturity is considered a "dimension." In doing so, a large data set is created when every dimension of a large suite of products must be analyzed to determine margin. By utilizing the Principal Component Analysis (PCA) technique, the term structure curve dynamics can be captured by a few factors instead of the full set of maturities. The reduced set of factors identified by PCA may then be used to describe the correlation dynamic. The remaining factors will be still considered when doing the variance scaling for single product. As such, the large number of dimensions is reduced when facing multi-products, while the volatility for single product is still preserved.

At 330, the variance scaling module 234 may perform variance scaling using a dynamic EWMV (Exponentially Weighted Moving Variance) volatility model. This EWMV model may be applied on both the major factors identified by PCA and the residuals to remove the volatility clustering on the time series of data and provide an independently, identically distributed (i.i.d.) innovations for the historical simulations. The second goal is to provide a forward looking volatility measure suited for margin measurements.

At 340, the covariance scaling module 236 may perform covariance scaling on a multi-product data set (e.g. a portfolio containing multiple products), the handling of correlation dynamics may be crucial for portfolio margining. A EWMC (Exponentially Weighted Moving Covariance) correlation model may be applied on the major factors identified by PCA for all products, in order to scale the correlated innovations obtained from step 2 to non-correlated i.i.ds, as well as to provide a forward looking correlation suited for margin measurements. In some cases, the correlation model may be applied only on the few selected PCs. The assumption is thus that the intra- and inter-curve correlation dynamics is captured by these few PCs for all curves. Tests have shown that the DCC model may be used, as opposed to an EWMC model, but the results show only a marginal improvement with regards to the complexity of DCC and the need to fit the parameters.

At 350, the VaR estimation module 238 may be used to generate the forecast simulation of returns to obtain an estimate of the VaR. In order to generate scenarios, the filtered historical simulation (FHS) is used. This approach samples the uncorrelated historical innovations obtained and scales them by model driven parameters, namely, the forecast volatility and correlation. The scaled factors are then transformed back to the price log returns which will be treated as the price shocks and be applied at the portfolio level to obtain the portfolio shocks. The final margin value or VaR comes from a pre-defined percentile of the portfolio shock distribution. In some cases, a Filtered Historical Simulation may be used based on the chosen volatility model, where in case of a dual lambda model, only the fast lambda is used to derive the innovations. The obtained innovations (e.g., the expanding windows of all the data points available) for the scores are de-correlated using a Cholesky decomposition, and after simulation, they are rescaled again using the correlation matrix obtained from the correlation model. Once the PCs and residuals are simulated, they are finally rotated back to the return space using the PCs. Here, the residuals (e.g., the left scores) are also simulated using Filtered Historical Simulations, however they are not adjusted by a dynamic correlation model. The VaR estimate (e.g., margin value) can finally be measured as the quantile of the obtained scenarios At 360, the margin calculator may perform backtesting and/or other validation tests to ensure validity of the computed margin value. In some cases, the margin calculator may sum a plurality of margin values (e.g., VaR values) computed for a subset of a portfolio, to generate a margin requirement for the entire portfolio.

CONCLUSION

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments. For example, one of ordinary skill in the art will appreciate that the steps illustrated in the illustrative figures may be performed in other than the recited order, and that one or more steps illustrated may be optional in one or more embodiments. The embodiments discussed herein were chosen and described in order to explain the principles and the nature of various embodiments and their practical application to enable one skilled in the art to make and use these and other embodiments with various modifications as are suited to the particular use contemplated. Any and all permutations of features from above-described embodiments are the within the scope of the invention.

The invention claimed is:

1. A clearinghouse computing device configured to generate a margin requirement for a portfolio of financial products, comprising:
   a processor; and
   a non-transitory memory device storing instructions that, when executed by the processor, cause the clearinghouse computing device to:
   (a) generate, by a time series generator of a clearinghouse computer system, continuous time series of pricing information corresponding to a financial product held in a portfolio, the continuous time series of pricing information comprising a plurality of dimensions each corresponding to a factor contributing to dynamics of the continuous time series;
   (b) calculate, by a dimension reduction module of the clearinghouse computer system, a dimension-reduced projection of the continuous time series of pricing information based on a principle component analysis (PCA) technique the dimension reduced projection using less than all of the factors to represent the dynamics of the continuous time series;
   (c) calculate, by a variance scaling module of the clearinghouse computer system, a volatility normalization of the dimension reduced projection by performing volatility normalization of scores and volatility normalization of error terms of the dimension reduced projection of the continuous time series of pricing information to produce a plurality of curves;
   (d) determine, by a covariance scaling module of the clearinghouse computer system, an inter-curve and intra-curve correlation between the plurality of curves; and
   (e) generate, by a value at risk estimation module of the clearinghouse computer system, an estimated value at risk based on the inter-curve and intra-curve correlation between the plurality of curves.

2. The clearinghouse computing device of claim 1 wherein a calculated margin requirement corresponds to the value at risk generated by the value at risk estimation module.

3. The clearinghouse computing device of claim 1, wherein the portfolio comprises two or more financial products, wherein the non-transitory memory device comprises instructions that, when executed by the processor, cause the clearinghouse computing device to
   perform steps (a)-(e) for each of two or more financial products in the portfolio; and
   calculate, by a margin calculator, a portfolio margin requirement based on the value-at-risk of for each of the two or more financial products.

4. The clearinghouse computing device of claim 1, wherein instructions cause the clearinghouse computing device, as part of step (a), to extrapolate, by the time series generator, one or more missing data points.

5. The clearinghouse computing device of claim 1, wherein the missing data points are at the tails of a pricing curve of the financial product.

6. The clearinghouse computing device of claim 1, wherein the dimension reduced projection comprises a number of dimensions reduced from a beginning number of dimensions by at least 80 percent.

7. The clearinghouse computing device of claim 1, wherein the dimension reduced projection comprises a number of dimensions reduced from a beginning number of dimensions to less than 10 dimensions.

8. The clearinghouse computing device of claim 1, wherein (c) is performed using a dual lambda approach wherein a volatility of the scores is set to the maximum of a fast lambda EWMA and a slow lambda EWMA.

9. The clearinghouse computing device of claim 1, further comprising a user interface device including a display device and a user input device, wherein the non-transitory memory device stores instructions that, when executed by the processor, cause the clearinghouse computing device to:
present, to the user via the display device, at least one backtesting screen comprising a result from a test; and
receive, via the user input device, an indication whether a model for determining a portfolio margin requirement has passed a qualitative validation test.

10. A clearinghouse computing system configured to generate a margin requirement for a portfolio of financial products, comprising:
a historical pricing database storing pricing information for a plurality of financial products;
a clearinghouse computing device communicatively coupled to the historical pricing database and comprising:
a processor; and
a non-transitory memory device storing instructions that, when executed by the processor, cause the clearinghouse computing device to:
(a) generate, by a time series generator of a clearinghouse computer system, continuous time series of pricing information corresponding to a financial product held in a portfolio, the continuous time series of pricing information comprising a plurality of dimensions each corresponding to a factor contributing to dynamics of the continuous time series;
(b) calculate, by a dimension reduction module of the clearinghouse computer system, a dimension-reduced projection of the continuous time series of pricing information based on a principle component analysis (PCA) technique the dimension reduced projection using less than all of the factors to represent the dynamics of the continuous time series;
(c) calculate, by a variance scaling module of the clearinghouse computer system, a volatility normalization of the dimension reduced projection by performing volatility normalization of scores and volatility normalization of error terms of the dimension reduced projection of the continuous time series of pricing information to produce a plurality of curves;
(d) determine, by a covariance scaling module of the clearinghouse computer system, an inter-curve and intra-curve correlation between the plurality of curves; and
(e) generate, by a value at risk estimation module of the clearinghouse computer system, an estimated value at risk based on the inter-curve and intra-curve correlation between the plurality of curves.

11. The clearinghouse computing device of claim 10 wherein a calculated margin requirement corresponds to the value at risk generated by the value at risk estimation module.

12. The clearinghouse computing device of claim 10, wherein the portfolio comprises two or more financial products, wherein the non-transitory memory device comprises instructions that, when executed by the processor, cause the clearinghouse computing device to
perform steps (a)-(e) for each of two or more financial products in the portfolio; and
calculate, by a margin calculator, a portfolio margin requirement based on the value-at-risk of for each of the two or more financial products.

13. The clearinghouse computing device of claim 10, wherein instructions cause the clearinghouse computing device, as part of step (a), to extrapolate, by the time series generator, one or more missing data points.

14. The clearinghouse computing device of claim 10, wherein the missing data points are at the tails of a pricing curve of the financial product.

15. The clearinghouse computing device of claim 10, wherein the dimension reduced projection comprises a number of dimensions reduced from a beginning number of dimensions by at least 80 percent.

16. The clearinghouse computing device of claim 10, wherein the dimension reduced projection comprises a number of dimensions reduced from a beginning number of dimensions to less than 10 dimensions.

17. The clearinghouse computing device of claim 10, wherein (c) is performed using a dual lambda approach wherein a volatility of the scores is set to the maximum of a fast lambda EWMA and a slow lambda EWMA.

18. The clearinghouse computing device of claim 10, further comprising a user interface device including a display device and a user input device, wherein the non-transitory memory device stores instructions that, when executed by the processor, cause the clearinghouse computing device to:
present, to the user via the display device, at least one backtesting screen comprising a result from a test; and
receive, via the user input device, an indication whether a model for determining a portfolio margin requirement has passed a qualitative validation test.

19. A method performed by a clearinghouse computing device, comprising:
(a) generating, by a time series generator of the clearinghouse computer device, continuous time series of pricing information corresponding to a financial product held in a portfolio, the continuous time series of pricing information comprising a plurality of dimensions each corresponding to a factor contributing to dynamics of the continuous time series;
(b) calculating, by a dimension reduction module of the clearinghouse computer device, a dimension-reduced projection of the continuous time series of pricing information based on a principle component analysis (PCA) technique the dimension reduced projection using less than all of the factors to represent the dynamics of the continuous time series;
(c) scaling, by a variance scaling module of the clearinghouse computer device, by performing volatility normalization of scores and volatility normalization of error terms of the dimension reduced projection of the continuous time series of pricing information to produce a plurality of curves;

(d) determining, by a covariance scaling module of the clearinghouse computer device, an inter-curve and intra-curve correlation between the plurality of curves; and (e) generating, by a value at risk estimation module of the clearinghouse computer device, an estimated value at risk based on the inter-curve and intra-curve correlation between the plurality of curves.

20. The method of claim 19, comprising:

performing steps (a)-(e) for each of two or more financial products in the portfolio; and calculating, by a margin calculator, a portfolio margin requirement based on the value-at-risk of for each of the two or more financial products.

21. The method of claim 19, comprising:

validating, by the margin calculator of the clearinghouse computing device, a margin generation model using one or more of a qualitative backtesting method or a quantitative backtesting method.

* * * * *